United States Patent
Inagaki et al.

(10) Patent No.: US 7,985,455 B2
(45) Date of Patent: Jul. 26, 2011

(54) POLYMERIZABLE LIQUID CRYSTAL COMPOUND, LIQUID CRYSTAL COMPOSITION, AND POLYMER

(75) Inventors: Junichi Inagaki, Chiba (JP); Tomohiro Yano, Chiba (JP); Daisuke Ootsuki, Chiba (JP); Maiko Ito, Chiba (JP); Ryushi Shundo, Chiba (JP)

(73) Assignees: JNC Corporation, Tokyo (JP); Chisso Petrochemical Corporation, Tokyo (JP)

( * ) Notice: Subject to any disclaimer, the term of this patent is extended or adjusted under 35 U.S.C. 154(b) by 0 days.

(21) Appl. No.: 12/662,869

(22) Filed: May 7, 2010

(65) Prior Publication Data

US 2010/0264367 A1 Oct. 21, 2010

Related U.S. Application Data

(63) Continuation-in-part of application No. 12/451,091, filed as application No. PCT/JP2008/057420 on Apr. 16, 2008, now abandoned.

(30) Foreign Application Priority Data

Apr. 26, 2007 (JP) ................................. 2007-116348
Nov. 28, 2007 (JP) ................................. 2007-307039

(51) Int. Cl.
*C09K 19/32* (2006.01)
*C09K 19/38* (2006.01)
*C09K 19/20* (2006.01)
*C07C 69/76* (2006.01)
*C07C 69/78* (2006.01)
*C07C 69/96* (2006.01)
*C08F 20/10* (2006.01)
*G02B 5/30* (2006.01)

(52) U.S. Cl. ................ 428/1.1; 252/299.62; 252/299.67; 526/318.1; 526/318.2; 558/271; 560/80; 560/81; 560/139

(58) Field of Classification Search .................... 428/1.1; 252/299.62, 299.67; 558/271; 560/80, 81, 560/139; 526/318.1, 318.2

See application file for complete search history.

(56) References Cited

U.S. PATENT DOCUMENTS

| | | | | |
|---|---|---|---|---|
| 4,545,921 A | * | 10/1985 | Dubois et al. | 252/299.62 |
| 6,824,709 B2 | | 11/2004 | Shundo | |
| 7,070,838 B2 | * | 7/2006 | Sasada et al. | 428/1.1 |
| 7,378,135 B2 | * | 5/2008 | Saigusa et al. | 428/1.1 |
| 7,393,569 B2 | * | 7/2008 | Ito et al. | 428/1.1 |
| 7,413,782 B2 | * | 8/2008 | Kato et al. | 428/1.1 |
| 7,476,423 B2 | * | 1/2009 | Hirai | 428/1.1 |
| 7,488,519 B2 | * | 2/2009 | Hirai | 428/1.1 |
| 2003/0203128 A1 | | 10/2003 | Shundo | |
| 2006/0222784 A1 | | 10/2006 | Saigusa et al. | |

FOREIGN PATENT DOCUMENTS

| | | |
|---|---|---|
| JP | 7-17910 | 1/1995 |
| JP | 9-316032 | 12/1997 |
| JP | 2003-238491 | 8/2003 |
| JP | 2004-182678 | 7/2004 |
| JP | 2006-307150 | 11/2006 |

OTHER PUBLICATIONS

International Search Report issued Jun. 10, 2008 in International (PCT) Application No. PCT/JP2008/057420.
International Preliminary Report on Patentability including English translation of PCT Written Opinion issued Nov. 19, 2009 in International (PCT) Application No. PCT/JP2008/057420.
English abstract of JP8003111 published Jan. 9, 1996.

* cited by examiner

*Primary Examiner* — Shean C Wu
(74) *Attorney, Agent, or Firm* — Wenderoth, Lind & Ponack L.L.P.

(57) ABSTRACT

The compound of the present invention is represented by the formula (1). In the formula (1), $R^1$ and $R^2$ are hydrogen, fluorine, chlorine, methyl or ethyl; $X^1$ and $X^2$ are hydrogen, fluorine, methyl or trifluoromethyl; $Z^1$ and $Z^2$ are a single bond, —COO—, —OCO—, —CH=CH—COO—, —OCO—CH=CH—, —CH$_2$CH$_2$—COO—, —OCO—CH$_2$CH$_2$—, —CH$_2$O—, —CONH—, —(CH$_2$)$_4$—, —CH$_2$CH$_2$— or —C≡C—; $Z^3$ and $Z^4$ are a single bond or —O—; $A^1$ and $A^2$ are 1,4-cyclohexylene, 1,4-phenylene, 1,3-phenylene, pyridin-2,5-diyl, pyrimidin-2,5-diyl, naphthalen-2,6-diyl or tetrahydronaphtlane-2,6-diyl; and $Y^1$ and $Y^2$ are alkylene having from 2 to 20 carbon atoms.

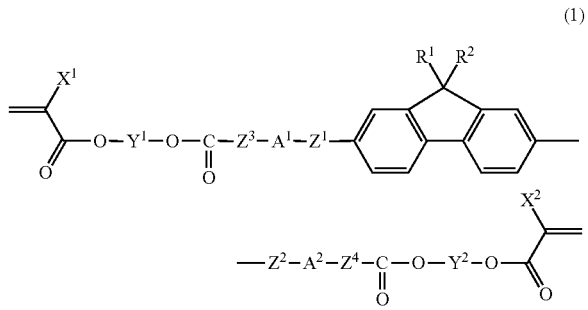

(1)

18 Claims, 2 Drawing Sheets

POLYMERIZABLE LIQUID CRYSTAL COMPOUND, LIQUID CRYSTAL COMPOSITION, AND POLYMER

This application is a Continuation-in-Part application of Ser. No. 12/451,091, filed Feb. 26, 2010 now abandoned, which is a 371 application of PCT/JP2008/057420 filed Apr. 16, 2008.

TECHNICAL FIELD

The present invention relates to a polymerizable liquid crystal compound, a polymer obtained by polymerizing the compound or a liquid crystal composition containing the compound, a molded article having optical anisotropy obtained by using the polymer, and a liquid crystal display device containing the polymer.

BACKGROUND ART

In recent years, a polymerizable liquid crystal compound is utilized in an optically anisotropic article, such as a polarizing plate and a phase retarder. This is because the compound exhibits optical anisotropy in a liquid crystal state, and the anisotropy is fixed through polymerization. The optical characteristics that are required for a molded article having optical anisotropy vary depending on purpose, and such a compound is necessary that has characteristics conforming to the purpose. For the compound used in the purpose, characteristics relating to the polymer are also important in addition to the aforementioned anisotropy. The characteristics include polymerization rate, and transparency, mechanical strength, coating property, solubility, crystallization degree, contracting property, water permeability, water absorbency, melting point, glass transition point, clearing point, chemical resistance and the like of the polymer.

Among the polymerizable liquid crystal compounds, a compound having an acryloyloxy group as a polymerizable group has high polymerization reactivity and provides a polymer having high transparency, and thus used widely for the purpose (Patent Documents 1 to 3). A polymerizable liquid crystal compound may be used solely or as a composition with plural compounds mixed. It may also be used as an ink with an organic solvent added thereto for controlling coating property. For producing a film having optical anisotropy by using the polymerizable liquid crystal compound (composition), an ink having been controlled in solution viscosity, leveling property and the like is prepared by dissolving the polymerizable liquid crystal compound (composition), a photopolymerization initiator, a surfactant and the like in an organic solvent. The ink is coated on a transparent substrate film having been subjected to an orientation treatment, and the solvent is dried to orient the polymerizable liquid crystal compound (composition) on the substrate film. It is then polymerized by irradiation with an ultraviolet ray to fix the orientation state. As the organic solvent, an ordinary solvent, such as a hydrocarbon solvent, e.g., toluene, and a ketone solvent, e.g., methyl ethyl ketone and cyclopentanone, is used, but according to the recent issues on environmental load, safety (mutagenicity and toxicity) and the like, there is a demand of use of an organic solvent having high safety, such as propylene glycol monoethyl ether acetate (PGMEA), with low environmental load. However, the polymerizable liquid crystal compounds in Patent Documents 1 to 3 have low solubility in the organic solvent having high safety, and have a problem of failure in preparation of an ink having a sufficient concentration (20% by weight or more). The failure in preparation of an ink having a sufficient concentration prevents a coated film having a sufficient thickness upon coating, and as a result, such a film cannot be produced that has intended optical anisotropy. The inventors have developed a polymerizable liquid crystal compound having a fluorenone skeleton (Patent Document 4). However, the compound is poor in a solvent, such as PGMEA, to fail to provide an ink having a high concentration. Furthermore, it has a high melting point and thus has such a defect that when the compound is liable to form crystals deposited when it is once heated to form a liquid crystal and then allowed to stand at room temperature.

Patent Document 1: JP-A-7-17910
Patent Document 2: JP-A-8-3111
Patent Document 3: JP-A-9-316032
Patent Document 4: U.S. Pat. No. 6,824,709

DISCLOSURE OF THE INVENTION

Problems to be Solved by the Invention

A first object of the invention is to provide a polymerizable liquid crystal compound that has a wide range of liquid crystal exhibiting region, exhibits excellent compatibility with other polymerizable liquid crystal compounds, has a low recrystallization temperature where a liquid crystal phase upon allowing to stand at room temperature, and is excellent in solubility in a solvent having high safety, such as PGMEA. A second object of the invention is to provide a polymer exhibiting optical anisotropy that has excellent characteristics in plural properties among transparency, mechanical strength, contracting property, water permeability, water absorbency, melting point, glass transition point, clearing point, chemical resistance and the like. A third object of the invention is to provide a liquid crystal display device that contains the polymer exhibiting optical anisotropy.

Means for Solving the Problems

The polymerizable liquid crystal compound of the invention is shown by the item [1] below.

[1] A compound represented by the formula (1):

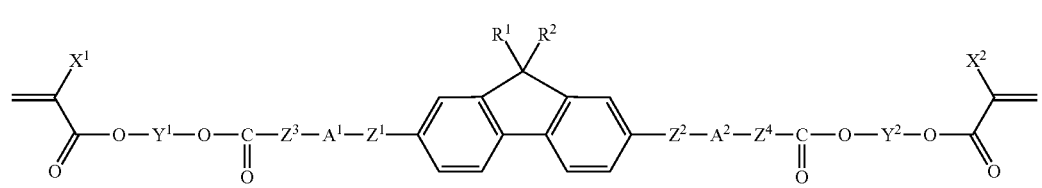

wherein $R^1$ and $R^2$ each independently represent hydrogen, fluorine, chlorine, methyl or ethyl; $X^1$ and $X^2$ each independently represent hydrogen, fluorine, methyl or trifluoromethyl; $Z^1$ represents a single bond, —COO—, —CH=CH—COO—, —CH$_2$CH$_2$—COO—, —CH$_2$O—, —CONH—, —(CH$_2$)$_4$—, —CH$_2$CH$_2$— or —C≡C—; $Z^2$ represents a single bond, —OCO—, —OCO—CH=CH—, —OCO—CH$_2$CH$_2$—, —OCH$_2$—, —NHCO—, —(CH$_2$)$_4$—, —CH$_2$CH$_2$— or —C≡C—; $Z^3$ and $Z^4$ each independently represent a single bond or —O—; $A^1$ and $A^2$ each independently represent 1,4-cyclohexylene, 1,4-phenylene, 1,3-phenylene, pyridin-2,5-diyl, pyrimidin-2,5-diyl, naphthalen-2,6-diyl or tetrahydronaphtlane-2,6-diyl, in which in the 1,3-phenylene and 1,4-phenylene, arbitrary hydrogen may be replaced by fluorine or chlorine, and one or two hydrogen may be replaced by cyano, methyl, ethyl, methoxy, hydroxyl, formyl, acetoxy, acetyl, trifluoroacetyl, difluoromethyl or trifluoromethyl; and $Y^1$ and $Y^2$ each independently represent alkylene having from 2 to 20 carbon atoms, in which in the alkylene, arbitrary hydrogen may be replaced by fluorine or chlorine, and arbitrary —CH$_2$— may be replaced by —O—, —COO—, —OCO—, —CH=CH— or —C≡C—.

Advantages of the Invention

The liquid crystal compound of the invention satisfies plural properties among such properties that the compound is polymerizable at room temperature, is polymerizable in the air, has high polymerizability, has a wide range of a liquid crystal phase, is chemically stable, is colorless, is easily soluble in an organic solvent, particularly a solvent having high safety, such as PGMEA, and has high compatibility with other polymerizable compounds. Particularly, such a property is noted that the compound is excellent in solubility in a solvent having high safety upon using as an ink. Furthermore, such a property is noted that the compound is hard to undergo recrystallization upon allowing to stand at room temperature. A polymer obtained by using the polymerizable liquid crystal compound as a raw material satisfies plural properties among such properties that the polymer has optical anisotropy, is hard to be released from a supporting substrate, has sufficient hardness, is colorless and transparent, has large heat resistance, has large weather resistance, and has small photoelasticity. Accordingly, the polymer of the invention can be utilized, for example, as a phase retarder, a polarizing device, an antireflection film, a selective reflection film, a brightness improving film, a viewing angle compensation film and the like, which are constitutional elements of a liquid crystal display device.

BEST MODE FOR CARRYING OUT THE INVENTION

The terms used in the invention will be explained. The meaning of the term "liquid crystallinity" is not limited to possession of a liquid crystal phase. The meaning of liquid crystallinity also include such characteristics that a compound can be used as a component of a liquid crystal composition by mixing with another liquid crystal compound although the compound does not have a liquid crystal phase by itself. A compound represented by the formula (1) may be referred to as a compound (1). Compounds represented by the other formulae may be referred in the similar manner. The term "arbitrary" means that not only the position but also the number are arbitrary. For example, the expression "arbitrary A may be replaced by B, C or D" includes the case where arbitrary A is replaced by B, the case where arbitrary A is replaced by C and the case where arbitrary A is replaced by D, and also includes the case where plural A are replaced by at least two of B to D. However, the case where arbitrary —CH$_2$— is replaced by —O— does not include the case where plural adjacent —CH$_2$— are each replaced by —O—. In the examples, the data shown in an electronic balance is shown in terms of g (gram) as a unit of mass. The percents by weight and the parts by weight are data based on those values.

The invention is constituted by the aforementioned item [1] and the items [2] to [15] below.

[2] The compound according to the item [1], wherein $R^1$ and $R^2$ each independently represent hydrogen or methyl; $X^1$ and $X^2$ each represent hydrogen or methyl; $Z^1$ represents —COO—, —CH=CH—COO— or —CH$_2$CH$_2$—COO—; $Z^2$ represents —OCO—, —OCO—CH=CH— or —OCO—CH$_2$CH$_2$—; $Z^3$ and $Z^4$ each represent a single bond or —O—; $A^1$ and $A^2$ each represent 1,4-phenylene or 1,3-phenylene, in which in the rings, one or two hydrogen may be replaced by fluorine or chlorine; and $Y^1$ and $Y^2$ are the same groups and represent alkylene having from 2 to 14 carbon atoms, in which in the alkylene, arbitrary —CH$_2$— may be replaced by —O—.

[3] The compound according to the item [1], wherein $R^1$ and $R^2$ each independently represent hydrogen or methyl; $X^1$ and $X^2$ each represent hydrogen; $Z^1$ represents —COO—; $Z^2$ represents —OCO—; $Z^3$ and $Z^4$ each represent —O—; $A^1$ and $A^2$ each represent 1,4-phenylene, 1,3-phenylene or 2-fluoro-1,4-phenylene; and $Y^1$ and $Y^2$ are the same groups and represent alkylene having from 2 to 14 carbon atoms, in which in the alkylene, arbitrary —CH$_2$— may be replaced by —O—.

[4] The compound according to the item [1], wherein $R^1$ and $R^2$ each independently represent hydrogen or methyl; $X^1$ and $X^2$ each represent hydrogen; $Z^1$ represents —COO—; $Z^2$ represents —OCO—; $Z^3$ and $Z^4$ each represent a single bond; $A^1$ and $A^2$ each represent 1,4-phenylene, 1,3-phenylene or 2-fluoro-1,4-phenylene; and $Y^1$ and $Y^2$ are the same groups and represent alkylene having from 2 to 14 carbon atoms, in which in the alkylene, arbitrary —CH$_2$— may be replaced by —O—.

[5] A polymerizable liquid crystal composition containing at least one compound represented by the formula (1) and at least one compound selected from the group of compounds represented by the formulae (M1), (M2) and (M3):

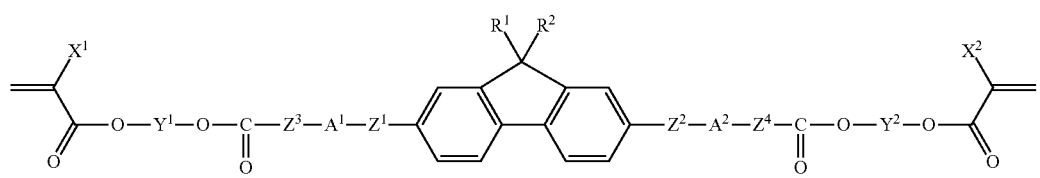

(1)

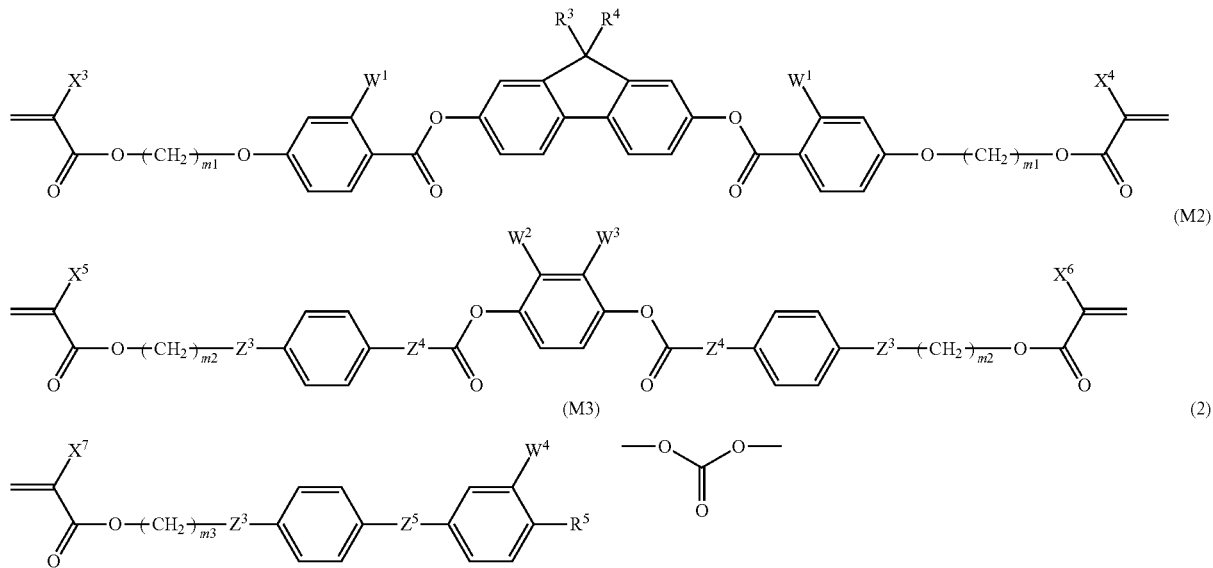

wherein
in the formula (1), $R^1$ and $R^2$ each independently represent hydrogen, fluorine, chlorine, methyl or ethyl; $X^1$ and $X^2$ each independently represent hydrogen, fluorine, methyl or trifluoromethyl; $Z^1$ represents a single bond, —COO—, —CH=CH—OCO—, —CH$_2$CH$_2$—COO—, —CH$_2$O—, —CONH—, —(CH$_2$)$_4$—, —CH$_2$CH$_2$— or —C≡C—; $Z^2$ represents a single bond, —OCO—, —OCO—CH=CH—, —OCO—CH$_2$CH$_2$—, —OCH$_2$—, —NHCO—, —(CH$_2$)$_4$—, —CH$_2$CH$_2$— or —C≡C—; $Z^3$ and $Z^4$ each independently represent a single bond or —O—; $A^1$ and $A^2$ each independently represent 1,4-cyclohexylene, 1,4-phenylene, 1,3-phenylene, pyridin-2,5-diyl, pyrimidin-2,5-diyl, naphthalen-2,6-diyl or tetrahydronaphtlane-2,6-diyl, in which in the 1,3-phenylene and 1,4-phenylene, arbitrary hydrogen may be replaced by fluorine or chlorine, and one or two hydrogen may be replaced by cyano, methyl, ethyl, methoxy, hydroxyl, formyl, acetoxy, acetyl, trifluoroacetyl, difluoromethyl or trifluoromethyl; and $Y^1$ and $Y^2$ each independently represent alkylene having from 2 to 20 carbon atoms, in which in the alkylene, arbitrary hydrogen may be replaced by fluorine or chlorine, and arbitrary —CH$_2$— may be replaced by —O—, —COO—, —OCO—, —CH=CH— or —C≡C—, in the formula (M1), $R^3$ and $R^4$ each independently represents hydrogen or methyl; $W^1$ each independently represent hydrogen or fluorine; m1 each independently represent an integer of from 2 to 10; and $X^3$ and $X^4$ each independently represent hydrogen, fluorine or methyl, in the formula (M2), $Z^3$ each independently represent —O— or a group represented by the formula (2); $Z^4$ each independently represent a single bond, —CH$_2$CH$_2$— or —CH=CH—; $W^2$ and $W^3$ each independently represent hydrogen, fluorine, methyl or trifluoromethyl; m2 each independently represent an integer of from 2 to 10; and $X^5$ and $X^6$ each independently represent hydrogen, fluorine or methyl, and in the formula (M3), $R^5$ represents —CN, —OCF$_3$, alkyl having from 1 to 10 carbon atoms or alkoxy having from 1 to 10 carbon atoms; $W^4$ represents hydrogen or fluorine; $Z^3$ represents —O— or a group represented by the formula (2); $Z^5$ represents a single bond, —C≡C— or —COO—; m3 represents an integer of from 2 to 10; and $X^7$ represents hydrogen, fluorine or methyl.

[6] The polymerizable liquid crystal composition according to the item [5], wherein
in the formula (1), $R^1$ and $R^2$ each independently represent hydrogen or methyl; $X^1$ and $X^2$ each represent hydrogen or methyl; $Z^1$ represents —COO—, —CH=CH—COO— or —CH$_2$CH$_2$—COO—; $Z^2$ represents —OCO—, —OCO—CH=CH— or —OCO—CH$_2$CH$_2$—; $Z^3$ and $Z^4$ each represent —O—; $A^1$ and $A^2$ each represent 1,4-phenylene or 1,3-phenylene, in which in the rings, one or two hydrogen may be replaced by fluorine or chlorine; and $Y^1$ and $Y^2$ are the same groups and represent alkylene having from 2 to 14 carbon atoms, in which in the alkylene, arbitrary —CH$_2$— may be replaced by —O—, in the formula (M1), $R^3$ and $R^4$ each independently represents hydrogen or methyl; $W^1$ represents hydrogen or fluorine; m1 represents an integer of from 2 to 10; and $X^3$ and $X^4$ represent hydrogen, in the formula (M2), $Z^3$ represents —O— or a group represented by the formula (2); $Z^4$ represents a single bond or —CH$_2$CH$_2$—; $W^2$ and $W^3$ each independently represent hydrogen, methyl or trifluoromethyl; m2 represents an integer of from 2 to 10; and $X^5$ and $X^6$ each represent hydrogen, in the formula (M3), $R^5$ represents —CN, —OCF$_3$, alkyl having from 1 to 10 carbon atoms or alkoxy having from 1 to 10 carbon atoms; $W^4$ represents hydrogen; $Z^3$ represents —O— or a group represented by the formula (2); $Z^5$ represents a single bond or —COO—; m3 represents an integer of from 2 to 10; and $X^7$ represents hydrogen, and a ratio of the compound represented by the formula (1) is from 40 to 95% by weight, and a ratio of the compound selected from the group of compounds represented by the formulae (M1), (M2) and (M3) is from 5 to 60% by weight, based on a total amount of the compound represented by the formula (1) and the compound selected from the group of compounds represented by the formulae (M1), (M2) and (M3).

[7] The polymerizable liquid crystal composition according to the item [5], wherein in the formula (1), $R^1$ and $R^2$ each independently represent hydrogen or methyl; $X^1$ and $X^2$ each represent hydrogen; $Z^1$ represents —COO—; $Z^2$ represents —OCO—; $Z^3$ and $Z^4$ each represent —O—; $A^1$ and $A^2$ each represent 1,4-phenylene, 1,3-phenylene or 2-fluoro-1,4-phenylene; and $Y^1$ and $Y^2$ are the same groups and represent alkylene having from 2 to 14 carbon atoms, in which in the alkylene, arbitrary —CH$_2$— may be replaced by —O—, in the formula (M1), $R^3$ and $R^4$ each independently represents hydrogen or methyl; $W^1$ represents hydrogen or fluorine; m1 represents an integer of from 2 to 10; and $X^3$ and $X^4$ represent hydrogen, in the formula (M2), $Z^3$ represents —O— or a group represented by the formula (2); $Z^4$ represents a single bond or —CH$_2$CH$_2$—; $W^2$ and $W^3$ each independently represent hydrogen, methyl or trifluoromethyl; m2 represents an integer of from 2 to 10; and $X^5$ and $X^6$ each represent hydrogen, in the formula (M3), $R^5$ represents —CN, —OCF$_3$, alkyl having from 1 to 10 carbon atoms or alkoxy having from 1 to 10 carbon atoms; $W^4$ represents hydrogen; $Z^3$ represents —O— or a group represented by the formula (2); $Z^5$ represents a single bond or —COO—; m3 represents an integer of from 2 to 10; and $X^7$ represents hydrogen, and a ratio of the compound represented by the formula (1) is from 50 to 90% by weight, and a ratio of the compound selected from the group of compounds represented by the formulae (M1), (M2) and (M3) is from 10 to 50% by weight, based on a total amount of the compound represented by the formula (1) and the compound selected from the group of compounds represented by the formulae (M1), (M2) and (M3).

[8] The polymerizable liquid crystal composition according to the item [5], wherein in the formula (1), $R^1$ and $R^2$ each independently represent hydrogen or methyl; $X^1$ and $X^2$ each represent hydrogen or methyl; $Z^1$ represents —COO—, —CH═CH—COO—, —CH$_2$CH$_2$—COO— or —C≡C—; $Z^2$ represents —OCO—, —OCO—CH═CH—, —OCO—CH$_2$CH$_2$— or —C≡C—; $Z^3$ and $Z^4$ each represent a single bond; $A^1$ and $A^2$ each represent 1,3-phenylene, 1,4-phenylene or 2-fluoro-1,4-phenylene; and $Y^1$ and $Y^2$ are the same groups and represent alkylene having from 2 to 14 carbon atoms, in which in the alkylene, arbitrary —CH$_2$— may be replaced by —O—, in the formula (M1), $R^3$ and $R^4$ each independently represents hydrogen or methyl; $W^1$ represents hydrogen or fluorine; m1 represents an integer of from 2 to 10; and $X^3$ and $X^4$ represent hydrogen, in the formula (M2), $Z^3$ represents —O— or a group represented by the formula (2); $Z^4$ represents a single bond or —CH$_2$CH$_2$—; $W^2$ and $W^3$ each independently represent hydrogen, methyl or trifluoromethyl; m2 represents an integer of from 2 to 10; and $X^5$ and $X^6$ each represent hydrogen, in the formula (M3), $R^5$ represents —CN, —OCF$_3$, alkyl having from 1 to 10 carbon atoms or alkoxy having from 1 to 10 carbon atoms; $W^4$ represents hydrogen; $Z^3$ represents —O— or a group represented by the formula (2); $Z^5$ represents a single bond or —COO—; m3 represents an integer of from 2 to 10; and $X^7$ represents hydrogen, and a ratio of the compound represented by the formula (1) is from 50 to 90% by weight, and a ratio of the compound selected from the group of compounds represented by the formulae (M1), (M2) and (M3) is from 10 to 50% by weight, based on a total amount of the compound represented by the formula (1) and the compound selected from the group of compounds represented by the formulae (M1), (M2) and (M3).

[9] The polymerizable liquid crystal composition according to the item [5], wherein in the formula (1), $R^1$ and $R^2$ each independently represent hydrogen or methyl; $X^1$ and $X^2$ each represent hydrogen; $Z^1$ represents —COO—; $Z^2$ represents —OCO—; $Z^3$ and $Z^4$ each represent a single bond; $A^1$ and $A^2$ each represent 1,3-phenylene, 1,4-phenylene or 2-fluoro-1,4-phenylene; and $Y^1$ and $Y^2$ are the same groups and represent alkylene having from 2 to 14 carbon atoms, in which in the alkylene, arbitrary —CH$_2$— may be replaced by —O—, in the formula (M1), $R^3$ and $R^4$ each independently represents hydrogen or methyl; $W^1$ represents hydrogen or fluorine; m1 represents an integer of from 2 to 10; and $X^3$ and $X^4$ represent hydrogen, in the formula (M2), $Z^3$ represents —O— or a group represented by the formula (2); $Z^4$ represents a single bond or —CH$_2$CH$_2$—; $W^2$ and $W^3$ each independently represent hydrogen, methyl or trifluoromethyl; m2 represents an integer of from 2 to 10; and $X^5$ and $X^6$ each represent hydrogen, in the formula (M3), $R^5$ represents —CN, —OCF$_3$, alkyl having from 1 to 10 carbon atoms or alkoxy having from 1 to 10 carbon atoms; $W^4$ represents hydrogen; $Z^3$ represents —O— or a group represented by the formula (2); $Z^5$ represents a single bond or —COO—; m3 represents an integer of from 2 to 10; and $X^7$ represents hydrogen, and a ratio of the compound represented by the formula (1) is from 50 to 90% by weight, and a ratio of the compound selected from the group of compounds represented by the formulae (M1), (M2) and (M3) is from 10 to 50% by weight, based on a total amount of the compound represented by the formula (1) and the compound selected from the group of compounds represented by the formulae (M1), (M2) and (M3).

[10] A film having optical anisotropy obtained by polymerizing the compound according to one of the items [1] to [4].

[11] A film having optical anisotropy obtained by polymerizing the polymerizable liquid crystal composition according to one of the items [5] to [9].

[12] The film having optical anisotropy according to the item [10] or [11], which has A-plate optical characteristics.

[13] The film having optical anisotropy according to the item [10] or [11], which has C-plate optical characteristics.

[14] The film having optical anisotropy according to the item [10] or [11], which has negative C-plate optical characteristics.

[15] A liquid crystal display device containing the film having optical anisotropy according to one of the items [10] to [14].

The compound (1) of the invention is physically and chemically stable under the condition where the ordinary condition where the compound is used, and has such characteristics that the compound has good solubility in a polar solvent. The compound can be controlled to have high optical anisotropy, low optical anisotropy, low viscosity or the like by selecting appropriately the rings, bonding groups and side chains constituting the compound. Even when the atoms constituting the compound of the invention are isotopes thereof, the compound can be favorably used since it exhibits the similar characteristics.

The compound (1) is a bifunctional compound having a polymerizable group, such as acryloyloxy, methacryloyloxy, α-fluoroacryloyloxy or α-trifluoromethylacryloyloxy, at the both ends of the molecule. A compound having an acryloyloxy group as a polymerizable group is particularly preferred since the compound exhibits a higher polymerization rate to complete polymerization within a shorter period of time. As compared to a monofunctional compound, a bifunctional compound provides such a polymer that is higher in heat resistance, lower in water absorbency, water permeability and gas permeability, and is higher in mechanical strength (particularly, hardness).

The polymerizable liquid crystal compound of the invention is represented by the formula (1).

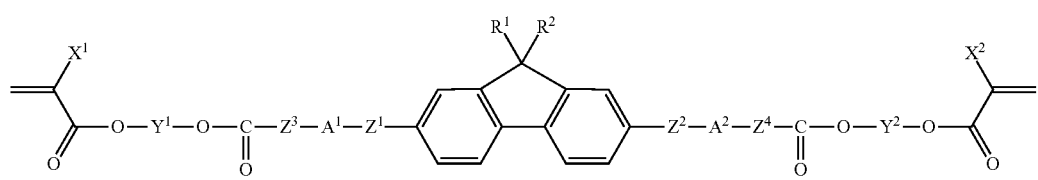

(1)

In the formula (1), $R^1$ and $R^2$ each independently represent hydrogen, fluorine, chlorine, methyl or ethyl, and preferably each independently represents hydrogen or methyl. It is preferred that both $R^1$ and $R^2$ each are hydrogen or methyl, or $R^1$ is hydrogen and $R^2$ is methyl.

$X^1$ and $X^2$ each independently represent hydrogen, fluorine, methyl or trifluoromethyl, and preferably each independently represents hydrogen or methyl, and more preferably both of them each are hydrogen or methyl. Accordingly, $X^1$ and $X^2$ are preferably the same groups. The compound (1) can be controlled in polymerization reactivity, transparency, haze and the like by selecting $X^1$ and $X^2$ from these groups.

$Z^1$ represents a single bond, —COO—, —CH═CH—COO—, —CH$_2$CH$_2$—COO—, —CH$_2$O—, —CONH—, —(CH$_2$)$_4$—, —CH$_2$CH$_2$— or —C≡C—, preferably —COO—, —CH═CH—COO— or —CH$_2$CH$_2$—COO—, and more preferably —COO—. $Z^2$ represents a single bond, —OCO—, —OCO—CH═CH—, —OCO—CH$_2$CH$_2$—, —OCH$_2$—, —NHCO—, —(CH$_2$)$_4$, —CH$_2$CH$_2$— or —C≡C—, preferably —OCO—, —OCO—CH═CH— or —OCO—CH$_2$CH$_2$—, and more preferably —OCO—. The compound (1) tends to have a wide liquid crystal temperature range by selecting $Z^1$ and $Z^2$ from these groups.

$Z^3$ and $Z^4$ each preferably independently represent a single bond or —O—. In the case where $Z^3$ and $Z^4$ each are a single bond, the compound tends to have a high melting point and tends to have a high NI point. In the case where $Z^3$ and $Z^4$ each are —O—, the compound tends to have a low melting point and tends to be easily dissolved in a solvent having high polarity, such as PGMEA.

$A^1$ and $A^2$ each independently represent 1,4-cyclohexylene, 1,4-phenylene, 1,3-phenylene, pyridin-2,5-diyl, pyrimidin-2,5-diyl, naphthalen-2,6-diyl or tetrahydronaphtlane-2,6-diyl. In the 1,3-phenylene and 1,4-phenylene, arbitrary hydrogen may be replaced by fluorine or chlorine, and one or two hydrogen may be replaced by cyano, methyl, ethyl, methoxy, hydroxyl, formyl, acetoxy, acetyl, trifluoroacetyl, difluoromethyl or trifluoromethyl. It is preferred that both $A^1$ and $A^2$ each are 1,3-phenylene or 1,4-phenylene, or one of $A^1$ and $A^2$ is 1,3-phenylene and the other thereof is 1,4-phenylene, and arbitrary hydrogen in the 1,4-phenylene may be replaced by fluorine or chlorine. Accordingly, preferred examples of $A^1$ and $A^2$ include 1,3-phenylene, 1,4-phenylene, 2-fluoro-1,4-phenylene, 3-fluoro-1,4-phenylene, 2-chloro-1,4-phenylene, 3-chloro-1,4-phenylene, 2,3-difluoro-1,4-phenylene, 2,4-difluoro-1,4-phenylene and 2,5-difluoro-1,4-phenylene. In the case where both $A^1$ and $A^2$ each are 1,4-phenylene, the compound tends to have a high melting point, a high clearing point and a wide temperature range of a liquid crystal phase, and in the case where at least one of $A^1$ and $A^2$ is 1,3-phenylene, the compound tends to have a low melting point but tends to have a low clearing point.

$Y^1$ and $Y^2$ each independently represent alkylene having from 2 to 20 carbon atoms. In the alkylene, arbitrary hydrogen may be replaced by fluorine or chlorine, and arbitrary —CH$_2$— may be replaced by —O—, —COO—, —OCO—, —CH═CH— or —C≡C—. $Y^1$ and $Y^2$ preferably are the same groups and represent alkylene having from 2 to 14 carbon atoms, in which in the alkylene, arbitrary —CH$_2$— may be replaced by —O—. In the case where arbitrary —CH$_2$— in the alkylene may be replaced by —O— in the invention, the case where plural adjacent —CH$_2$— are each replaced by —O— is not included. Preferred examples of $Y^1$ and $Y^2$ include linear or branched alkylene having from 2 to 14 carbon atoms, —C$_2$H$_4$OC$_2$H$_4$—, —(C$_2$H$_4$O)$_2$—C$_2$H$_4$—, —(C$_2$H$_4$O)$_3$—C$_2$H$_4$— and —(C$_2$H$_4$O)$_4$—C$_2$H$_4$—. Linear alkylene is preferred among the linear or branched alkylene having from 2 to 14 carbon atoms. When the alkylene chain is long, the compound (1) tends to exhibit wide temperature range of a liquid crystal phase, and when an ether structure (—O—) is introduced in the alkylene, the compound tends to have good solubility in a solvent having high polarity.

The compound of the invention can be produced by utilizing the synthesis methods in organic chemistry disclosed in Houben Wyle Methoden der Organischen Chemie, Organic Reactions, Organic Syntheses and the like. In the schemes shown below, the symbols that are not particularly explained have the aforementioned meanings.

The synthesis method of a chloroformate derivative [b-4] as a raw material will be described.

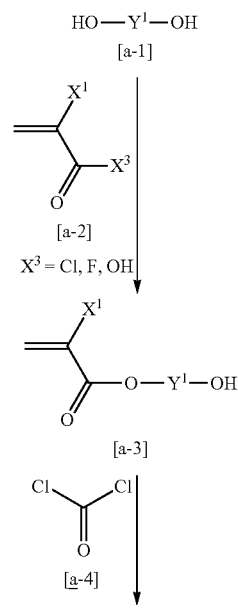

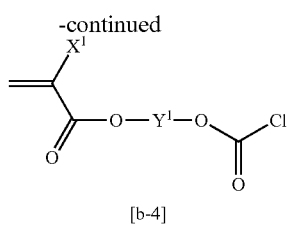

A diol [a-1] and an acrylic acid derivative [a-2] are subjected to monoesterification to provide an acrylic acid monoester derivative [a-3]. [a-3] is then reacted with phosgene [a-4] to synthesize a corresponding chloroformate derivative [b-4]. Specific examples of the diol [a-1] include ethylene glycol, 1,4-propanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,14-tetradecanediol, diethylene glycol, triethylene glycol, tetraethylene glycol and pentaethylene glycol. Specific examples of the acrylic acid derivative [a-2] include acrylic acid chloride, methacrylic acid chloride, α-fluoroacrylic acid fluoride, α-trifluoromethylacrylic acid chloride, acrylic acid, methacrylic acid, α-fluoroacrylic acid and α-trifluoromethylacrylic acid.

The compound (1), wherein $Z^1$ is —COO—, $Z^2$ is —OCO—, $Z^3$ is —O—, and $Z^4$ is —O—, can be synthesized according to the scheme (1) below.

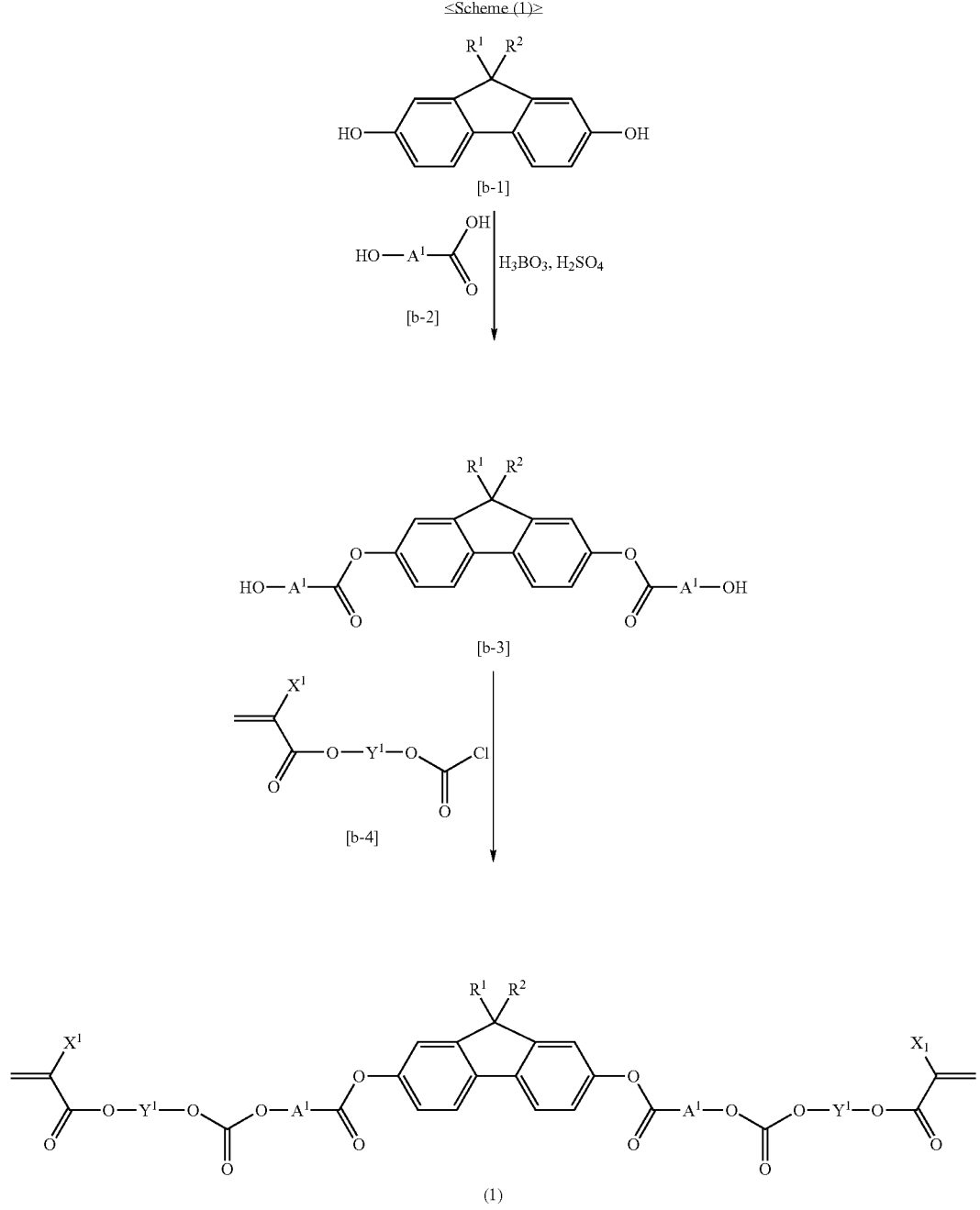

1 equivalent of a 2,7-dihydroxyfluorene derivative [b-1] and 2 equivalents of a 4-hydroxybenzoic acid derivative [b-2] are subjected to dehydration in the presence of an acid catalyst in toluene or xylene to provide a diester [b-3]. Examples of the acid catalyst used include sulfuric acid, boric acid and p-toluenesulfonic acid. [b-3] and the aforementioned [b-4] are subjected to esterification reaction to synthesize the compound (1). In the reaction of [b-1] and [b-2], plural kinds of [b-2] having different groups for $A^1$ may be used as a mixture. As a result, a mixture of plural kinds of [b-3], which are different compounds, is obtained, but the advantages of the invention is not influenced thereby. In the reaction of [b-3] and [b-4], plural kinds of [b-4] having different groups for $X^1$ and/or $Y^1$ may be used as a mixture because of the same reason as in the case where plural kinds of [b-2] are used as a mixture. The situation is also applied similarly to the following schemes.

The compound (1), wherein $Z^1$ is —CH=CH—COO—, $Z^2$ is —OCO—CH=CH—, $Z^3$ is —O—, and $Z^4$ is —O—, can be synthesized according to the scheme (2) below.

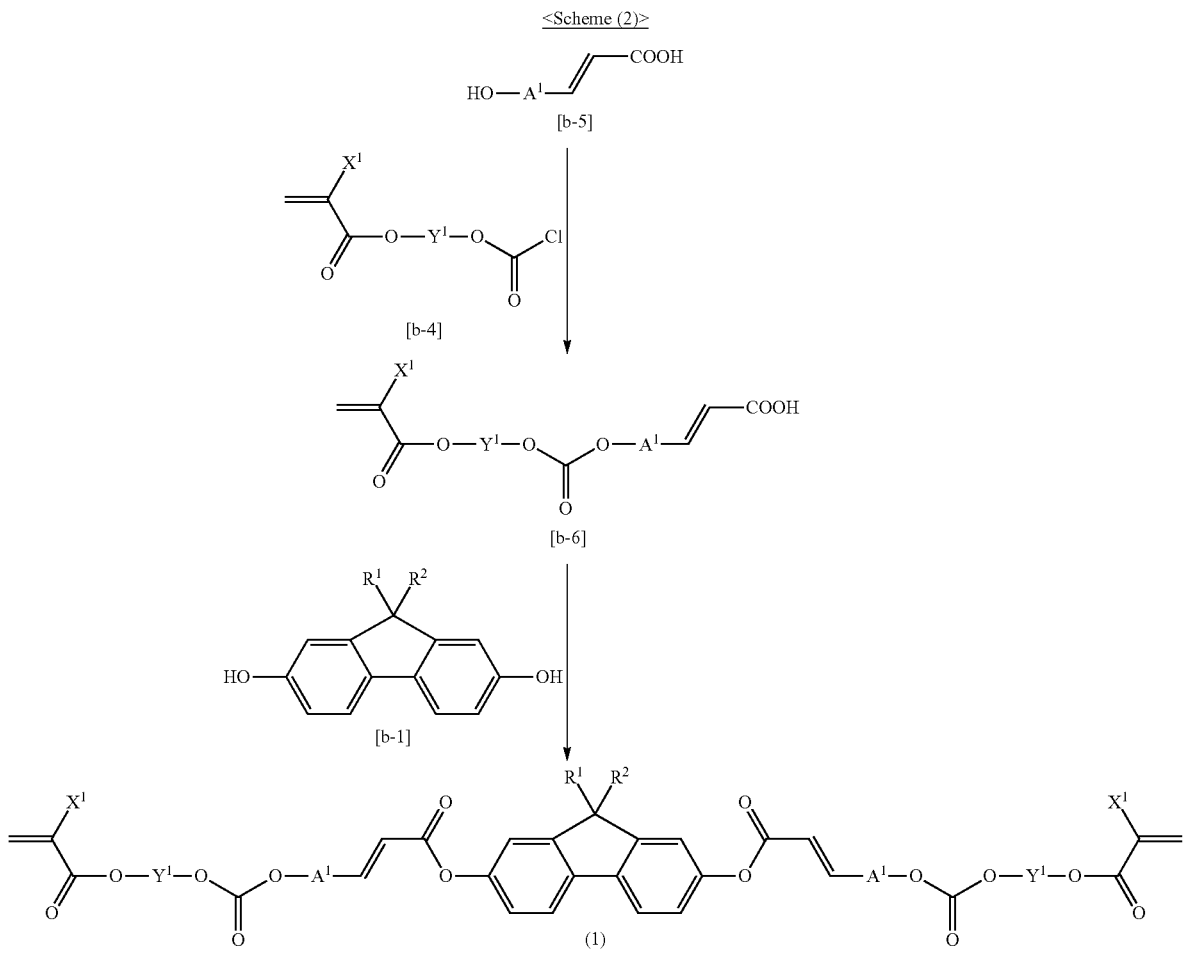

A cinnamic acid derivative [b-5] and a chloroformate derivative [b-4] are reacted with each other to provide a compound [b-6]. 1 equivalent of a 2,7-dihydroxyfluorene derivative [b-1] and 2 equivalent of the compound [b-6] are subjected to esterification with a dehydration condensation agent, such as dicyclohexylcarbodiimide, to synthesize the compound (1). The compound (1), wherein $Z^1$ is —CH$_2$CH$_2$—COO—, $Z^2$ is —OCO—CH$_2$CH$_2$— can be synthesized in the similar manner.

The compound (1), wherein $Z^1$ and $Z^2$ each are —C≡C—, $Z^3$ is —O—, and $Z^4$ is —O—, can be synthesized according to the scheme (3) below.

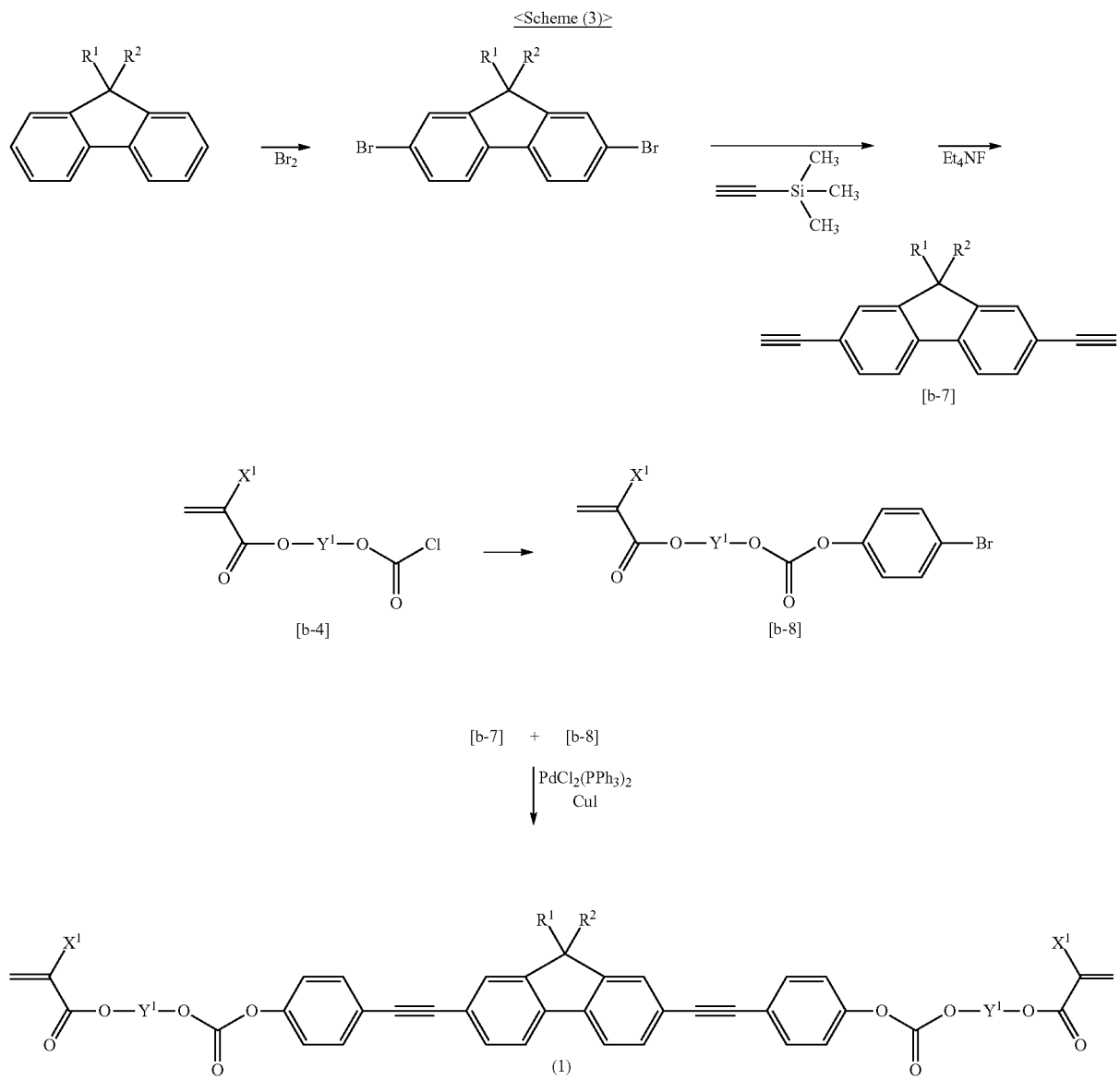
The compound (1), wherein $Z^1$ is —COO—, $Z^2$ is —OCO—, $Z^3$ is a single bond, and $Z^4$ is a single bond, can be synthesized according to the scheme (4) below.
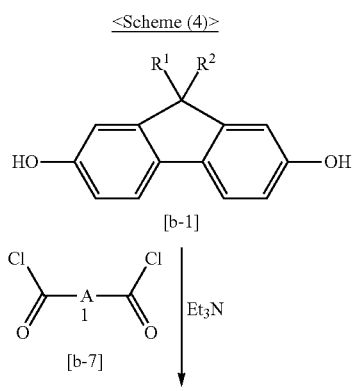

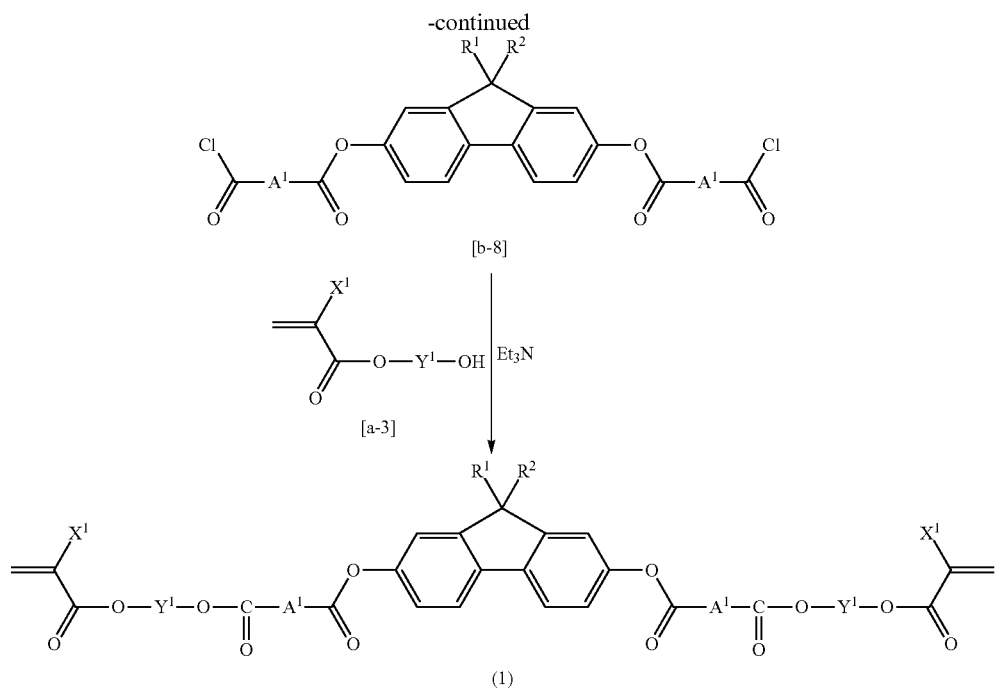

1 equivalent of a 2,7-dihydroxyfluorene derivative [b-1] and 2 equivalent of an acid chloride derivative are subjected to esterification in the presence of a basic catalyst in toluene or tetrahydrofuran to provide a diester [b-8]. Examples of the basic catalyst used include triethylamine, pyridine and dimethylaniline. [b-8] and the aforementioned [a-3] are subjected to esterification reaction to synthesize the compound (1). In the reaction of [b-1] and [b-7], plural kinds of [b-7] having different groups for $A^1$ may be used as a mixture. As a result, a mixture of plural kinds of [b-8], which are different compounds, is obtained, but the advantages of the invention is not influenced thereby. In the reaction of [b-8] and [a-3], plural kinds of [a-3] having different groups for $X^1$ and/or $Y^1$ may be used as a mixture because of the same reason as in the case where plural kinds of [b-7] are used as a mixture.

Examples of the compound (1) that can be synthesized are shown below.

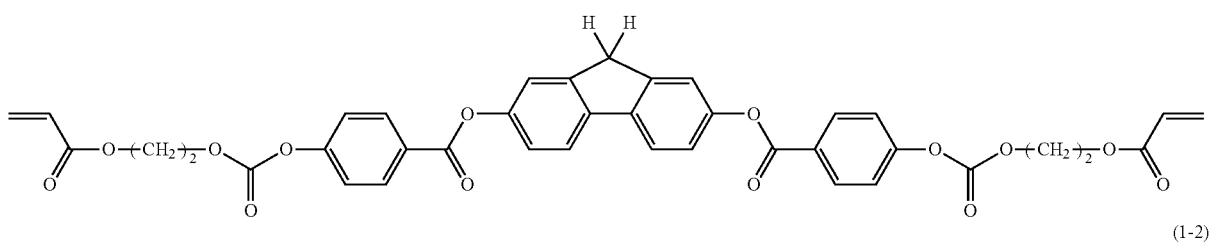

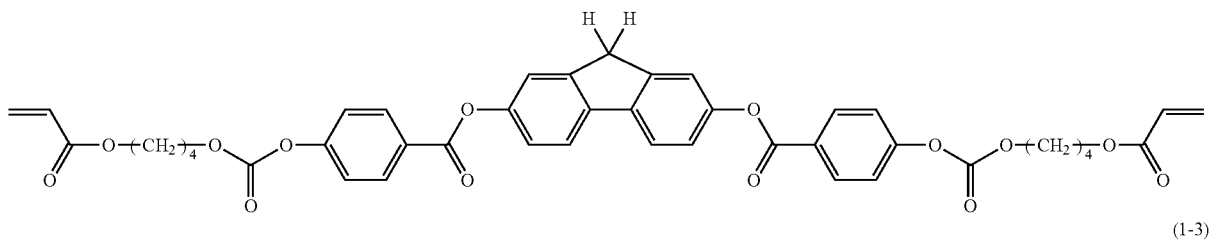

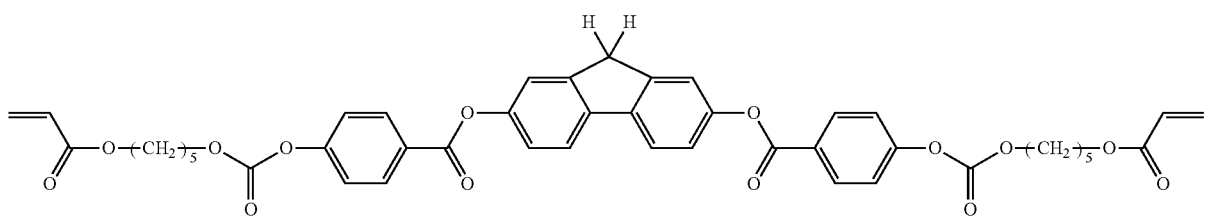

(1-4)
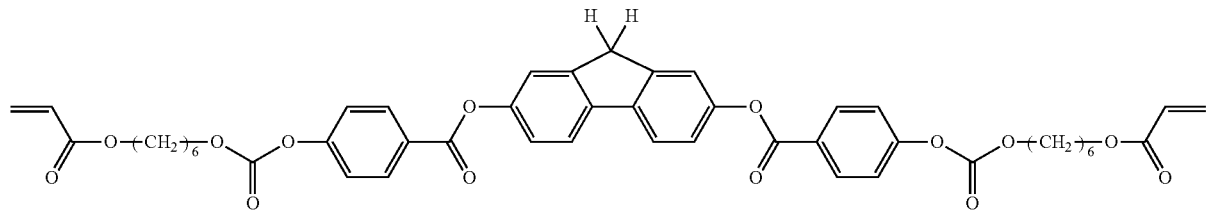
(1-5)
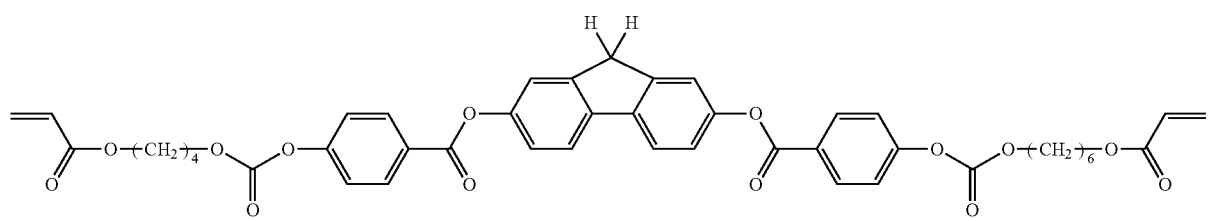
(1-6)
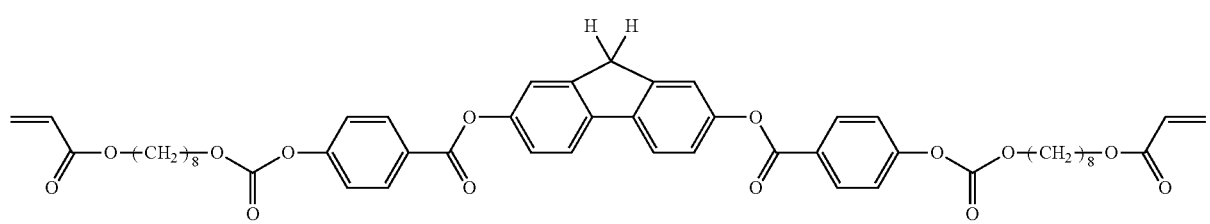
(1-7)
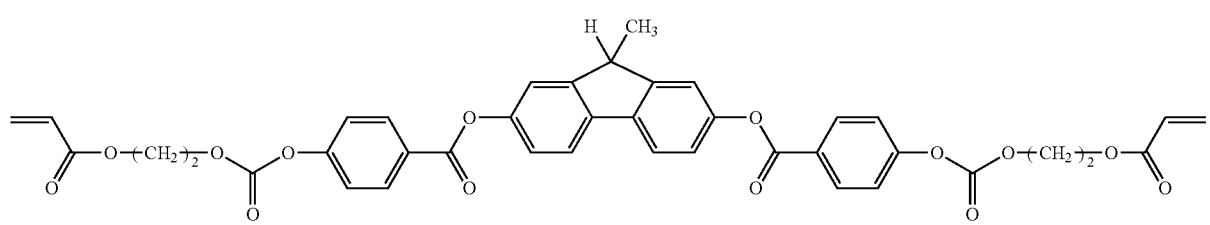
(1-8)
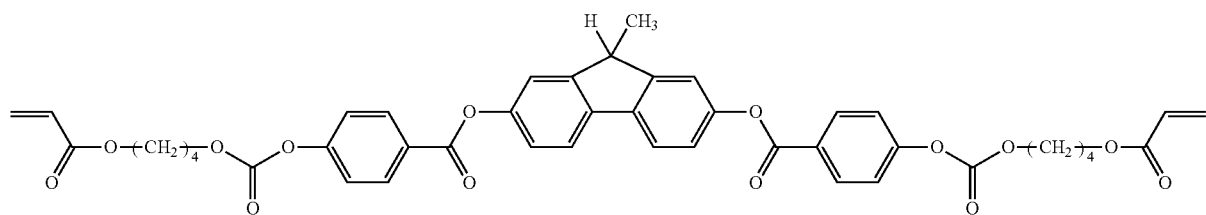
(1-9)
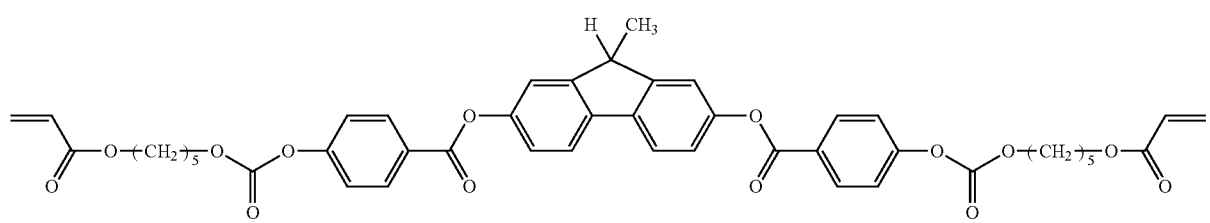

(1-10)
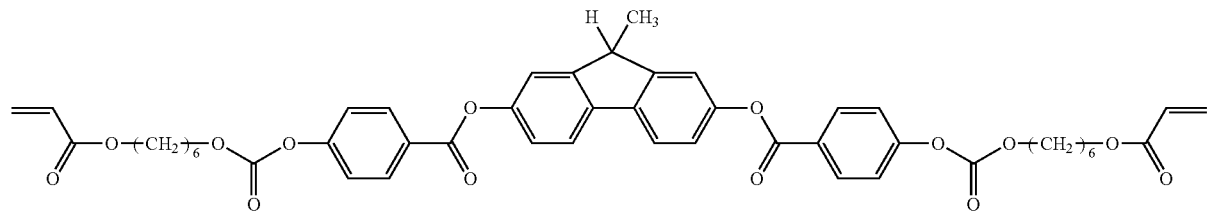
(1-11)
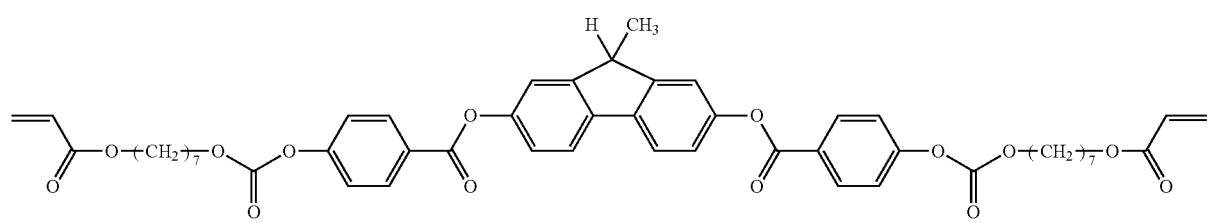
(1-12)
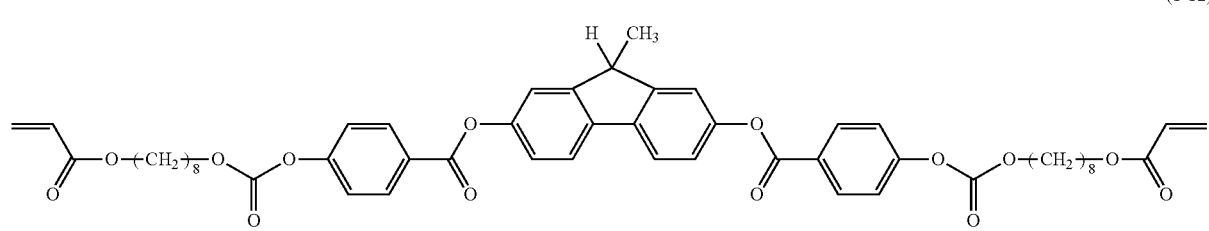
(1-13)
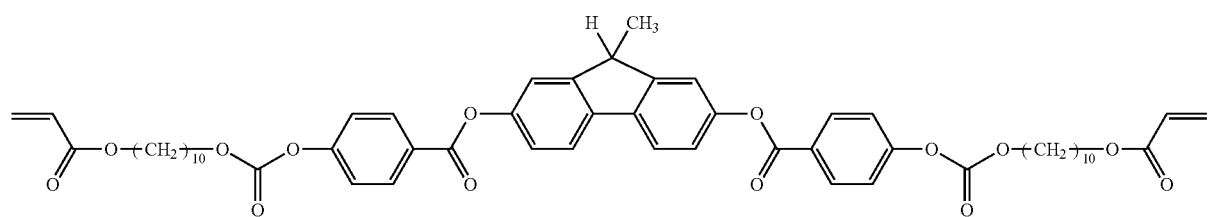
(1-14)
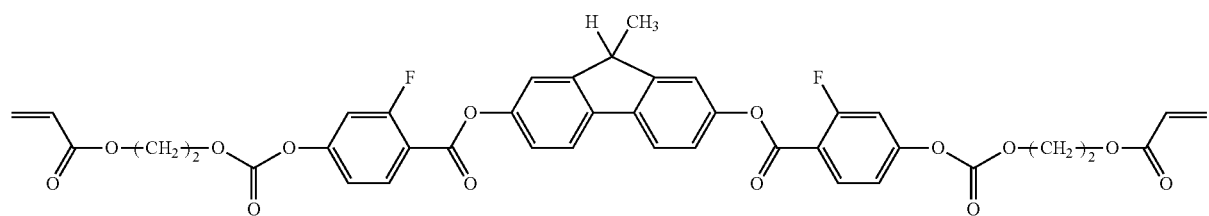
(1-15)
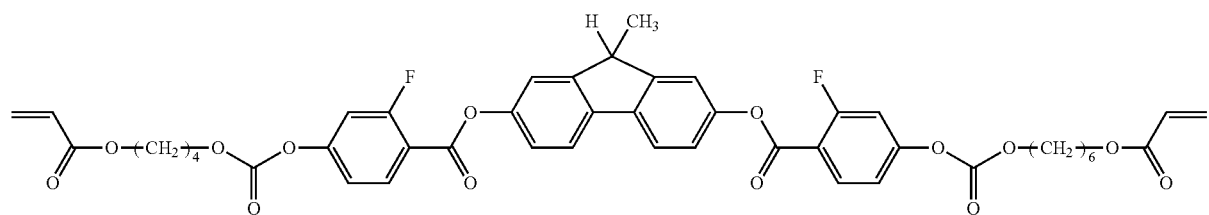

(1-16)
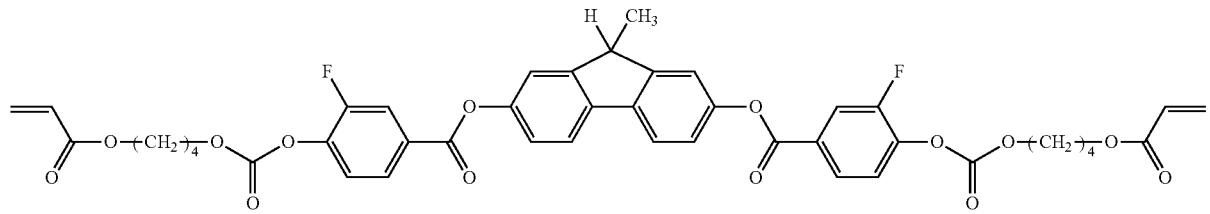
(1-17)
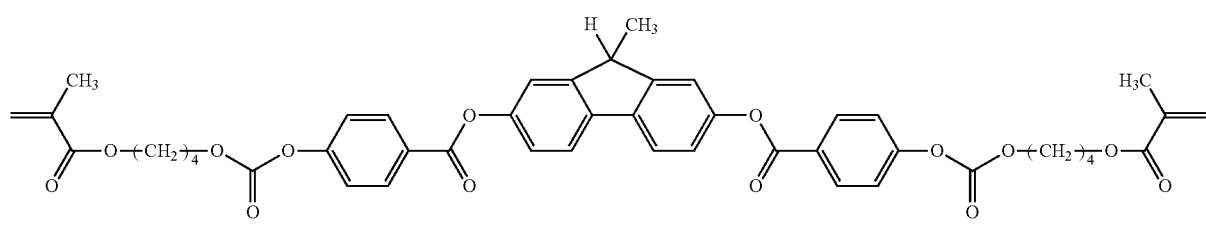
(1-18)
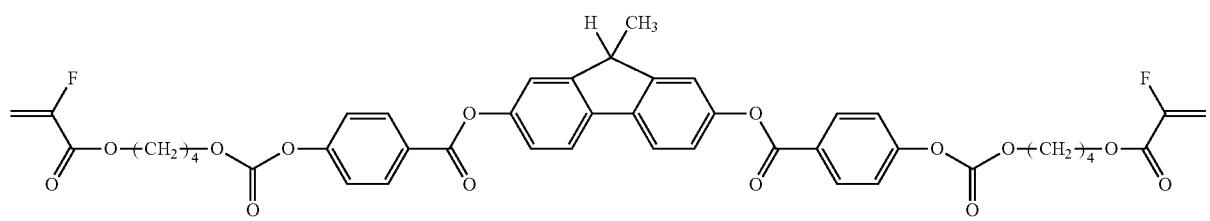
(1-19)
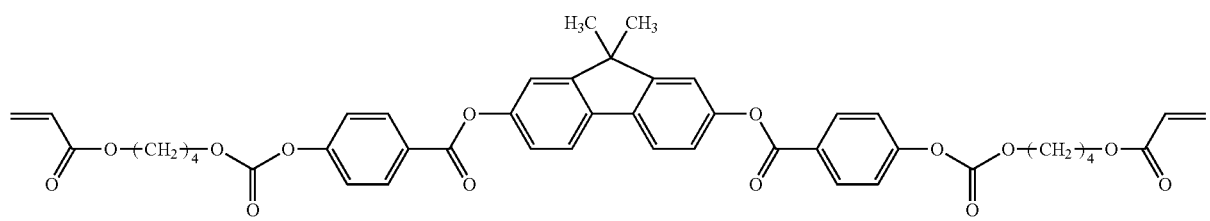
(1-20)
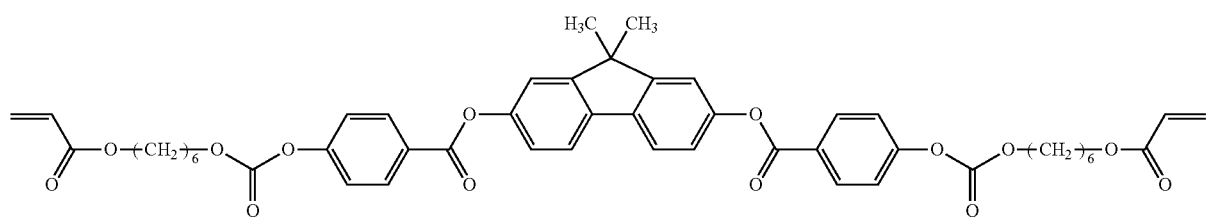
(1-21)
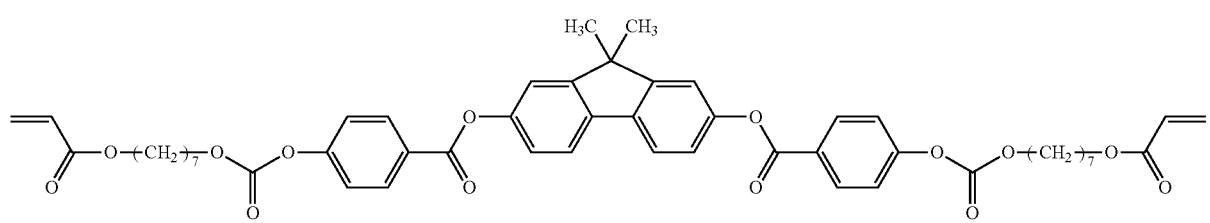

-continued
(1-22)
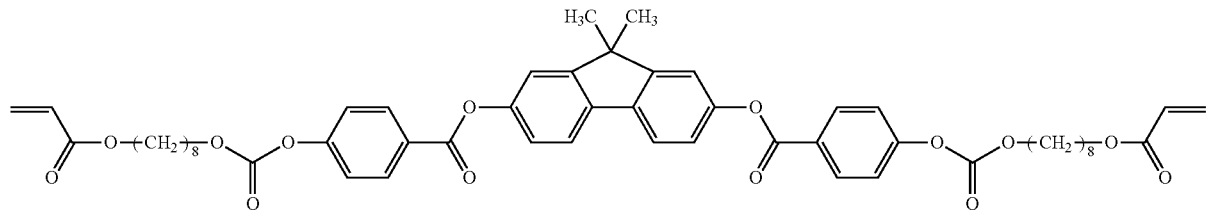
(1-23)
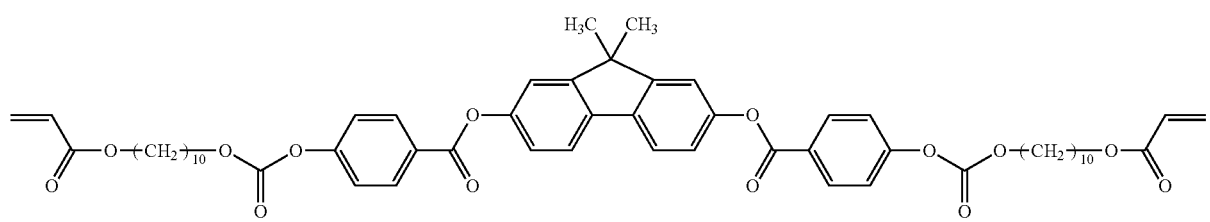
(1-24)
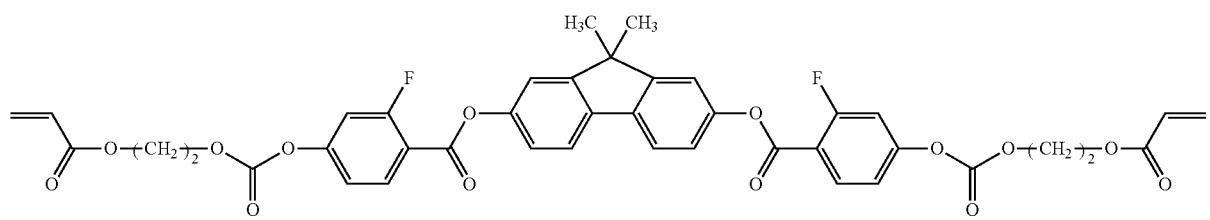
(1-25)
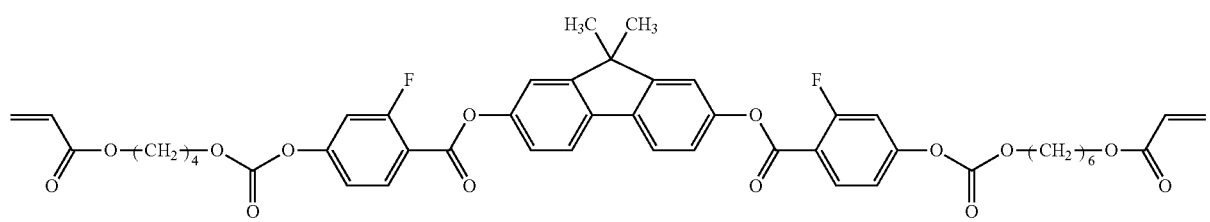
(1-26)
(1-27)
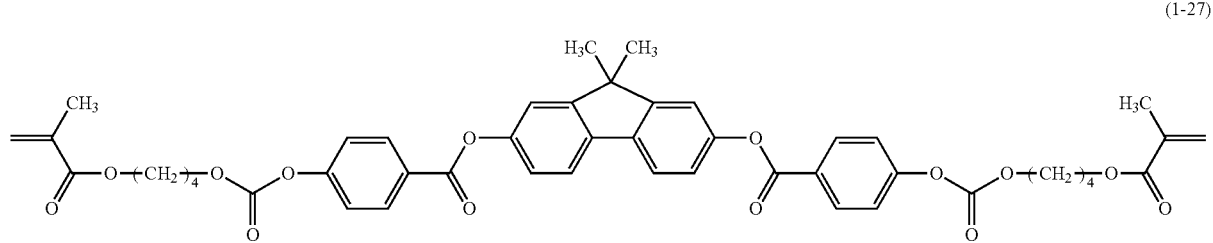

-continued
(1-28)
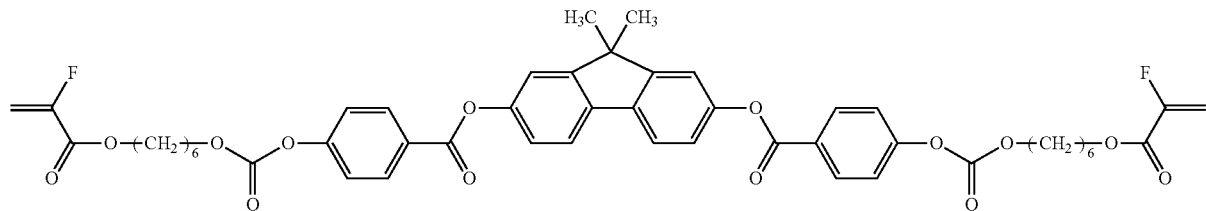
(1-29)
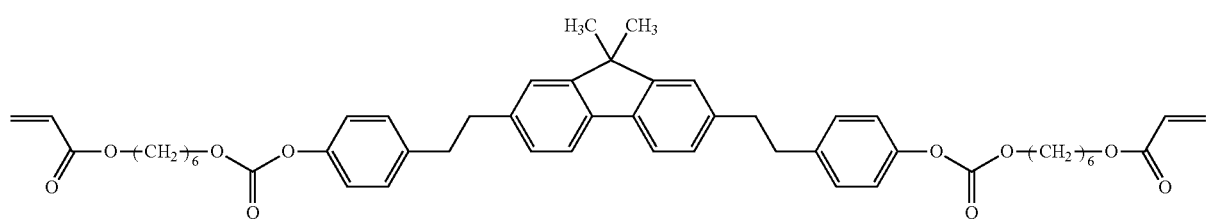
(1-30)
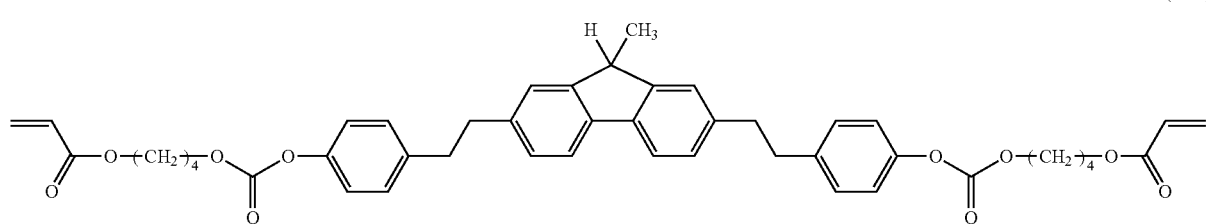
(1-31)
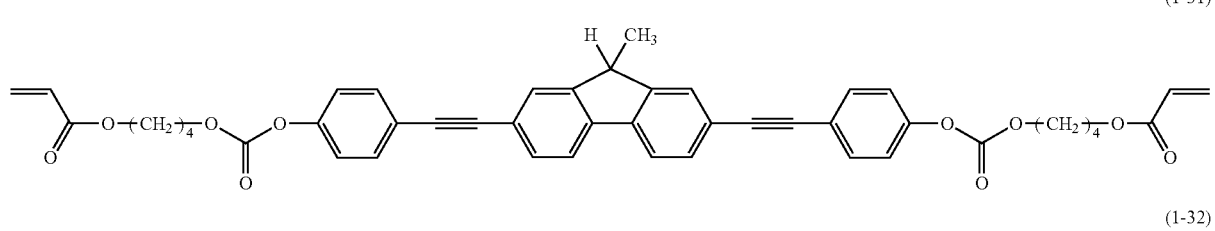
(1-32)
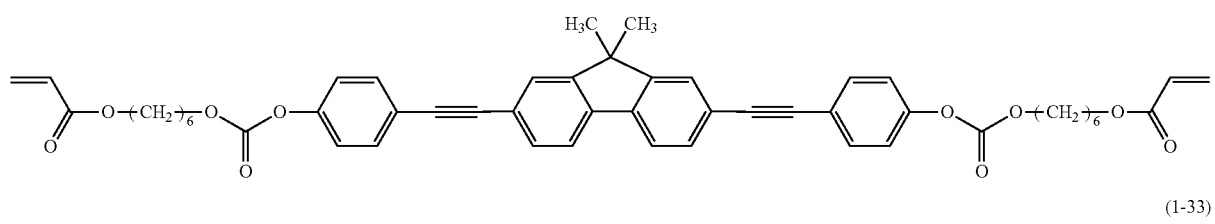
(1-33)
(1-34)
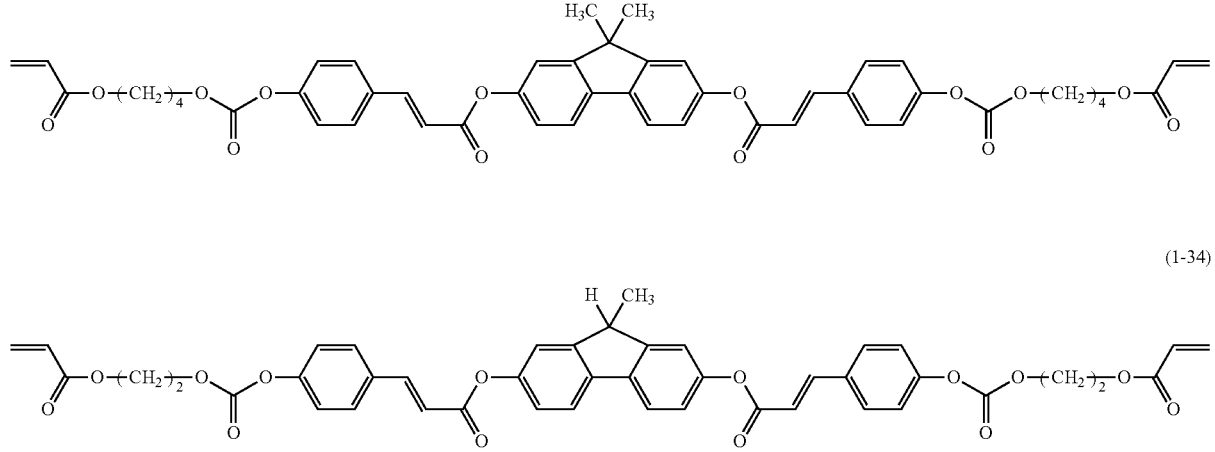

-continued
(1-35)
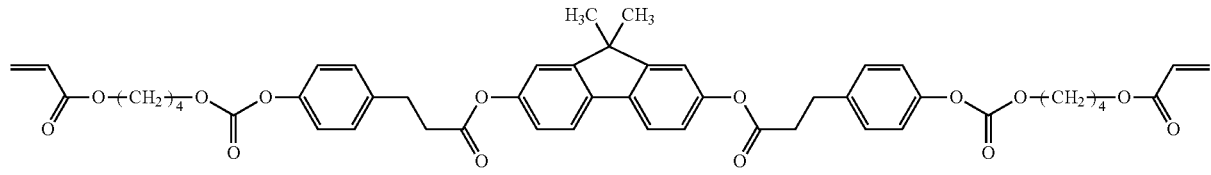
(1-36)
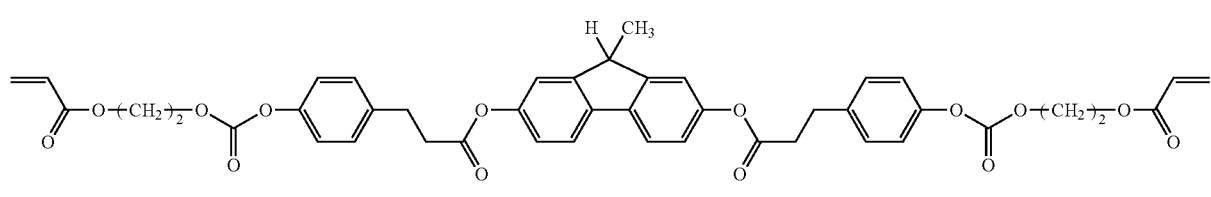
(1-37)
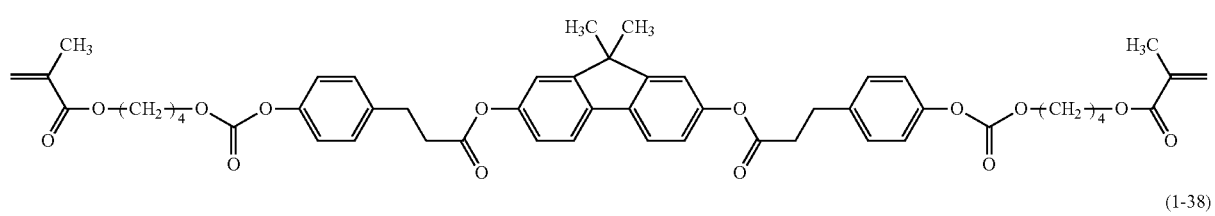
(1-38)
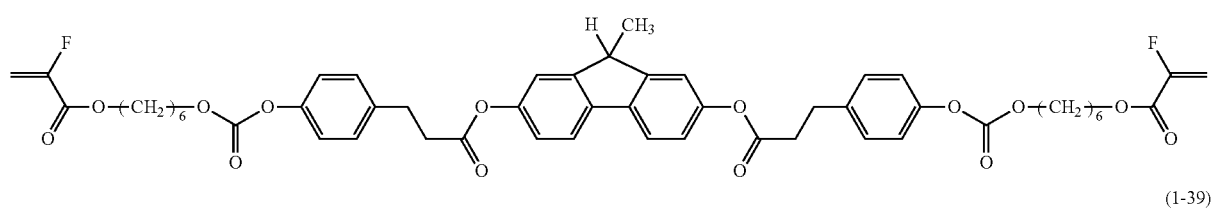
(1-39)
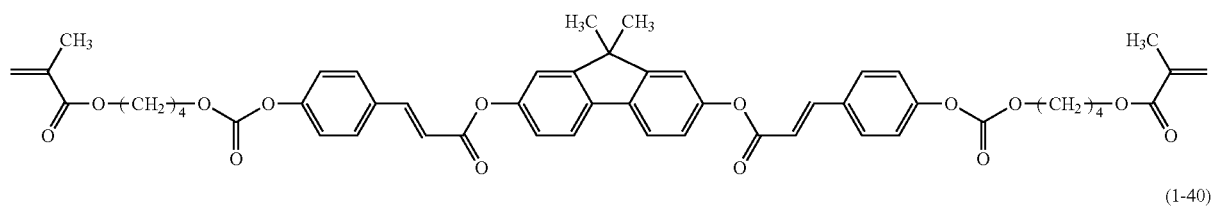
(1-40)
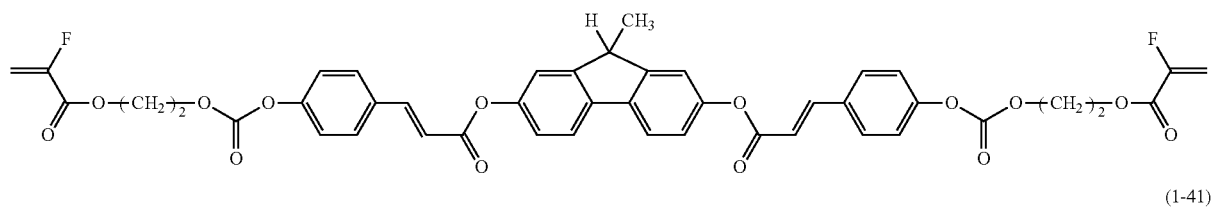
(1-41)
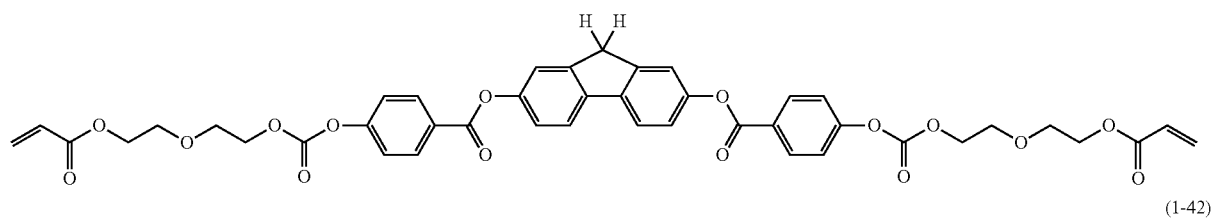
(1-42)
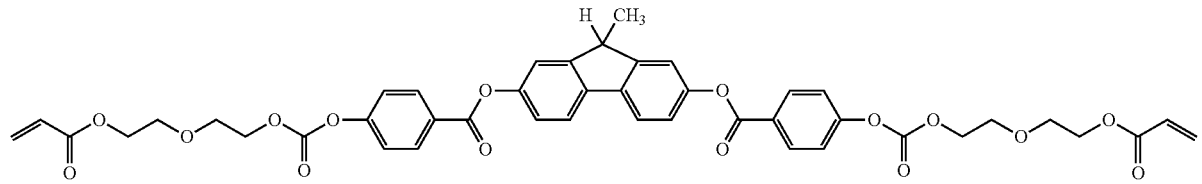

(1-43)
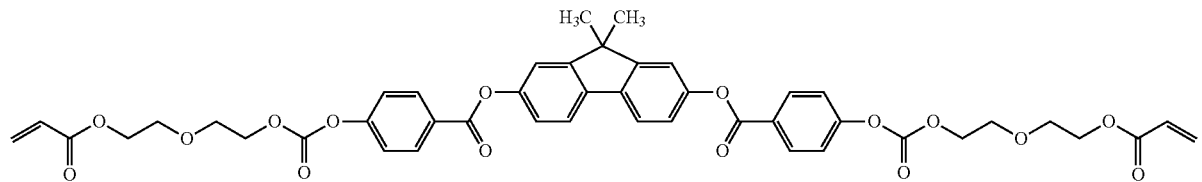
(1-44)
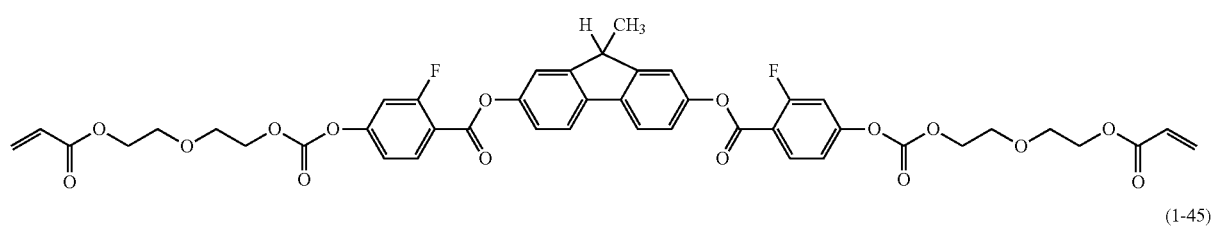
(1-45)
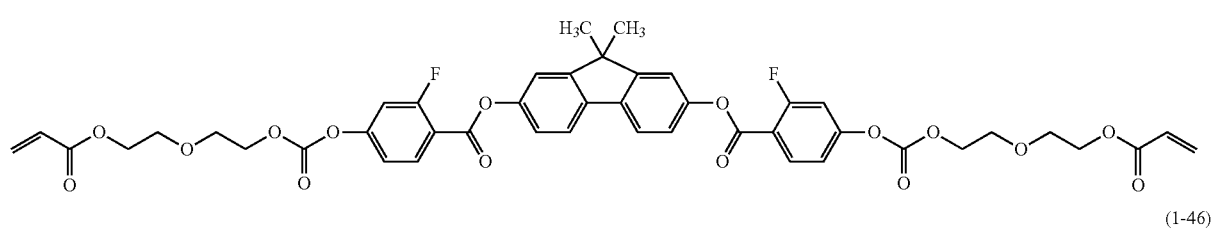
(1-46)
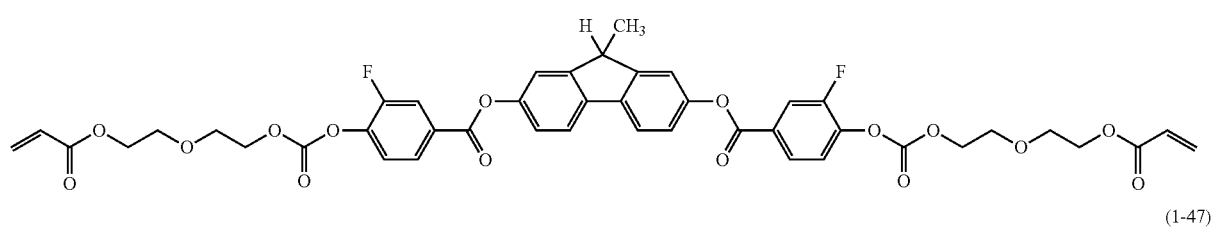
(1-47)
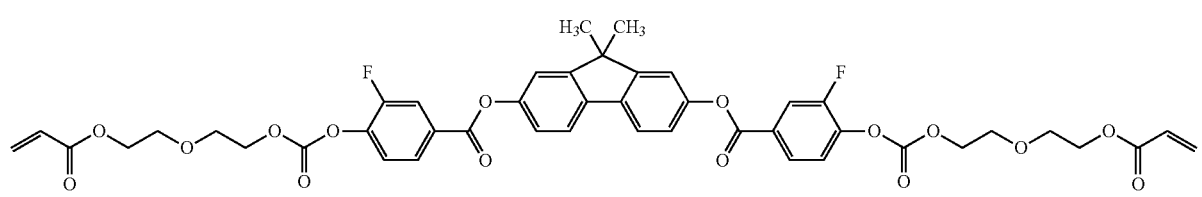
(1-48)
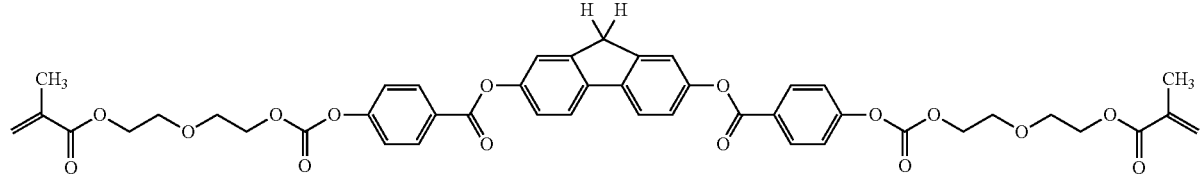
(1-49)
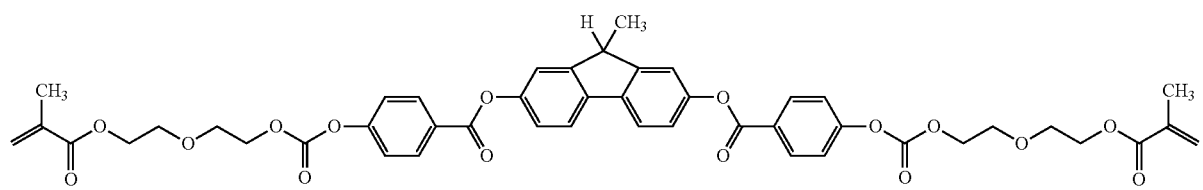

-continued
(1-50)
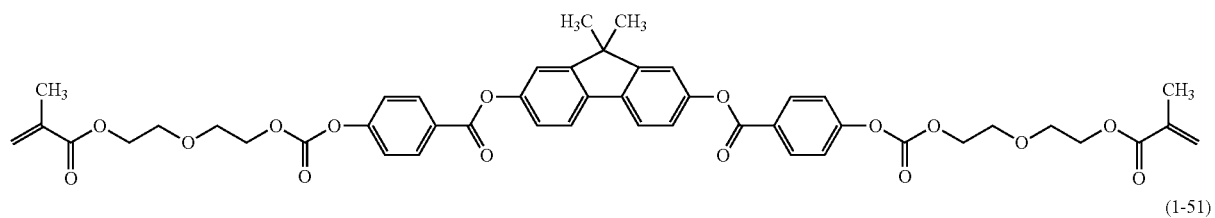
(1-51)
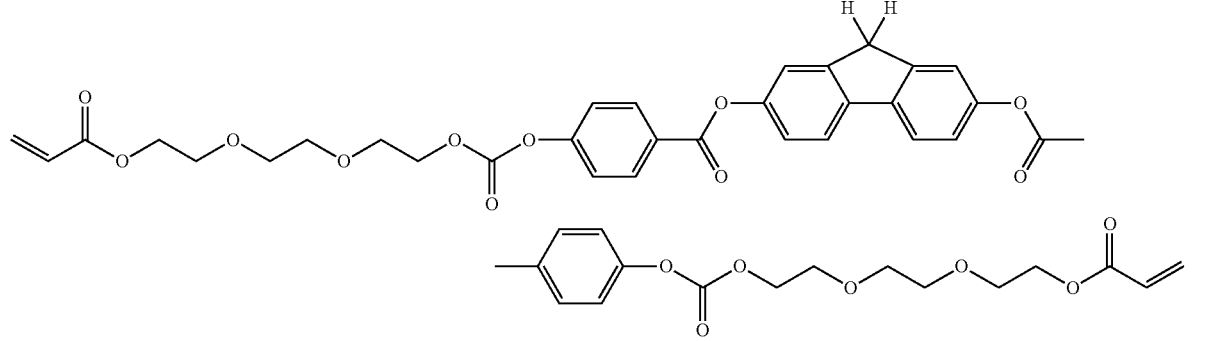
(1-52)
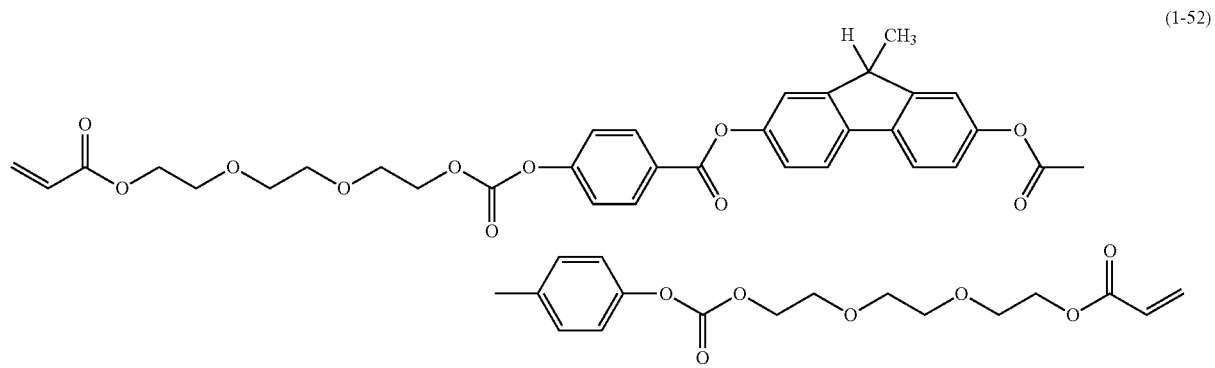
(1-53)
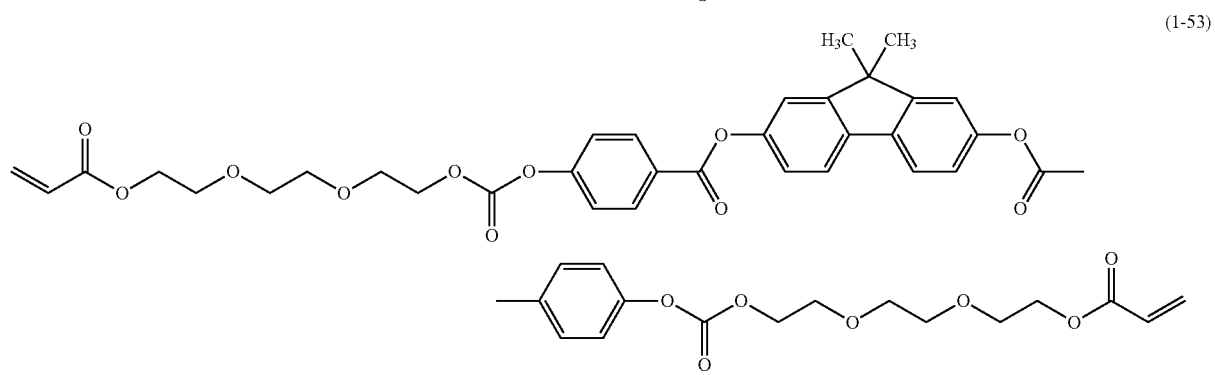
(1-54)
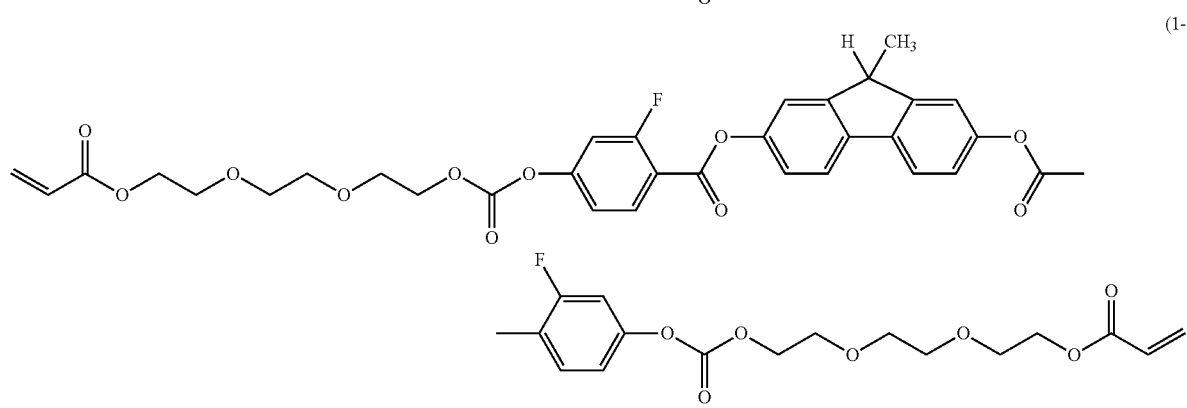

-continued
(1-55)
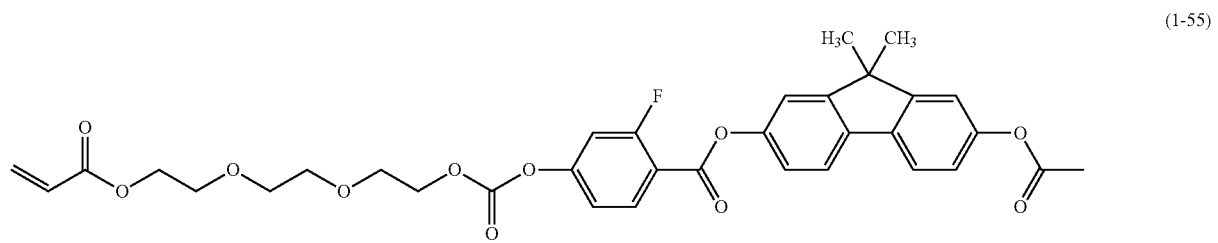
(1-56)
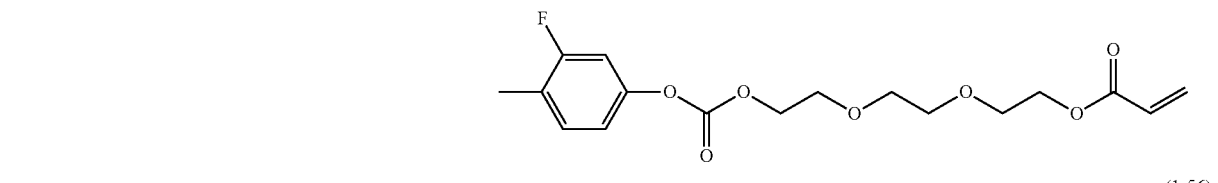
(1-57)
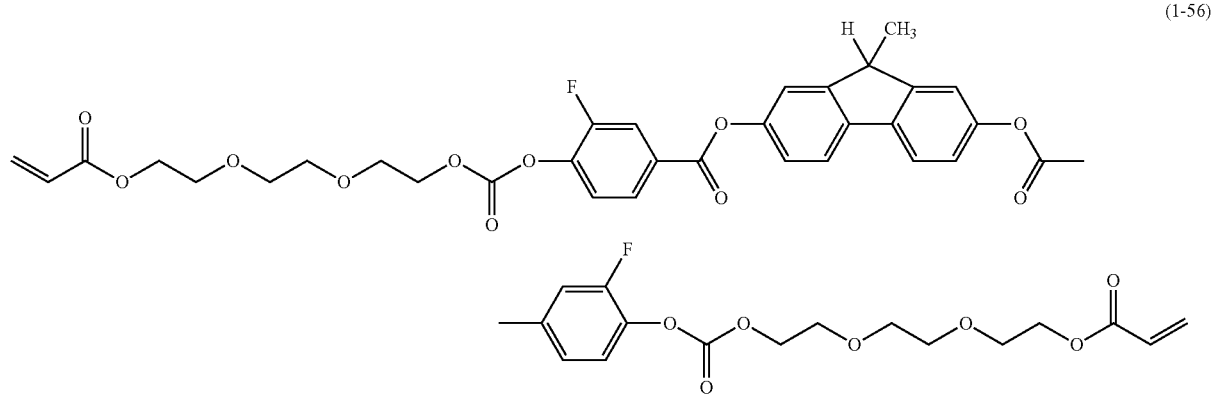
(1-58)
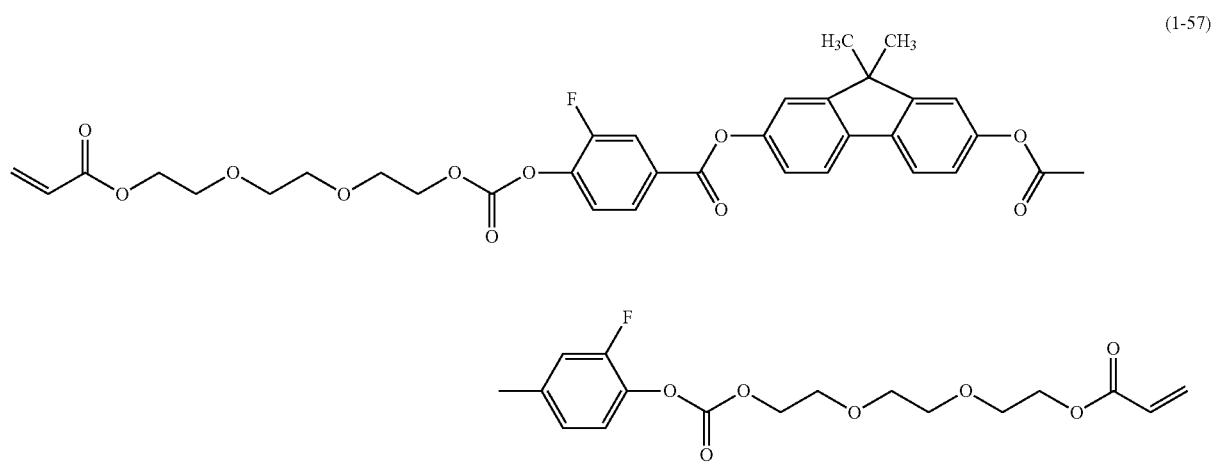

-continued
(1-59)
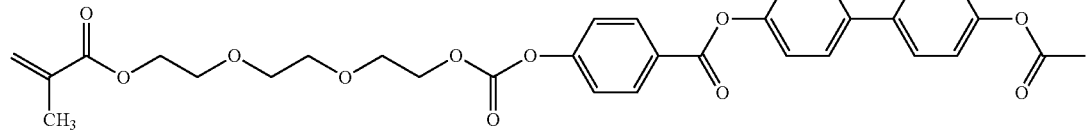
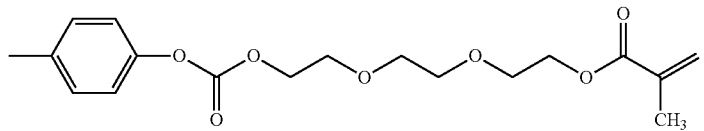
(1-60)
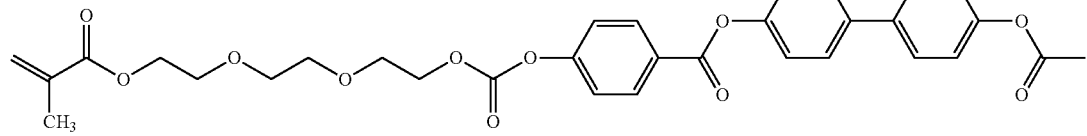
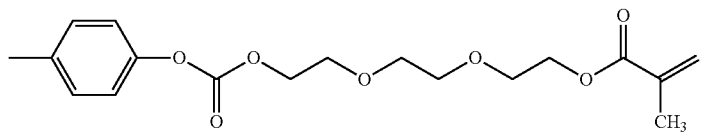
(1-61)
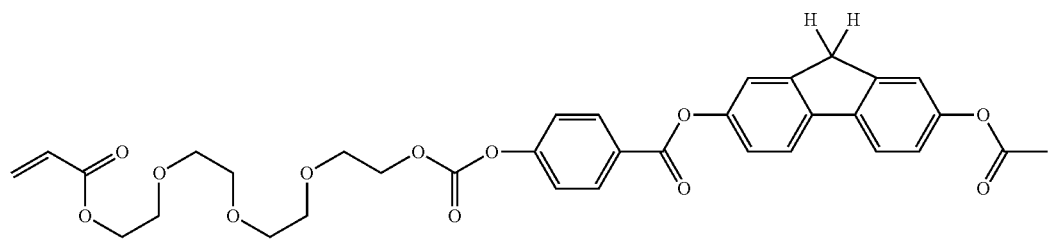
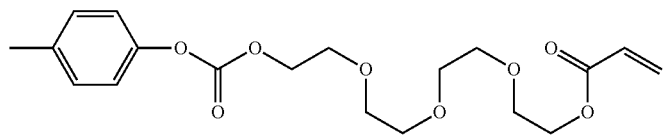
(1-62)
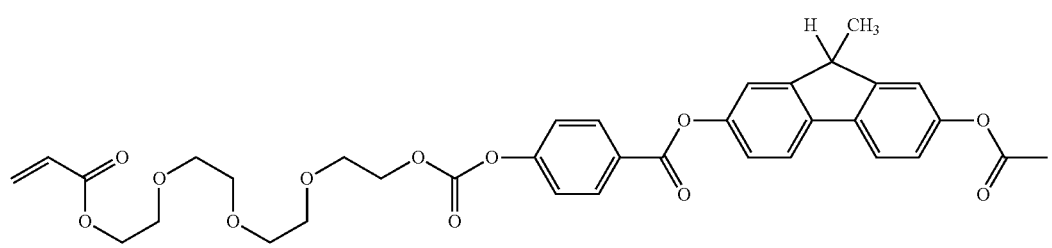
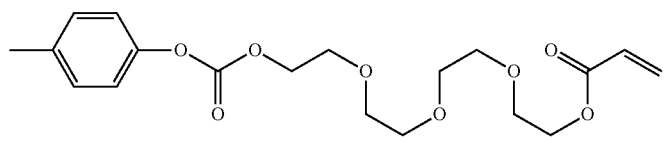

(1-63)
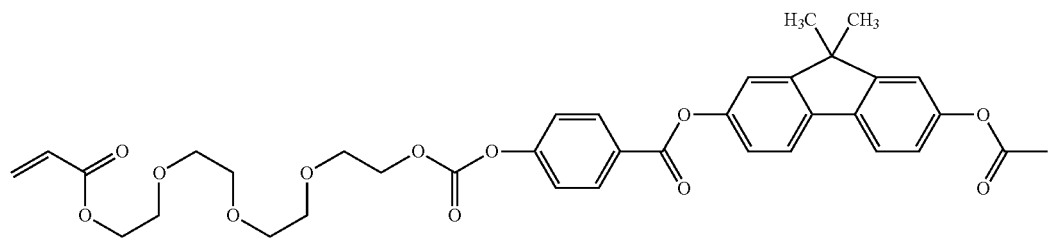
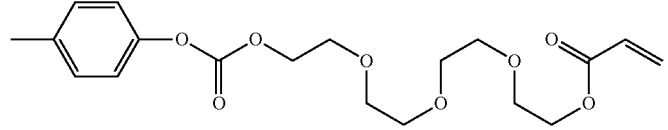
(1-64)
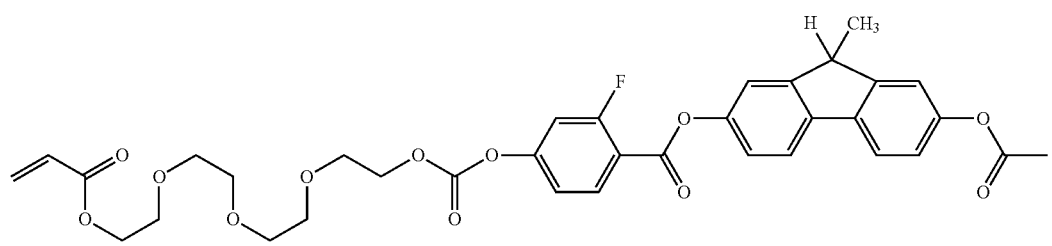
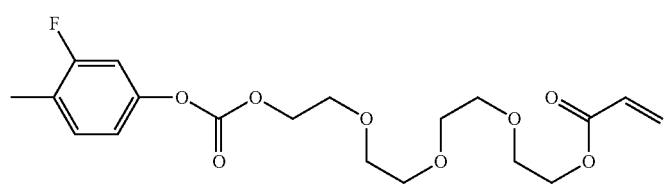
(1-65)
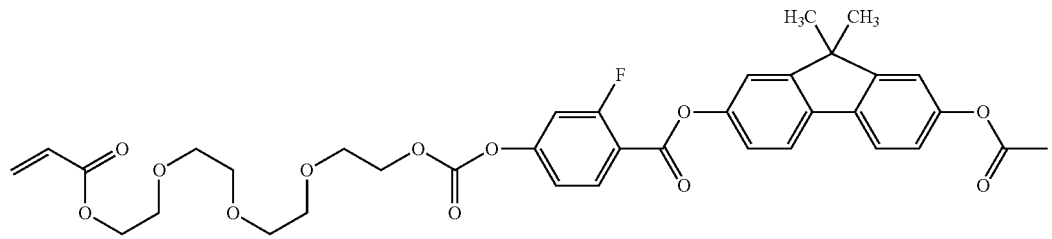
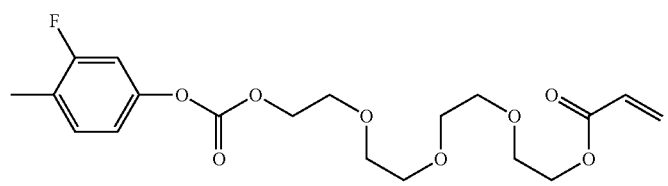
(1-66)
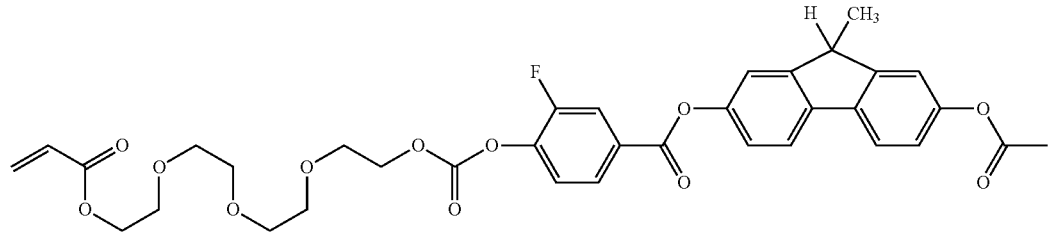
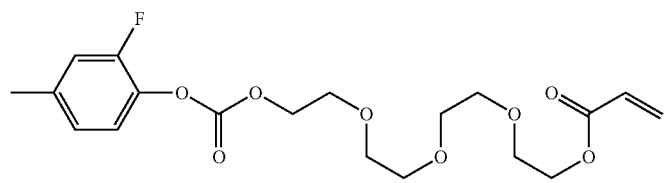

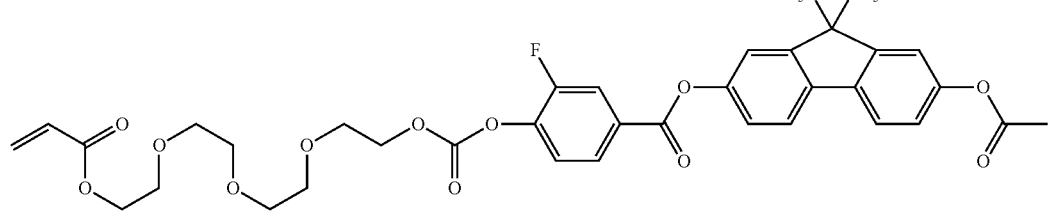
(1-67)
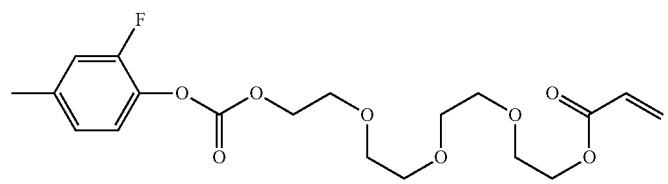
(1-68)
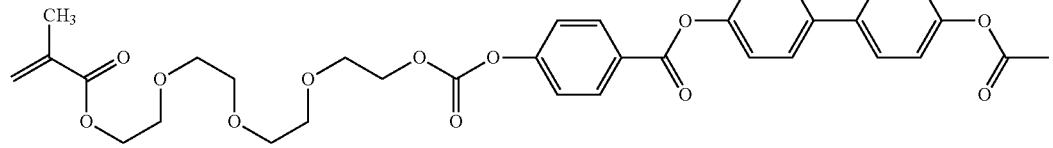
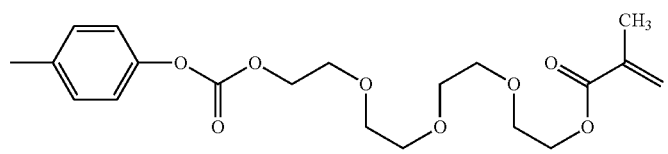
(1-69)
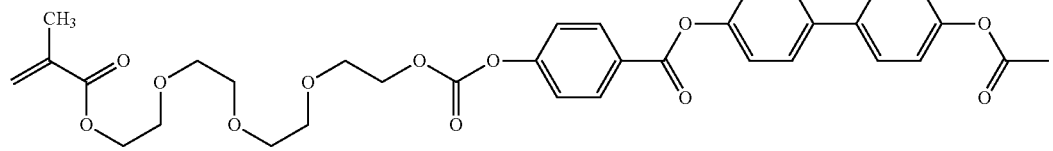
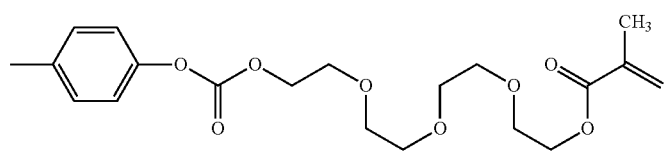
(1-70)
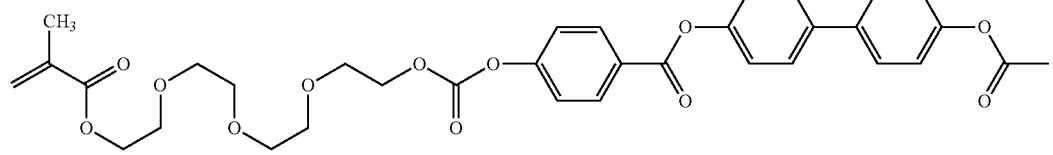
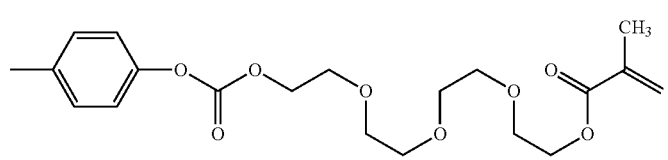

-continued
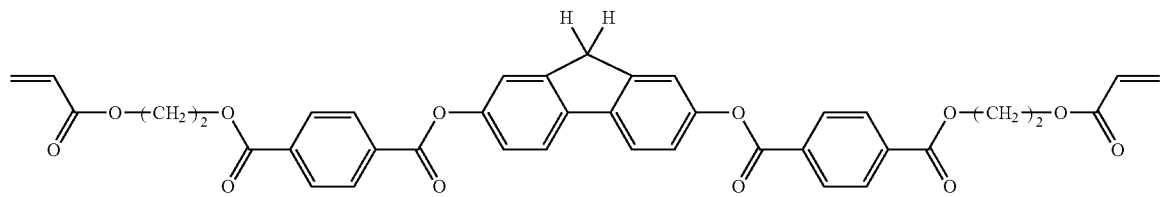
(1-71)
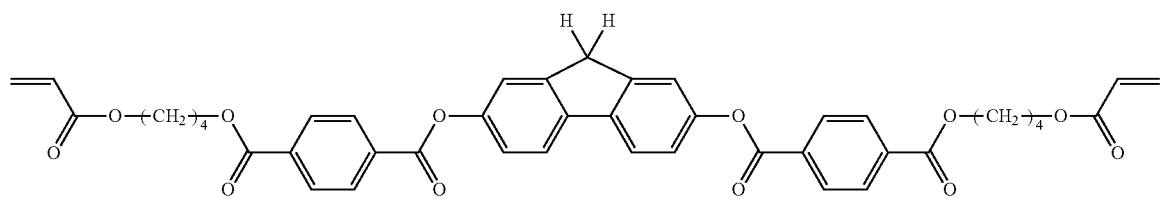
(1-72)
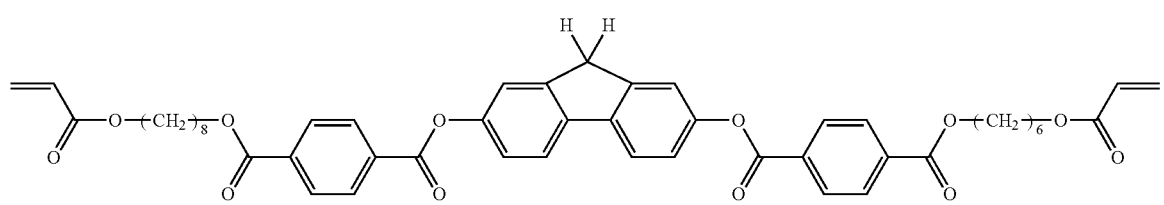
(1-73)
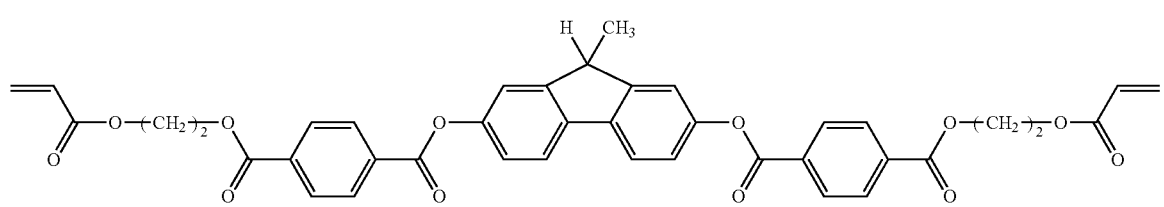
(1-74)
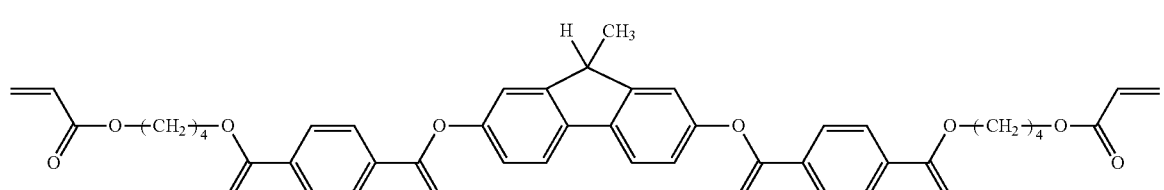
(1-75)
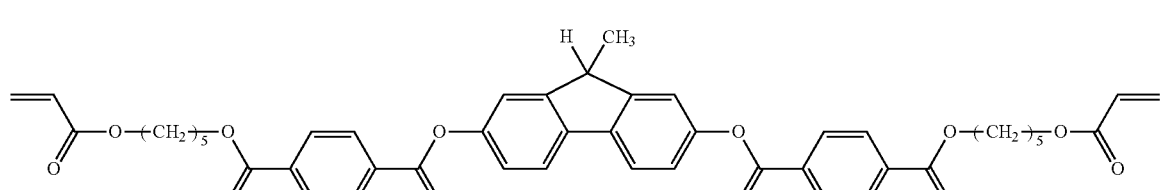
(1-76)
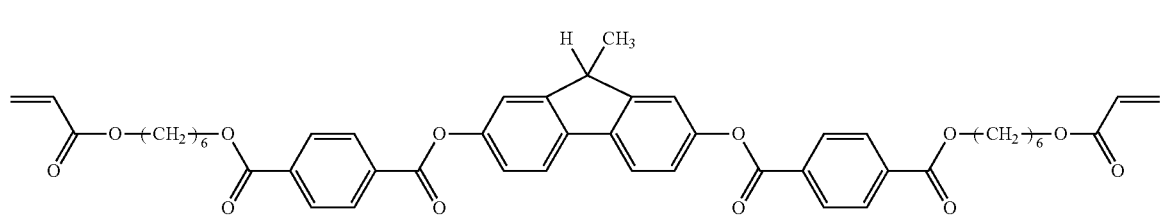
(1-77)

-continued
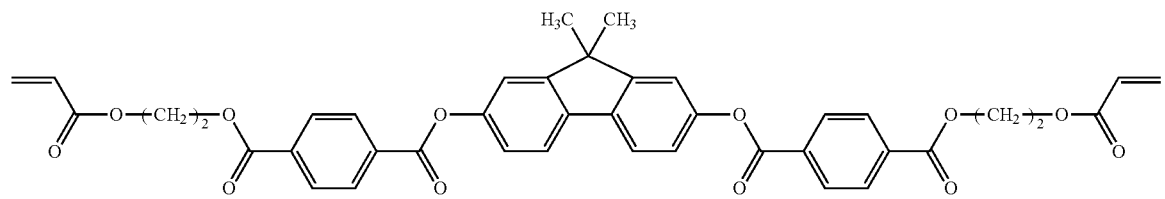
(1-78)
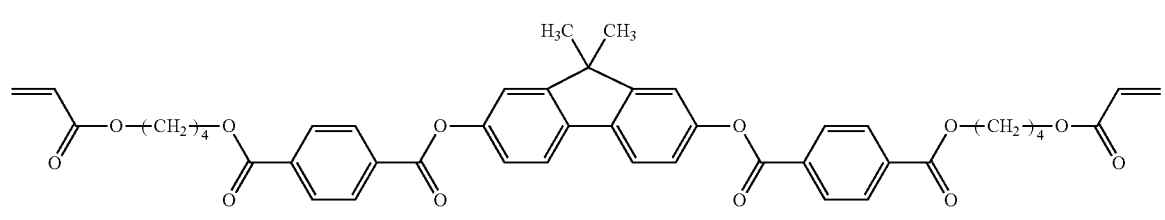
(1-79)
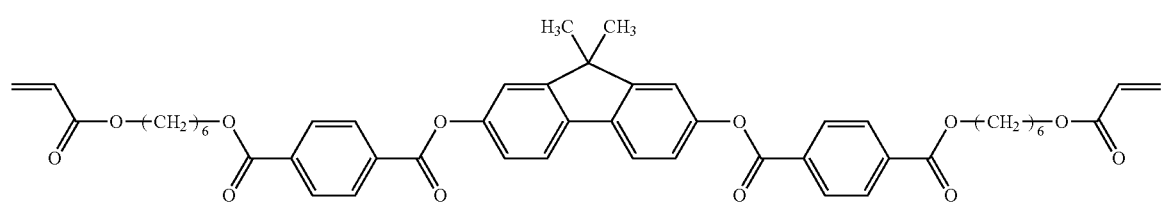
(1-80)
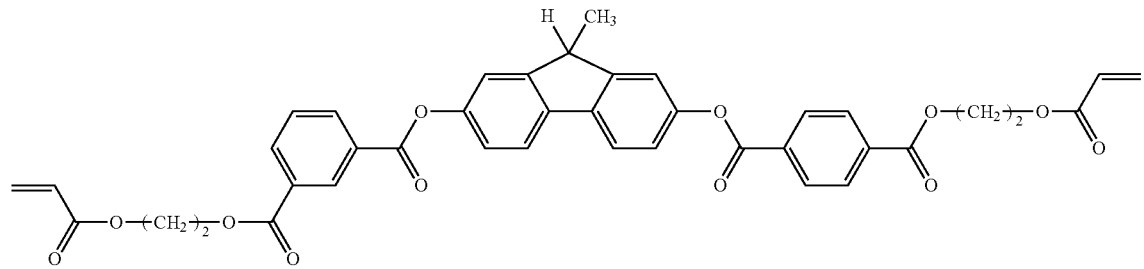
(1-81)
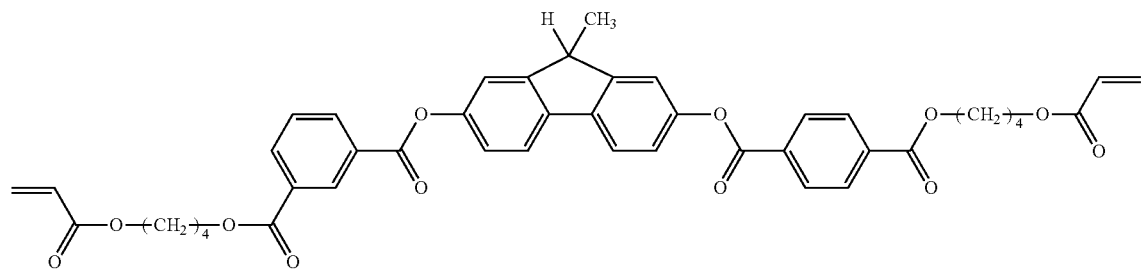
(1-82)
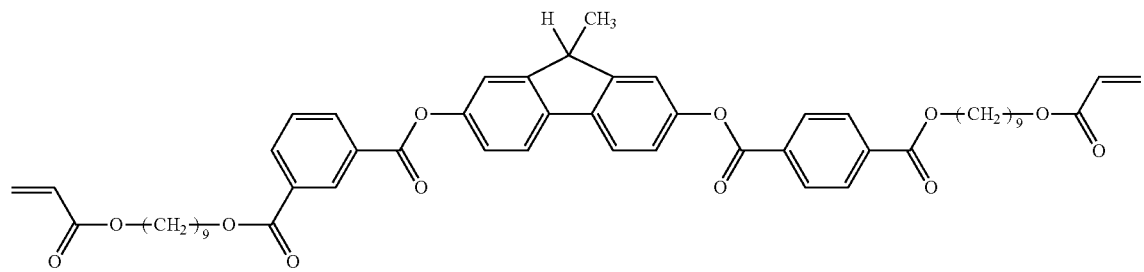
(1-83)

-continued
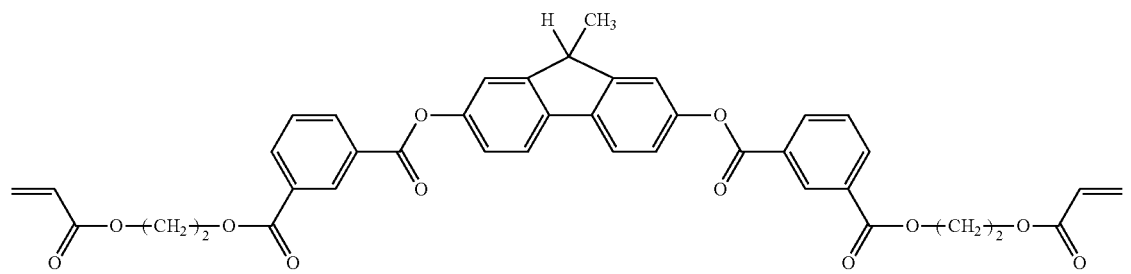
(1-84)
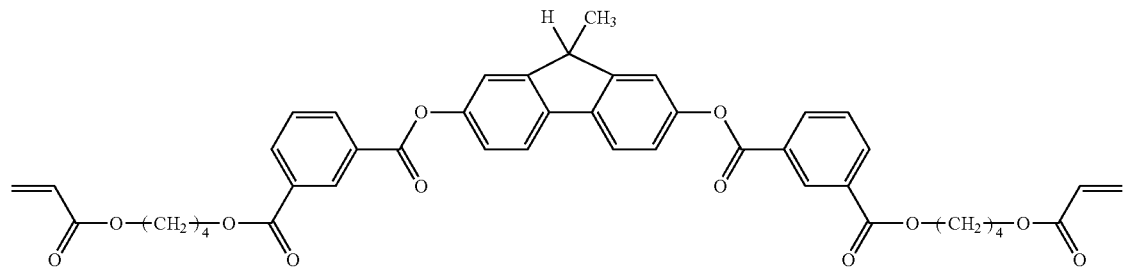
(1-85)
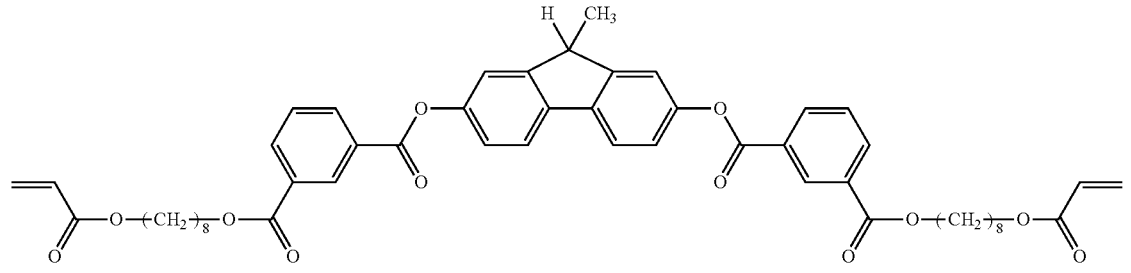
(1-86)
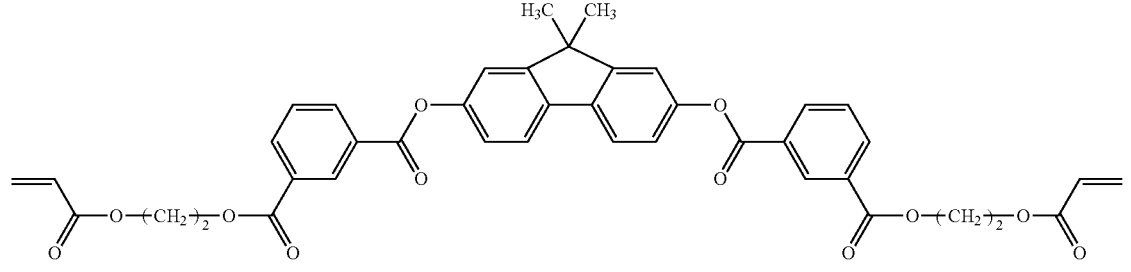
(1-87)
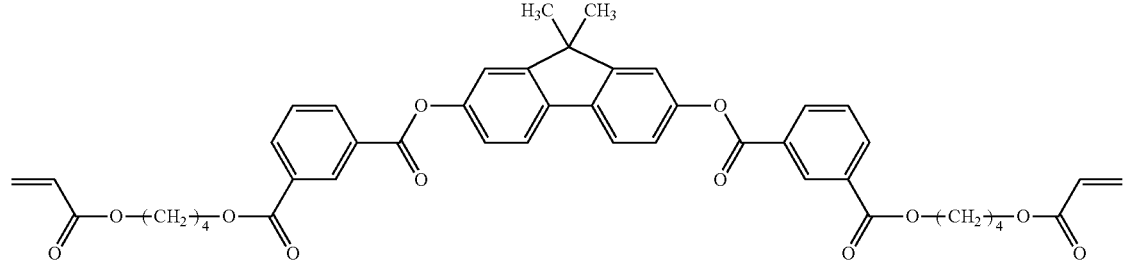
(1-88)
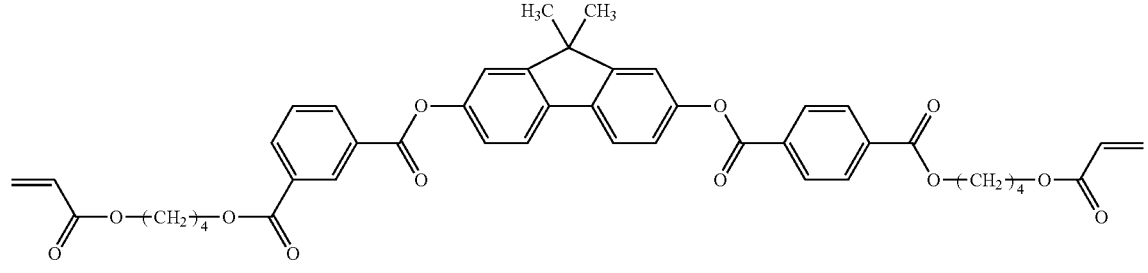
(1-89)

(1-90)
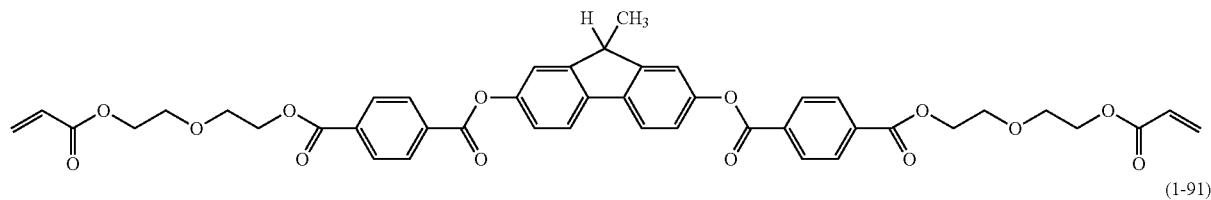
(1-91)
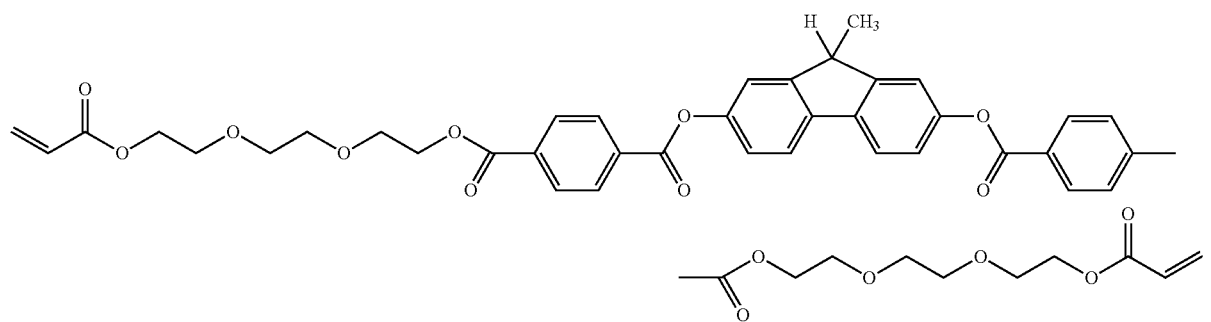
(1-92)
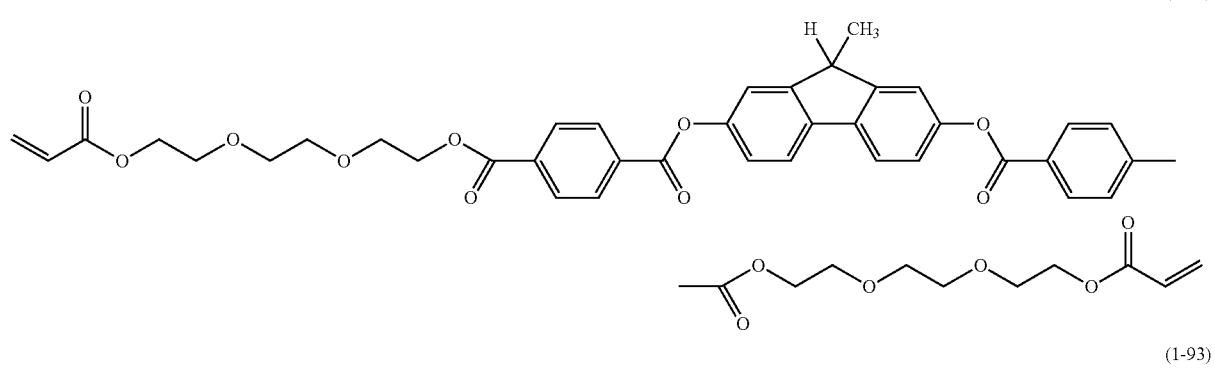
(1-93)
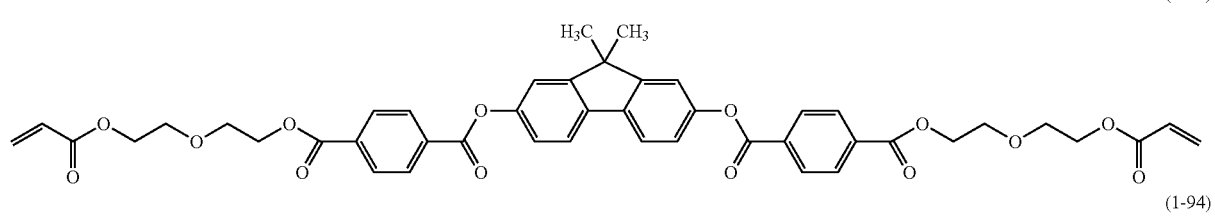
(1-94)
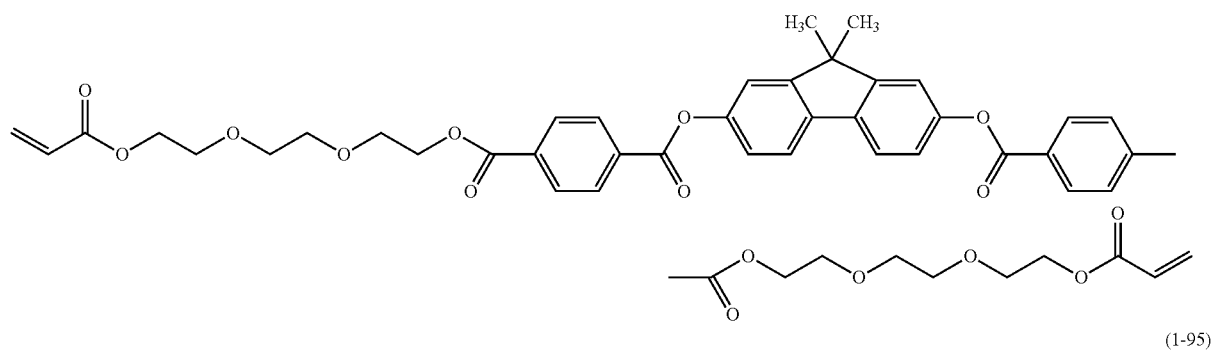
(1-95)
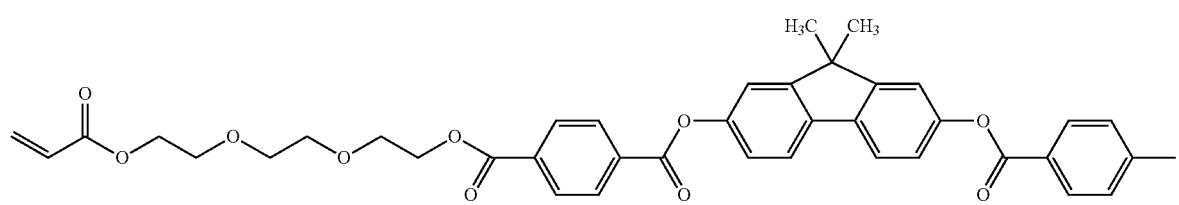

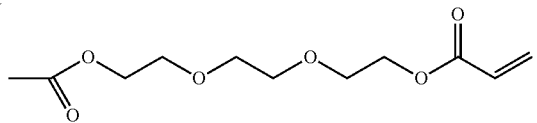

The polymerizable liquid crystal composition of the invention will be described. The composition of the invention contains at least one of the compound (1) of the invention and at least one compound selected from the group of compounds represented by the formulae (M1), (M2) and (M3).

(M1)

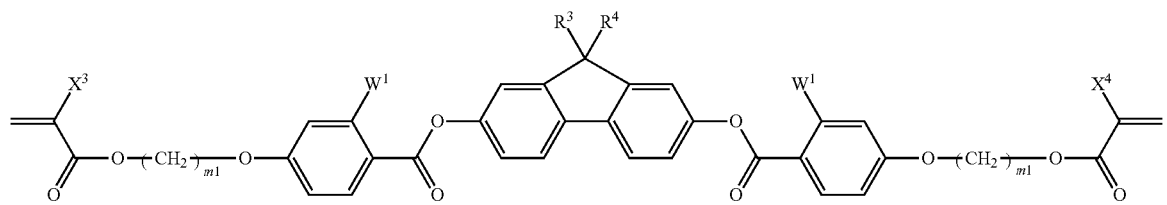

In the formula (M1), $R^3$ and $R^4$ each independently represents hydrogen or methyl. $W^1$ each independently represent hydrogen or fluorine, and preferably the same groups. m1 each independently represent an integer of from 2 to 10, and preferably the same numbers. $X^3$ and $X^4$ each independently represent hydrogen, fluorine or methyl, and preferably hydrogen. The compound (M1) is a bifunctional acrylic compound and has large refractive index anisotropy, and thus used for controlling the refractive index anisotropy of the composition. Particularly preferred examples of the compound (M1) include the compounds (M1-1) to (M1-8). These compounds can be synthesized by the methods disclosed in Patent Document 4 (U.S. Pat. No. 6,824,709).

(M1-1)

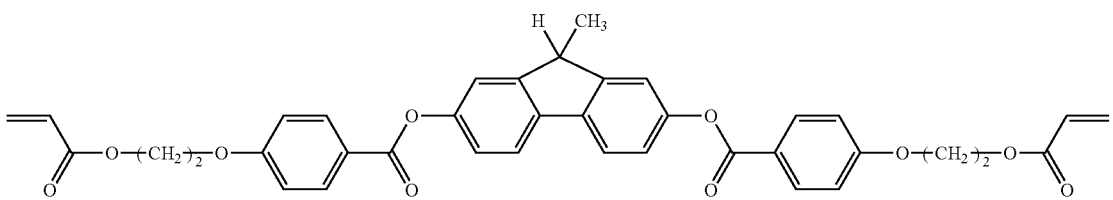

(M1-2)

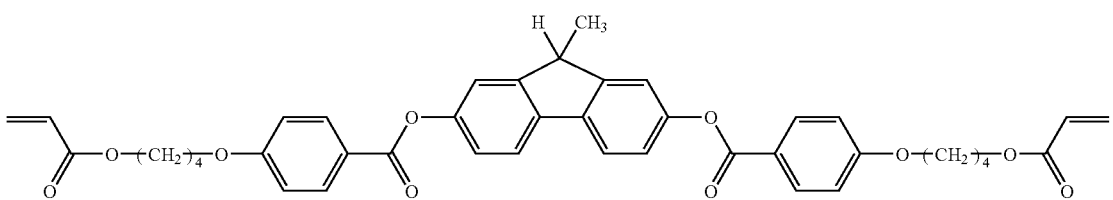

(M1-3)

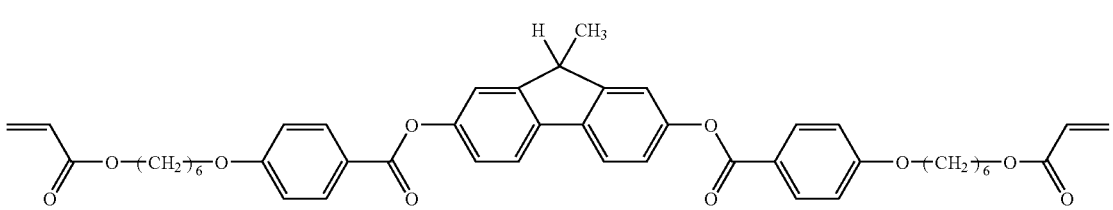

(M1-4)

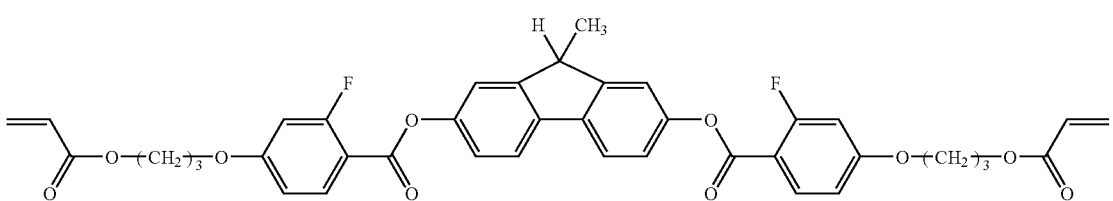

(M1-5)
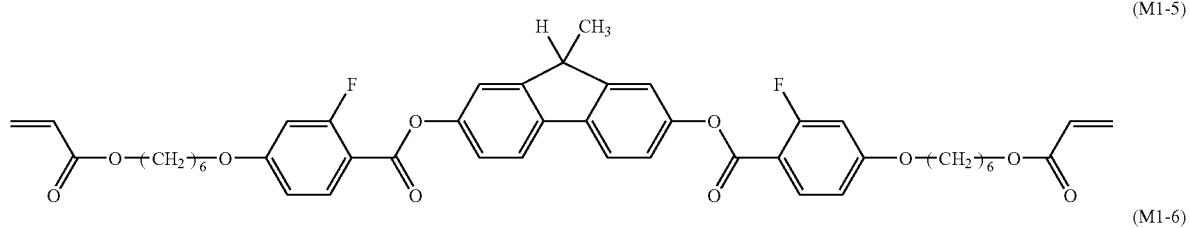

(M1-6)
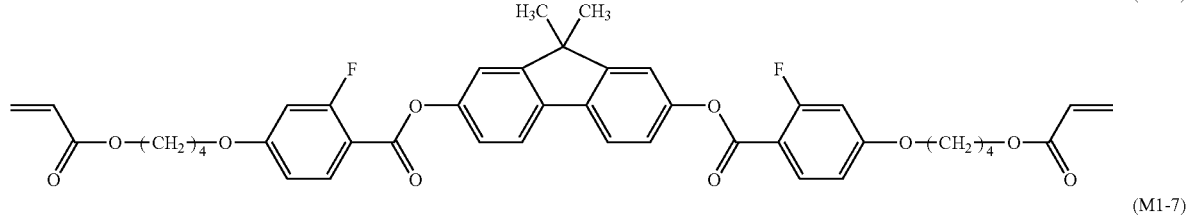

(M1-7)
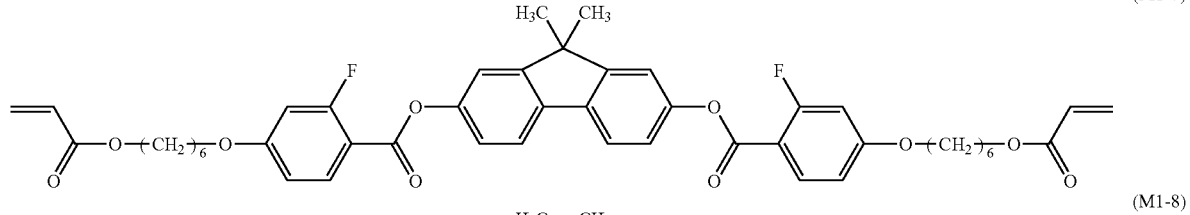

(M1-8)
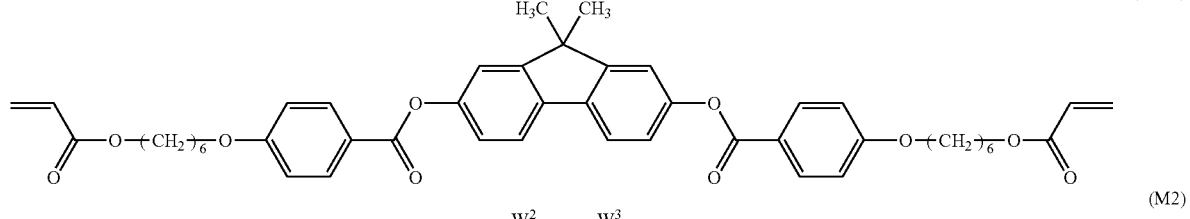

(M2)
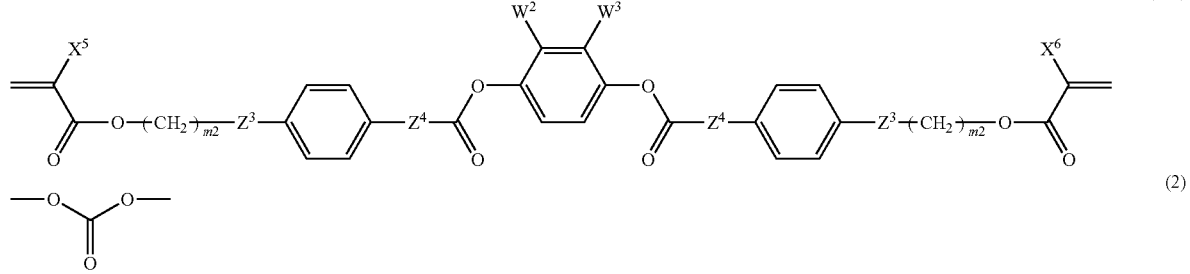

(2)

In the formula (M2), $Z^3$ each independently represent —O— or a group represented by the formula (2), and preferably the same groups. $Z^4$ each independently represent a single bond, —$CH_2CH_2$— or —CH=CH—, and preferably the same groups of a single bond or —$CH_2CH_2$—. $W^2$ and $W^3$ each independently represent hydrogen, fluorine, methyl or trifluoromethyl. m2 each independently represent an integer of from 2 to 10, and preferably the same numbers. $X^5$ and $X^6$ each independently represent hydrogen, fluorine or methyl, and preferably hydrogen. Particularly preferred examples of the compound (M2) are shown below. These compounds can be synthesized by the methods disclosed in Makromol. Chem., vol. 190, pp. 3201-3215 (1998), WO 97/00600 and the like.

(M2-1)
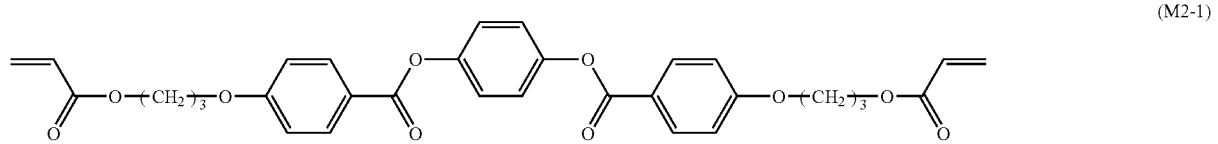

(M2-2)
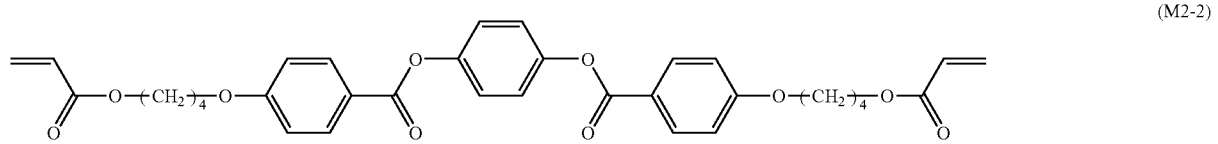

-continued
(M2-3)
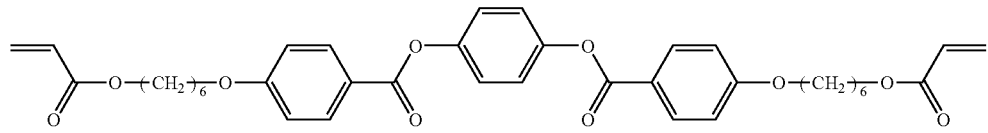
(M2-4)
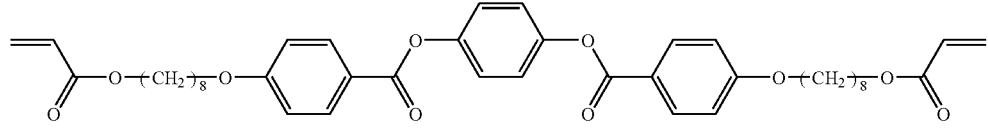
(M2-5)
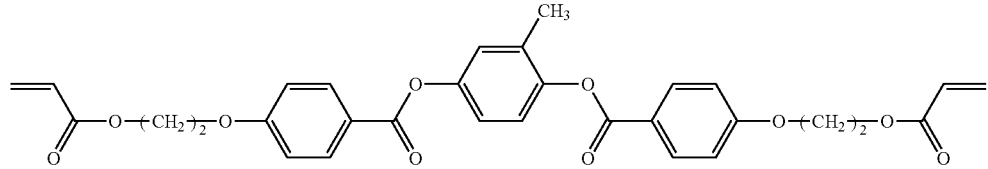
(M2-6)
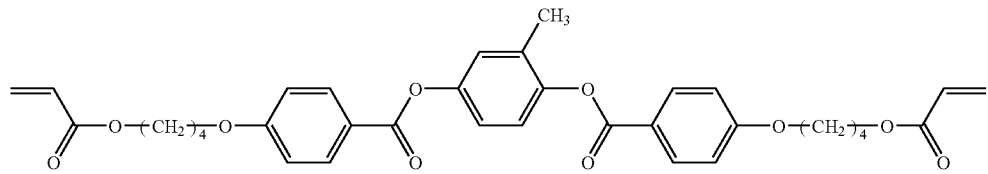
(M2-7)
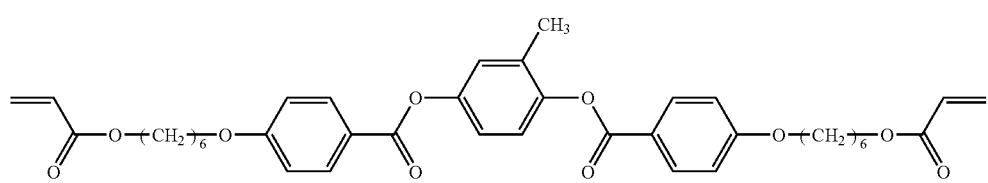
(M2-8)
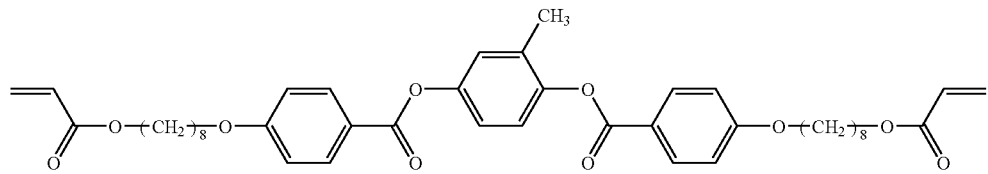
(M2-9)
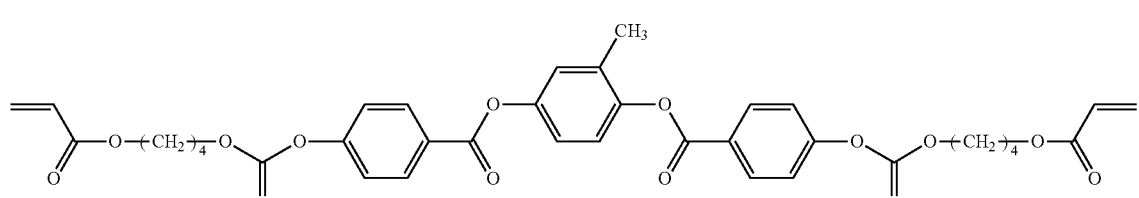
(M2-10)
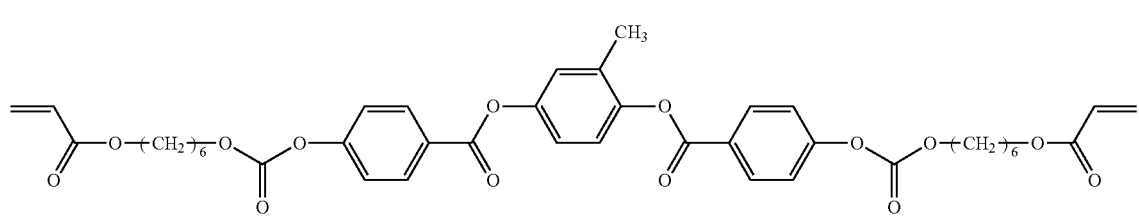
(M2-11)
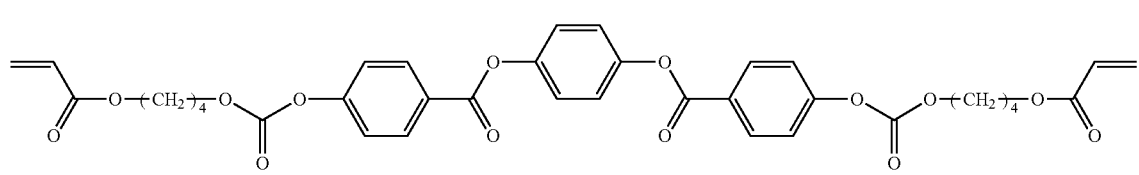

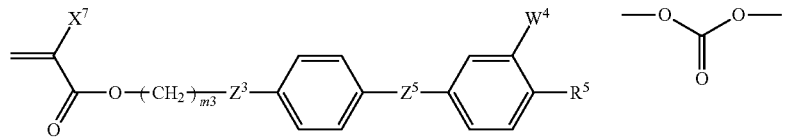
(M3)

(2)

In the formula (M3), $R^5$ represents —CN, —OCF$_3$, alkyl having from 1 to 10 carbon atoms or alkoxy having from 1 to 10 carbon atoms. $W^4$ represents hydrogen or fluorine, and preferably hydrogen. $Z^3$ represents —O— or a group represented by the formula (2). $Z^5$ represents a single bond, —C≡C— or —COO—, and preferably a single bond or —COO—. m3 represents an integer of from 2 to 10. $X^7$ represents hydrogen, fluorine or methyl, and preferably hydrogen. Particularly preferred examples of the compound (M3) are shown below. The compound can be synthesized by the methods disclosed in Macromolecules, vol. 26, pp. 6132-6134 (1993), DE 19504224, WO 97/00600 and the like.

(M3-1)
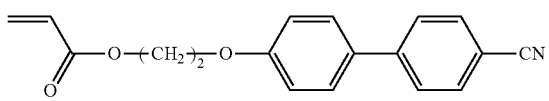

(M3-2)
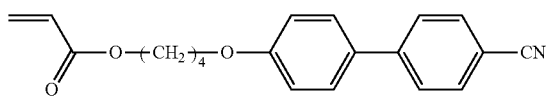

(M3-3)
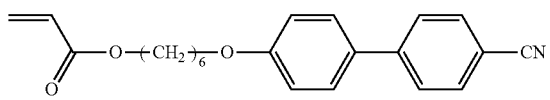

(M3-4)
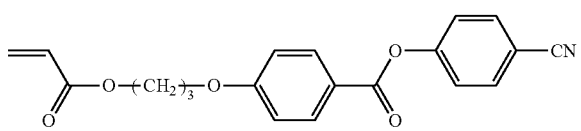

(M3-5)
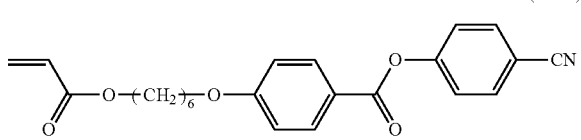

(M3-6)
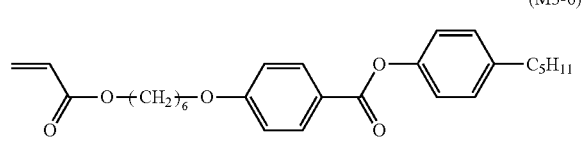

(M3-7)
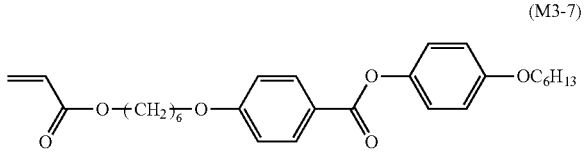

(M3-8)

(M3-9)

(M3-10)

(M3-11)

In the following description, the compound (M1), the compound (M2) and the compound (M3) are referred to as a compound (M) as a generic term. The polymerizable liquid crystal composition of the invention contains at least one of the compound (1) and at least one of the compound (M) as described above. The content ratio of the compound (1) in the polymerizable liquid crystal composition of the invention is preferably from 40 to 95% by weight based on the total amount of the compound (1) and the compound (M). The ratio is more preferably from 50 to 90% by weight. The content ratio of the compound (M) in the polymerizable liquid crystal composition of the invention is preferably from 5 to 60% by weight based on the total amount of the compound (1) and the compound (M). The ratio is more preferably from 10 to 50% by weight. The polymerizable liquid crystal composition of the invention preferably contains the compound (1) and the compound (M) and may contain another component.

As the another component, compounds (K1) to (K3), which are optically active acrylates, may be added for the purpose of producing a negative C-plate utilizing selective reflection.

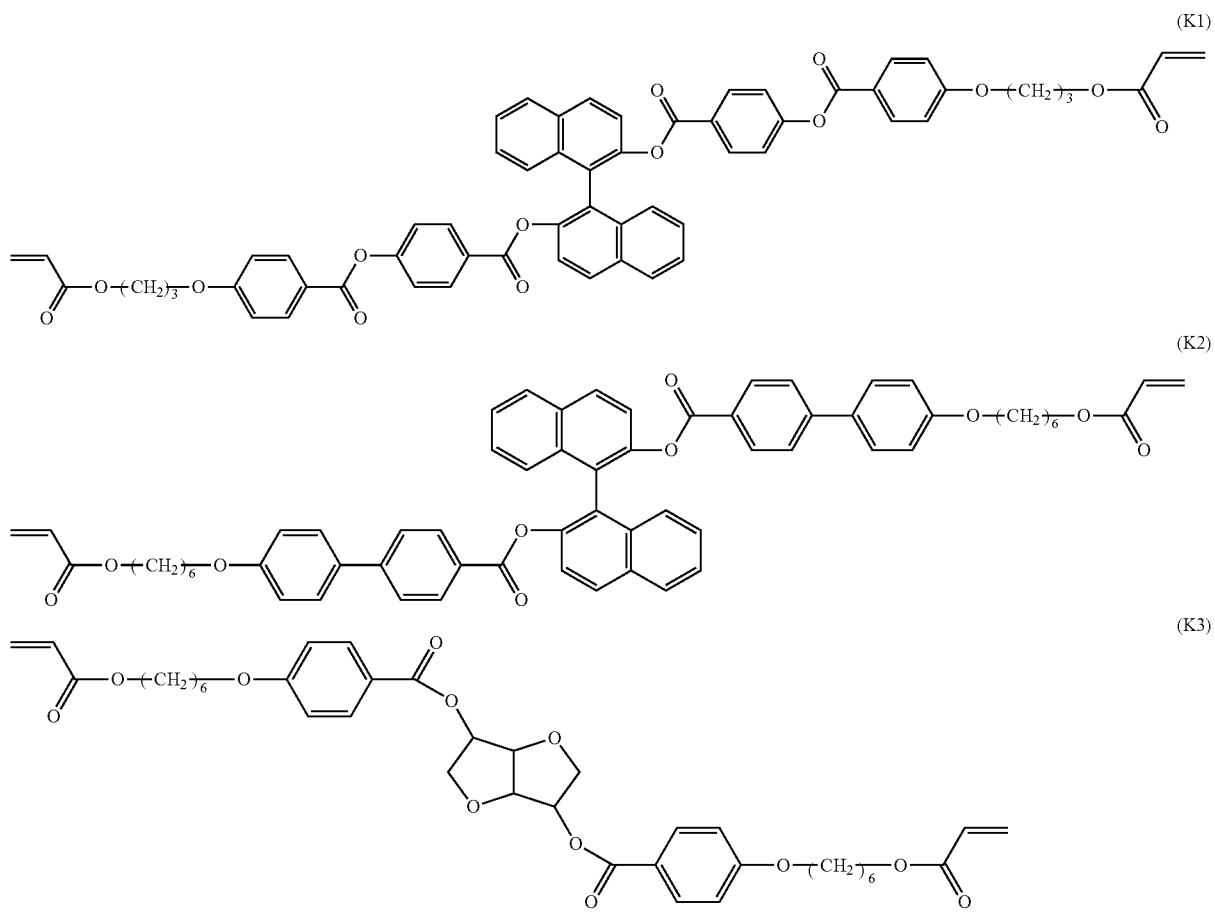

The polymerizable liquid crystal composition of the invention may further contain an additive for controlling the properties of the polymer depending on necessity. Examples of the additive include a silane coupling agent, a surfactant, an antioxidant, an ultraviolet ray absorbent and a non-liquid crystalline polyfunctional acrylate monomer. The additive is used for controlling the characteristics of the composition and the polymer. Examples of the additive that is necessary for polymerization include a photopolymerization initiator and a sensitizer. An organic solvent is preferred for diluting the composition. Examples of the another polymerizable compound and the additive are shown below.

An organic silicon compound may be added to the polymerizable liquid crystal composition for controlling homeotropic orientation. The organic silicon compound is a compound represented by the formula (3).

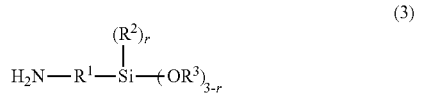

In the formula (3), $R^1$ represents linear alkylene having form 2 to 10 carbon atoms, in which in the alkylene, one of —$CH_2$— or two —$CH_2$— that are not adjacent to each other may be replaced by —O— or —NH—. $R^2$ represents methyl, ethyl, propyl or isopropyl. $R^3$ represents methyl, ethyl or trimethylsilyl. r represents an integer of from 0 to 2. Accordingly, the compound (3) is a silicon compound having an amino group and a hydrolyzable alkoxy group or trimethylsilyloxy group.

Specific examples of the compound (3) are shown below.

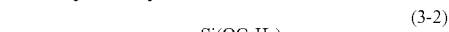

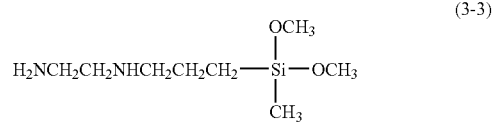

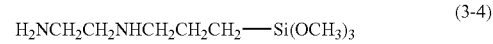

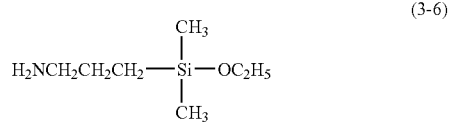

-continued

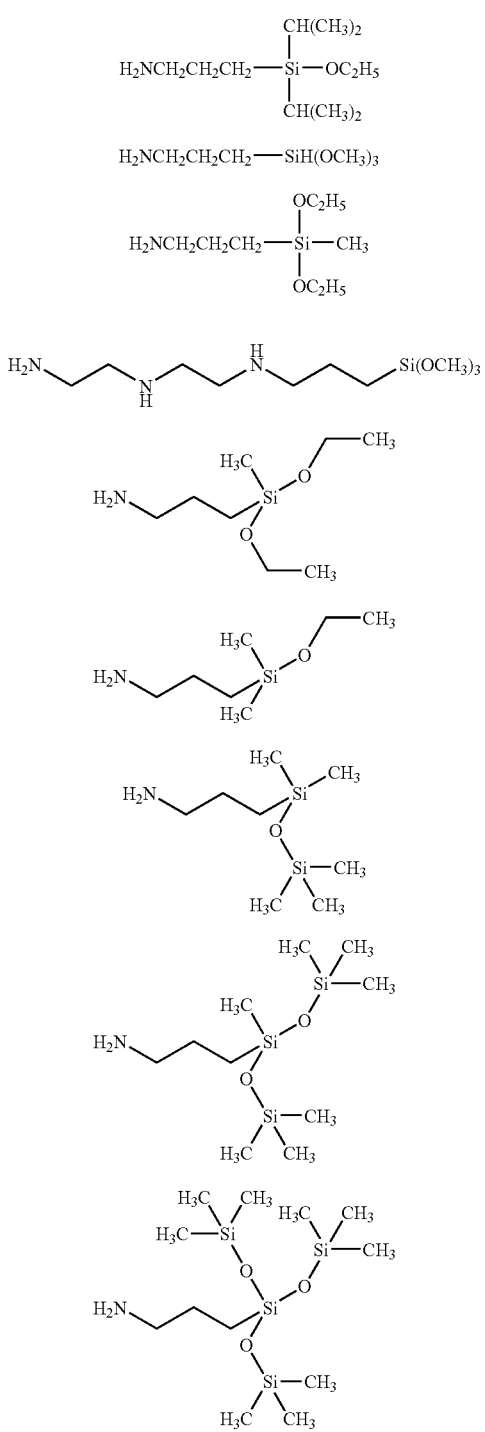

For providing homeotropic orientation stably, the ratio of the organic silicon compound used is preferably from 0.01 to 0.30 in terms of weight ratio with respect to the total amount of the polymerizable liquid crystal compounds. The ratio is more preferably from 0.03 to 0.20, and further preferably from 0.03 to 0.15.

A surfactant may be used for stabilizing homeotropic orientation or for enhancing the coating property. Examples of the surfactant include a quaternary ammonium salt, an alkylamine oxide, a polyamine derivative, a polyoxyethylene-polyoxypropylene condensate, polyethylene glycol and an ester thereof, sodium lauryl sulfate, ammonium lauryl sulfate, an amine lauryl sulfate, an alkyl-substituted aromatic sulfonate salt, an alkyl phosphate salt, a perfluoroalkyl sulfonate salt, a perfluoroalkyl carboxylate salt, a perfluoroalkyl ethylene oxide adduct and a perfluoroalkyl trimethylammonium salt. The surfactant has such effects that the composition can be easily coated on a supporting substrate or the like. The preferred ratio of the surfactant varies depending on the kind of the surfactant, the compositional ratio of the composition and the like, and is from $1\times10^{-4}$ to 0.05, and more preferably from 0.001 to 0.01, in terms of weight ratio with respect to the total amount of the polymerizable compounds.

The polymerizable liquid crystal composition of the invention may contain an antioxidant for the purpose of preventing the resulting cured film from being deteriorated due to oxygen in the air. Examples of the antioxidant include hydroquinone, 2,6-di-t-butyl-p-cresol, 2,6-di-t-butylphenol, triphenyl phosphite and trialkyl phosphite. Preferred examples of the commercially available product include Irganox 245 and Irganox 1035, produced by Ciba Specialty Chemicals Co., Ltd.

An ultraviolet ray absorbent may be added for the purpose of preventing the cured film from being deteriorated due to an ultraviolet ray. Examples of the ultraviolet ray absorbent include Tinuvin PS, Tinuvin 292, Tinuvin 109, Tinuvin 328, Tinuvin 384-2, Tinuvin 123, Tinuvin 400 and Tinuvin 400L, produced by Ciba Specialty Chemicals Co., Ltd.

In the invention, a photoinitiator is used for performing polymerization with light, such as an ultraviolet ray. Examples of the initiator include, among the products of Ciba Specialty Chemicals Co., Ltd., Darocure 1173 (2-hydroxy-2-methyl-1-phenylpropan-1-one), Darocure TPO, Irgacure 184 (1-hydroxycyclohexyl phenyl ketone), Irgacure 651 (2,2-dimethoxy-1,2-diphenylethan-1-one), Irgacure 500, Irgacure 2959, Irgacure 907, Irgacure 369, Irgacure 1300, Irgacure 819, Irgacure 1700, Irgacure 1800, Irgacure 1850, Darocure 4265, Irgacure 784 and Irgacure 784OXE01.

Other examples of the photopolymerization initiator include p-methoxyphenyl-2,4-bis(trichloromethyl)triazine, 2-(p-butoxystyryl)-5-trichloromethyl-1,3,4-oxadiazole, 9-phenylacridine, 9,10-benzphenazine, a mixture of benzophenone and Michler's ketone, a mixture of hexaarylbiimidazole and mercaptobenzimidazole, 1-(4-isopropylphenyl)-2-hydroxy-2-methylpropan-1-one, benzyldimethylketal, 2-methyl-1-(4-(methylthio)phenyl)-2-morpholinopropan-1-one, a mixture of 2,4-diethylxanthone and methyl p-dimethylaminobenzoate, and a mixture of benzophenone and methyltriethanolamine.

The photopolymerization initiator may be used with a sensitizer for enhancing the sensitivity to light. Preferred examples of the sensitizer include the compounds (4-1) to (4-6) below.

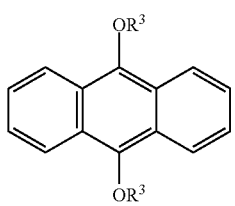
(4-1)

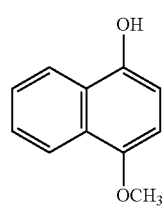
(4-2)

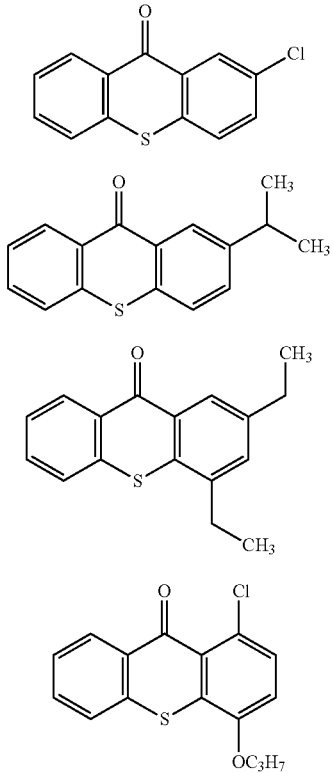

Examples of the solvent include benzene, toluene, xylene, mesitylene, butylbenzene, diethylbenzene, tetralin, methoxybenzene, 1,2-dimethoxybenzene, ethylene glycol dimethyl ether, diethylene glycol dimethyl ether, acetone, methyl ethyl ketone, methyl isobutyl ketone, cyclopentanone, cyclohexanone, ethyl acetate, ethyl lactate, ethylene glycol monomethyl ether acetate, propylene glycol monomethyl ether acetate, propylene glycol monoethyl ether acetate (PGMEA), γ-butyrolactone, 2-pyrrolidone, N-methyl-2-pyrrolidone, dimethylformamide, chloroform, dichloromethane, carbon tetrachloride, dichloroethane, tetrachloroethane, trichloroethylene, chlorobenzene, t-butyl alcohol, diacetone alcohol, glycerin, monoacetin, ethylene glycol, triethylene glycol, hexylene glycol, ethylene glycol monomethyl ether, ethyl cellosolve, butyl cellosolve, 3-methyl methoxy propionate and acetic acid methoxyacetate. The solvent may be a sole compound or may be a mixture. Examples of the solvent that is particularly preferred among these solvent from the standpoint of safety include PGMEA, γ-butyrolactone, N-methyl-2-pyrrolidone, 3-methyl methoxy propionate and acetic acid methoxyacetate. The solvent is used upon coating the polymerizable liquid crystal composition on a supporting substrate.

Examples of the non-liquid crystalline polyfunctional acrylate monomer include 1,4-butanediol diacrylate, 1,6-hexanediol diacrylate, 1,9-nonanediol diacrylate, neopentyl glycol diacrylate, triethylene glycol diacrylate, dipropylene glycol diacrylate, tripropylene glycol diacrylate, tetraethylene glycol diacrylate, trimethylolpropane triacrylate, trimethylol ethylene oxide-added triacrylate, pentaerythritol triacrylate, pentaerythritol tetraacrylate, trisacryloxyethyl phosphate, bisphenol A, ethylene oxide-added diacrylate, bisphenol A glycidyl acrylate (Viscoat 700, a trade name, available from Osaka Organic Chemical Industry, Ltd.) and polyethylene glycol diacrylate. Examples thereof also include the compounds (5-1) to (5-10) shown below. These compounds may be used by adding to the polymerizable liquid crystal composition for controlling the viscosity, controlling the orientation, and for enhancing the hardness of the polymer.

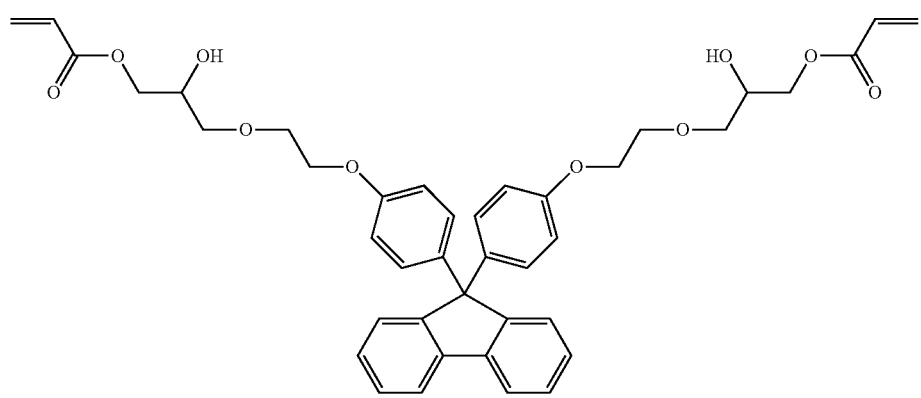

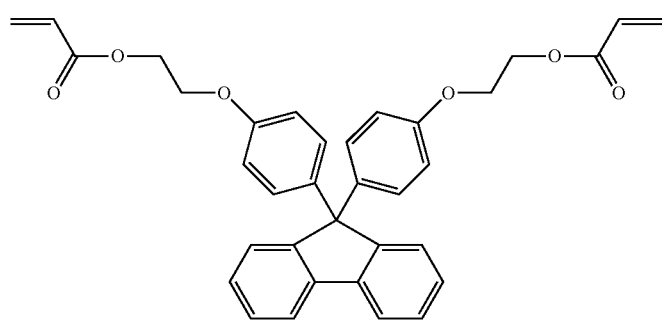

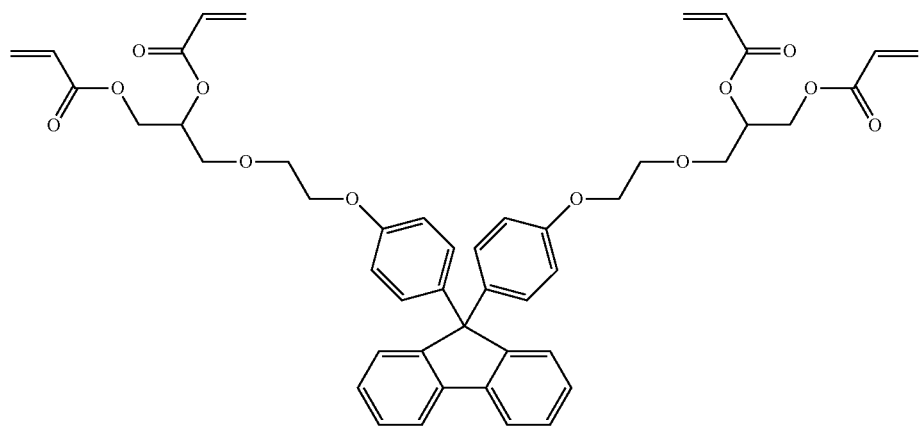
(5-3)
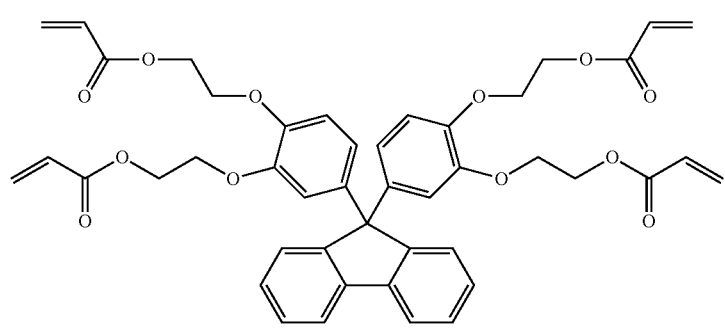
(5-4)
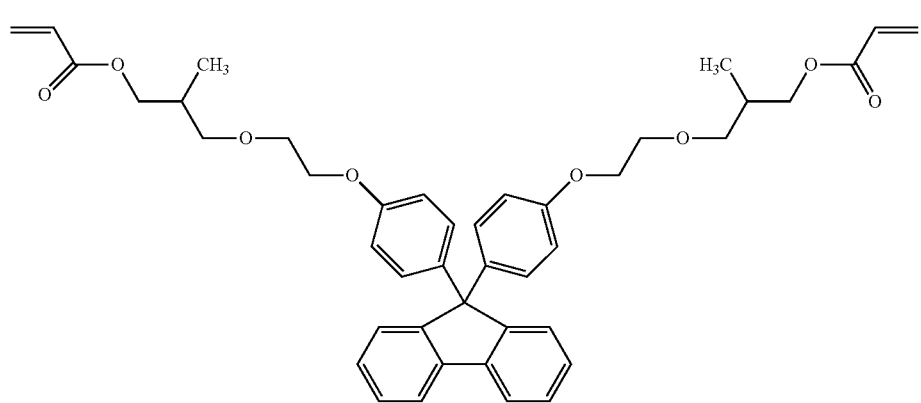
(5-5)
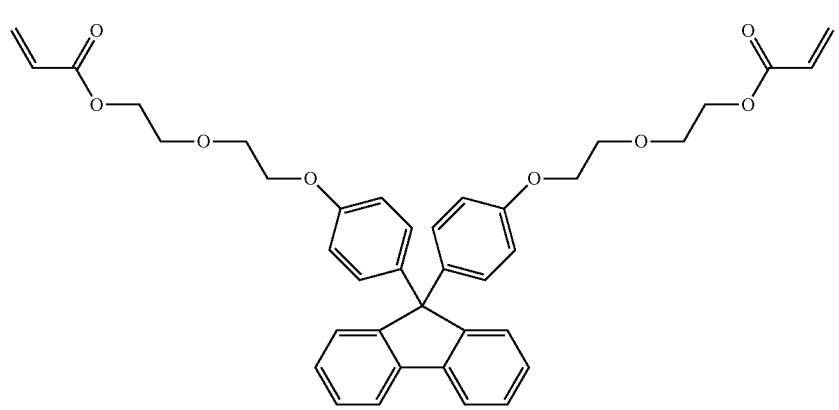
(5-6)

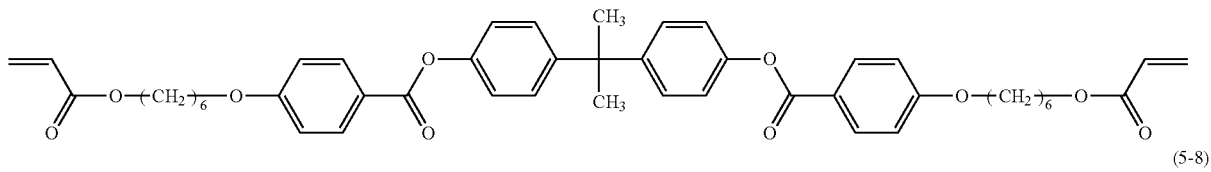
(5-7)

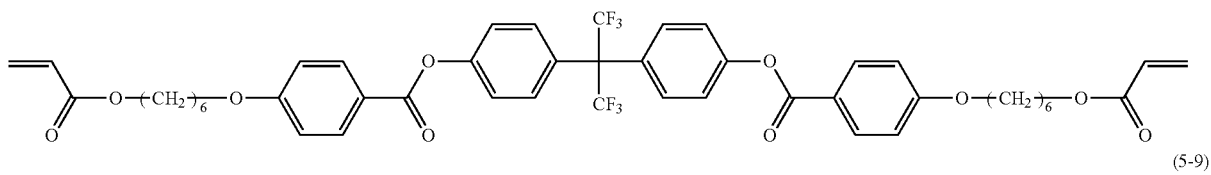
(5-8)

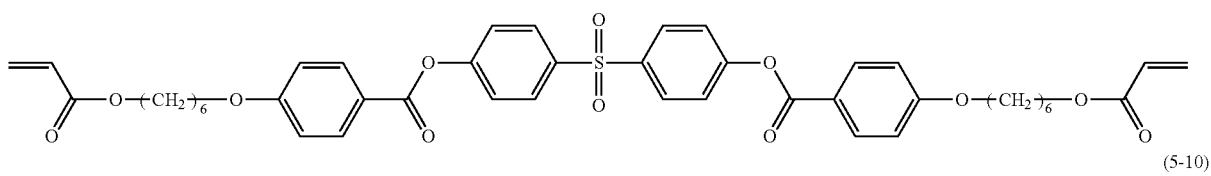
(5-9)

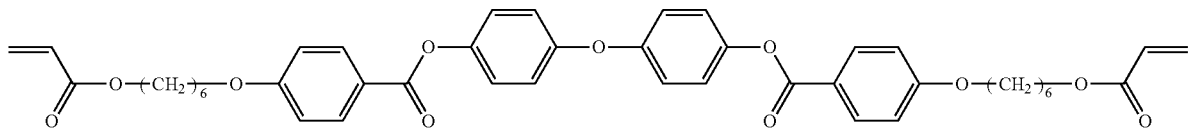
(5-10)

The polymerization condition of the composition of the invention will be described. A polymer is obtained by polymerizing the polymerizable liquid crystal composition of the invention. Polymerization using a photopolymerization catalyst is preferred rather than thermal polymerization for providing a polymer having excellent orientation. This is because polymerization can be performed easily in the state where the composition is in a liquid crystal state.

Examples of the light used for the photopolymerization include an ultraviolet ray, a visible ray and an infrared ray. An electron beam and an electromagnetic wave, such as an X-ray, may be used. In general, an ultraviolet ray and a visible ray are preferred. The wavelength thereof is preferably from 150 to 500 nm, more preferably from 250 to 450 nm, and most preferably from 300 to 400 nm. Examples of the light source include a low pressure mercury lamp (such as a sterilizing lamp, a fluorescent chemical lamp and a black light lamp), a high pressure discharge lamp (such as a high pressure mercury lamp and a metal halide lamp), and a short arc discharge lamp (such as a super-high pressure mercury lamp, a xenon lamp and a mercury xenon lamp). The preferable light source is the super-high pressure mercury lamp. The light from the light source may be radiated directly to the composition. Light of a particular wavelength (or a particular wavelength range) may be radiated to the composition by selecting the wavelength with a filter. The radiation energy density is preferably from 2 to 5,000 mJ/cm$^2$, more preferably from 10 to 3,000 mJ/cm$^2$, and particularly preferably from 100 to 2,000 mJ/cm$^2$. The illuminance is preferably from 0.1 to 5,000 mW/cm$^2$. The illuminance is more preferably from 1 to 2,000 mW/cm$^2$. The temperature, at which the light is radiated, is set in such a manner that the composition has a liquid crystal phase. The radiation temperature is preferably 100° C. or less. Polymerization with heat may occur at a temperature of 100° C. or more, whereby favorable orientation may not be obtained.

The shape of the polymer may be a film, a plate, particles, powder or the like. The polymer may be molded. A supporting substrate is generally used for providing the polymer in the form of a film. The composition is coated on the supporting substrate, and the coated film (paint film) having a liquid crystal phase is polymerized to provide a film. The preferred thickness of the polymer depends on the value of optical anisotropy and the purpose of the polymer. Although the range thereof cannot be strictly determined accordingly, the thickness is preferably from 0.05 to 50 μm, more preferably from 0.1 to 20 μm, and particularly preferably from 0.5 to 10 μm. The haze value of the polymer is generally 1.5% or less. The transmittance of the polymer is generally 80% or more in the visible light region. the polymer is suitable for an optically anisotropic thin film used in a liquid crystal display device.

Examples of the supporting substrate include triacetyl cellulose (which may be referred to as TAC), polyvinyl alcohol, polyimide, polyester, polyarylate, polyetherimide, polyethylene terephthalate and polyethylene naphthalate. Examples of the name of the commercially available products include "Arton" of JSR Corporation, "Zeonox" and "Zeonor" of Nippon Zeon Corporation, and "Apel" of Mitsui Chemicals, Inc. The supporting substrate may be a uniaxially stretched film, a biaxially stretched film or the like. Preferred examples of the supporting substrate include a triacetyl cellulose film. The film may be used as it is without any pretreatment. The film may be subjected to a surface treatment, such as a saponification treatment, a corona discharge treatment, an UV-ozone treatment and a plasma treatment, depending on necessity. Other examples thereof include a metallic supporting substrate, such as aluminum, iron and copper, and a glass supporting substrate, such as alkali glass, borosilicate glass and flint glass.

The coated film on the supporting substrate is prepared by coating the composition as it is. The coated film may also be prepared by coating the composition having been dissolved in a suitable solvent, followed by removing the solvent.

Examples of the coating method include spin coating, roll coating, curtain coating, flow coating, printing, microgravure coating, gravure coating, wire bar coating, dip coating, spray coating, meniscus coating and a flow casting film forming method.

In the polymerizable liquid crystal composition of the invention, the factors that determine the orientation of the liquid crystal molecules include (1) the kinds of the compounds contained in the composition, (2) the kind of the supporting substrate, (3) the method of orientation treatment, and the like. Preferred examples of the method of orientation treatment include such methods as oblique vapor deposition of silicon oxide, and etching in a slit form. Particularly preferred examples of the method of orientation treatment include rubbing in one direction with a rayon cloth or the like. In the rubbing treatment, the supporting substrate may be directly rubbed. A thin film of polyimide, polyvinyl alcohol or the like may be coated on the supporting substrate, and the thin film may be rubbed. Such a special thin film is also known that provide favorable orientation without rubbing treatment. In alternative, a side-chain type liquid crystal polymer may be coated on the supporting substrate.

The classification of orientation of liquid crystal molecule includes homogeneous (parallel), homeotropic (vertical), hybrid, and the like. Homogeneous is such a state that the orientation vectors are in parallel to the substrate and are in one direction. Homeotropic is such a state that the orientation vectors are vertical to the substrate. Hybrid is such a state that the orientation vectors rise from parallel to vertical by departing from the substrate. These orientation states are observed in a composition having a nematic phase or the like.

The polymer of the invention will be described. The polymer is obtained by polymerizing the polymerizable liquid crystal composition of the invention. The polymer is colorless and transparent. The polymer satisfies plural properties among such properties that the polymer has small photoelasticity, is hard to be released from the supporting substrate, has sufficient hardness, has large heat resistance, and has large weather resistance.

The purposes of the polymer are as follows. The polymer can be used as a molded article having optical anisotropy. Examples of the purpose of the polymer include an optical film, such as a phase retarder (e.g., a ½ wavelength plate and a ¼ wavelength plate), an antireflection film, a selective reflection film and a viewing angle compensation film. The polymer having orientation, such as homogeneous, hybrid and homeotropic, may be utilized as a phase retarder, a polarizing device, a liquid crystal orientation film, an antireflection film, a selective reflection film, a viewing angle compensation film and the like. The polymer is used for the purpose of optical compensation in a phase retarder, a viewing angle compensation film or the like of a liquid crystal display device. Examples of the important purpose in industry include viewing angle compensation in a liquid crystal display device of a VA mode, an IPS mode, a TN mode, an MVA mode or the like. The polymer may also be utilized as a high thermal conduction epoxy resin, an adhesive, a synthetic polymer having mechanical anisotropy, cosmetics, an ornament, a non-linear optical material, an information recording material, and the like.

A phase retarder, which is one example of the purposes of the polymer, has a function of converting the state of polarized light. A ½ wavelength functional plate has a function of rotating the vibration direction of linear polarized light by 90°. The composition is coated on a supporting substrate in such a manner that the expression $d=\lambda/2\times\Delta n$ is satisfied. In the expression, d represents the thickness of the composition, $\lambda$ represents the wavelength, and $\Delta n$ represents the optical anisotropy. The composition is oriented and then photopolymerized to provide a ½ wavelength functional plate. A ¼ wavelength functional plate has a function of converting linear polarized light to circular polarized light or converting circular polarized light to linear polarized light. In this case, the coated film of the composition may be prepared in such a manner that the condition $d=\lambda/4\times\Delta n$ is satisfied. The thickness (d) of the polymer is controlled in the following manner. In the method of diluting the composition with a solvent and then coating on a supporting substrate, a coated film having a target thickness can be obtained by selecting properly the concentration of the composition, the coating method, the coating conditions and the like. A method utilizing a liquid crystal cell is also preferably employed. A liquid crystal cell is favorably used since it has an orientation film, such as polyimide. Upon charging the composition into the liquid crystal cell, the thickness of the coated film can be controlled by the distance of the liquid crystal cell.

The invention will be described in more detail with reference to examples, but the invention is not limited to the following examples. The structures of the compounds are confirmed by nuclear magnetic resonance spectrum, infrared absorption spectrum, mass spectrum and the like. The unit for the phase transition temperature is ° C., in which C represents crystals, and I represents an isotropic liquid phase. The parenthetic symbols mean a monotropic liquid crystal phase. In the examples, liter as a unit of volume is expressed by the symbol L. The measurement methods of properties are shown below.

<Confirmation of Structure of Compound>

The structure of the compound thus synthesized was confirmed by measurement with 500 MHz proton NMR (DRX-500, available from Bruker). The numerals disclosed are in the unit of ppm, s shows singlet, d shows doublet, t shows triplet, and m shows multiplet.

<Phase Transition Temperature>

A specimen was placed on a hot plate of a melting point measuring apparatus equipped with a polarizing microscope, and increased in temperature at a rate of 1° C. per minute. The temperature, at which the liquid crystal phase was transferred to another liquid crystal phase, was measured. C represents crystals, N represents a nematic phase, and I represents an isotropic liquid phase. An NI point means a maximum temperature of a nematic phase or a transition temperature from a nematic phase to an isotropic liquid. "C 50 N 63 I" means that crystals are transferred to a nematic phase at 50° C., and the nematic phase is transferred to an isotropic liquid at 63° C.

<Heat Resistance Test>

The test was carried out under conditions of 100° C. for 500 hours, and the result was evaluated by change of retardation. Polyamic acid (PIA5310, produced by Chisso Corp.) was coated on a glass substrate; which was then heated at 210° C. for 30 minutes to obtain a supporting substrate. The surface of polyimide through heating was rubbed with a rayon cloth. A composition as a specimen was diluted with a mixed solvent of toluene and cyclopentanone (2/1 by weight) to prepare a solution having a concentration of 30% by weight. The solution was coated on the supporting substrate with a spin coater, and after heating at 70° C. for 3 minutes, the resulting coated film was irradiated with an ultraviolet ray at 60° C. for 10 seconds by using a super high pressure mercury lamp (250 W/cm). The resulting polymer was measured for retardation at 25° C. The polymer was heated to 100° C. for 500 hours and then again measured for retardation at 25° C. The resulting two values were compared to evaluate the heat resistance. The retardation was measured according to the method disclosed in a known literature (H. Awaya, *Kobunshi Sozai no Henko Kenbikyo Nyumon* (Introduction to Polarizing Microscope for Polymer Materials), p. 94, published by Agne Gijutsu Center Co., Ltd. (2001)) and by using a Senarmont compensator. The wavelength used was 550 nm.

<Optical Anisotropy (Δn)>

A polymer film was measured for a value of retardation (25° C.) according to the aforementioned heat resistance test. The thickness (d) of the polymer film was also measured. As the retardation is expressed as Δn×d, the value of optical anisotropy was calculated based on the relationship.

<Orientation of Liquid Crystal Molecules>

A polymer film (liquid crystal orientation film) was prepared on a glass substrate having a polyimide orientation film having been subjected to rubbing treatment. The orientation of the polymer was determined visually by the following method based on the angle dependency of the transmitted light intensity.

<Method of Visual Observation>

A polymer film was held between two polarizing plates disposed as crossed nicols, and was irradiated with light in the direction perpendicular to the film surface (tilt angle 0°. The change of the transmitted light was observed with the tilt angle of irradiation being changed from 0° to, for example, 50°. The direction of tilting the irradiation conformed to the rubbing direction (the major axis direction of the liquid crystal molecules). When the transmitted light in the perpendicular direction was maximum, it was determined that the orientation was homogeneous. In the homogeneous orientation, the orientation vectors of the liquid crystal molecules are in parallel to the glass substrate, and thus functions as an A-plate. When the transmitted light in the perpendicular direction was minimum, and the transmitted light was increased by increasing the tilt angle, it was determined that the orientation was homeotropic. In the homeotropic orientation, the orientation vectors of the liquid crystal Molecules are vertical to the glass substrate, and thus functions as a C-plate.

<Measurement with Polarized Light Analyzer>

The polymer film was irradiated with light having a wavelength of 550 nm with Optipro Polarized Light Analyzer, produced by Shintec Co., Ltd. The retardation (Δn×d) was measured while decreasing the incident angle of the light from 90° with respect to the film surface.

EXAMPLE 1

Synthesis of 2,7-bis(4-(6-acryloyloxybutyloxycarbonyloxy)-benzoyloxy)-9-methylfluorene, Compound (1-8)

(First Step)

In a nitrogen atmosphere, concentrated sulfuric acid (0.2 mL) was added to a mixture of 4-hydroxybenzoic acid (13.0 g), 2,7-dihydroxy-9-methylfluorene (10.0 g), boric acid (0.3 g) and xylene (120 mL), and the mixture was heated under reflux for 6 hours while removing water. A solid matter thus deposited was collected by filtration under reduced pressure, and rinsed with toluene. The solid matter was recrystallized from a mixed solvent of ethanol (75 mL) and acetone (75 mL) to provide 2,7-bis(4-hydroxybenzoyloxy)-9-methylfluorene (compound [H1]) (14.9 g) in the form of pale rose crystals.

[H5]

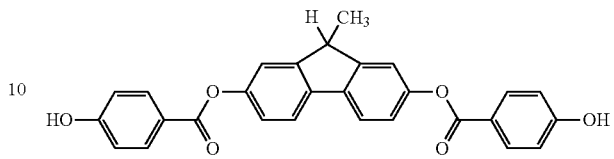

The NMR analysis values of the compound [H1] are shown below.

$^1$H-NMR (in DMSO, δ ppm): 8.27 (m, 4H), 7.98 (d, 2H), 7.47 (d, 2H), 7.24 (dd, 2H), 6.81 (m, 4H), 4.02 (m, 1H), 1.43 (d, 3H)

(Second Step)

In a nitrogen atmosphere, the compound [H1] (5.0 g) was dissolved in dichloromethane (50 mL), to which triethylamine (4.5 g) was added, and the mixture was cooled to −10° C. 4-Acryloyloxybutyl chloroformate (4.7 g) was added dropwise thereto, and the mixture was stirred over night. Water was added to the reaction mixture, and an organic layer was separated. The resulting organic layer was rinsed sequentially with 6N hydrochloric acid and water, and dried over anhydrous magnesium sulfate. The solvent was distilled off to provide a residue, which was purified by column chromatography (silica gel, eluent: toluene-ethyl acetate mixed solution (volume ratio: toluene/ethyl acetate=9/1)) and recrystallization (toluene) to provide a compound (1-8) (5.66 g) in the form of colorless crystals.

(1-8)

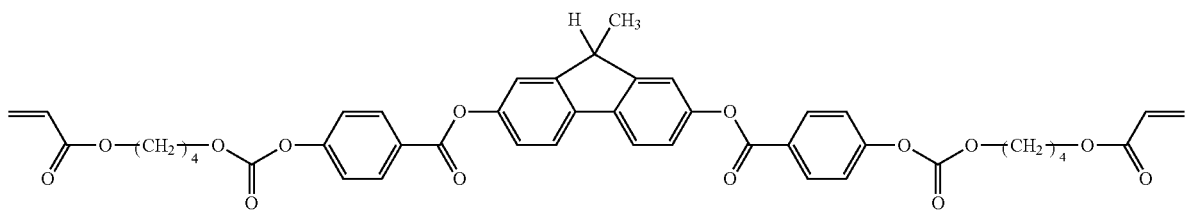

The phase transition temperatures and the NMR analysis values of the compound (1-8) are shown below.

C 81.1 N 250<I $^1$H-NMR (in CDCl$_3$, δ ppm): 8.27 (m, 4H), 7.77 (d, 2H), 7.36 (m, 4H), 7.21 (d, 2H), 6.43 (dd, 2H), 6.15 (dd, 2H), 5.85 (dd, 2H), 4.34 (t, 4H), 4.24 (t, 4H), 1.83-1.91 (m, 8H), 1.57 (s, 3H)

The compound (1-8) was dissolved in PGMEA to prepare a 20% by weight PGMEA solution. The solution suffered no deposition of crystals even after allowing to stand at room temperature (20° C.) over night.

EXAMPLE 2

Synthesis of 2,7-bis(4-(6-acryloyloxybutyloxycarbonyloxy)-benzoyloxy)-9,9-dimethylfluorene, Compound 1-19

(First Step)

In a nitrogen atmosphere, concentrated sulfuric acid (0.2 mL) was added to a mixture of 4-hydroxybenzoic acid (12.2 g), 2,7-dihydroxy-9,9-dimethylfluorene (10.0 g), boric acid (0.3 g) and xylene (120 mL), and the mixture was heated under reflux for 6 hours while removing water. A deposited matter was filtered and rinsed with toluene. It was recrystallized from a mixed solvent of ethanol (75 mL) and acetone (75 mL) to provide 2,7-bis(4-hydroxybenzoyloxy)-9,9-dimethylfluorene (compound [H2]) (17.6 g) in the form of pale rose solid.

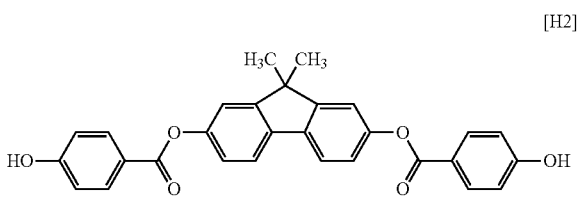

[H2]

The NMR analysis values of the compound [H2] are shown below.

$^1$H-NMR (in DMSO, δ ppm): 8.27 (m, 4H), 7.98 (d, 2H), 7.47 (d, 2H), 7.24 (dd, 2H), 6.81 (m, 4H), 1.47 (s, 6H)

(Second Step)

In a nitrogen atmosphere, the compound [H2] (5.0 g) was dissolved in dichloromethane (50 mL), to which triethylamine (4.3 g) was added, and the mixture was cooled to −10° C. 4-Acryloyloxybutyl chloroformate (4.5 g) was added dropwise thereto, and the mixture was stirred over night. Water was added to the reaction mixture, and an organic layer was separated. The resulting organic layer was rinsed sequentially with 6N hydrochloric acid and water, and dried over anhydrous magnesium sulfate. The solvent was distilled off to provide a residue, which was purified by column chromatography (silica gel, eluent: toluene-ethyl acetate mixed solvent (volume ratio: toluene/ethyl acetate=9/1)) and recrystallization (toluene/heptane) to provide a compound (1-19) (4.4 g) in the form of colorless crystals.

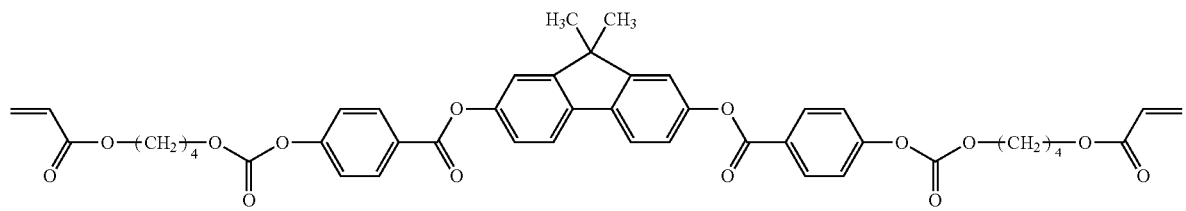

(1-19)

The phase transition temperatures and the NMR analysis values of the compound (1-19) are shown below.

C 95.6 N 142.5 I $^1$H-NMR (in CDCl$_3$, δ ppm): 8.14 (t, 2H), 7.30-7.26 (M, 6H), 7.18-7.12 (m, 6H), 6.42 (d, 2H), 6.13 (dd, 2H), 5.85 (d, 2H), 4.34 (t, 4H), 4.24 (t, 4H), 1.86 (m, 8H)

The compound (1-19) was dissolved in PGMEA to prepare a 20% by weight PGMEA solution. The solution suffered no deposition of crystals even after allowing to stand at room temperature (20° C.) over night.

EXAMPLE 3

Synthesis of 2,7-bis(4-(6-acryloyloxybutyloxycarbonyloxy)-2-fluorobenzoyloxy)-9,9-dimethylfluorene, Compound (1-25)

(First Step)

In a nitrogen atmosphere, concentrated sulfuric acid (0.2 mL) was added to a mixture of 2-fluoro-4-hydroxybenzoic acid (13.8 g), 2,7-dihydroxy-9,9-dimethylfluorene (10.0 g), boric acid (0.3 g) and xylene (120 mL), and the mixture was heated under reflux for 6 hours while removing water. A deposited matter was filtered and rinsed with toluene. It was recrystallized from a mixed solvent of ethanol (75 mL) and acetone (75 mL) to provide 2,7-bis(4-hydroxy-2-fluorobenzoyloxy)-9,9-dimethylfluorene (compound [H3]) (7.77 g) in the form of pale rose solid.

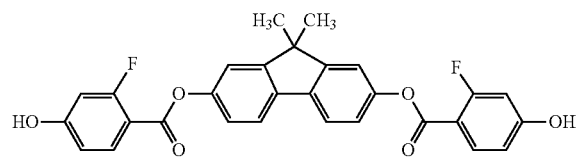

[H3]

The NMR analysis values of the compound [H3] are shown below.

$^1$H-NMR (in DMSO, δ ppm): 7.98 (dd, 4H), 7.89 (d, 4H), 7.45 (d, 4H), 7.21 (dd, 4H), 6.78 (dd, 4H), 6.72 (dd, 4H), 1.47 (s, 6H)

$^{19}$F-NMR (in DMSO, δ ppm): −105.7 (m, 2F)

(Second Step)

In a nitrogen atmosphere, the compound [H3] (5.0 g) was dissolved in dichloromethane (50 mL), to which triethylamine (4.0 g) was added, and the mixture was cooled to −10° C. 4-Acryloyloxybutyl chloroformate (4.2 g) was added dropwise thereto, and the mixture was stirred over night. Water was added to the reaction mixture, and an organic layer was separated. The resulting organic layer was rinsed sequentially with 6N hydrochloric acid and water, and dried over anhydrous magnesium sulfate. The solvent was distilled off to provide a residue, which was purified by column chromatography (silica gel, eluent: toluene-ethyl acetate mixed solvent (volume ratio: toluene/ethyl acetate=19/1)) and recrystallization (toluene) to provide a compound (1-25) (4.92 g) in the form of colorless crystals.

(1-25)

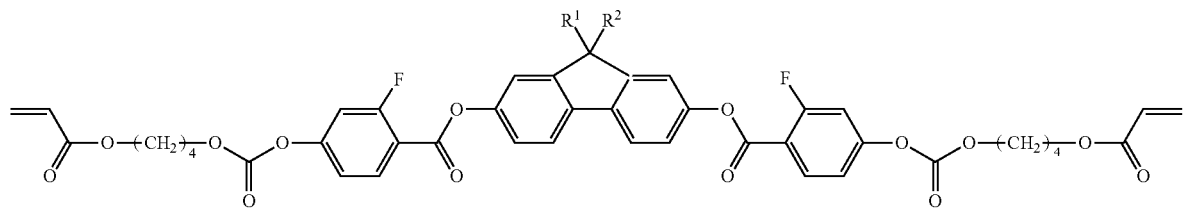

The phase transition temperatures and the NMR analysis values of the compound (1-25) are shown below.
C 95.6 N 142.5 I
$^1$H-NMR (in CDCl$_3$, δ ppm): 8.14 (t, 2H), 7.30-7.26 (M, 6H), 7.18-7.12 (m, 6H), 6.42 (d, 2H), 6.13 (dd, 2H), 5.85 (d, 2H), 4.34 (t, 4H), 4.24 (t, 4H), 1.86 (m, 8H)

EXAMPLE 4

Synthesis of 2,7-bis(4-(6-acryloyloxybutyloxycarbonyloxy-phenyl)propyonyloxy-9-methylfluorene, Compound (1-35)

(First Step)

In a nitrogen atmosphere, a mixture of sodium hydroxide (4.0 g) and water (6.0 g) was cooled to −5° C. 4-Hydroxyphenylpropionic acid (5.0 g) and 4-acryloyloxybutyl chloroformate (6.2 g) were added dropwise thereto, and the mixture was stirred over night. The reaction mixture was placed in 6N hydrochloric acid, and a solid matter thus deposited was collected by filtration under reduced pressure and rinsed sequentially with water and methanol. It was recrystallized from a mixed solvent of ethanol (75 mL) and acetone (75 mL) to provide 4-(6-acryloyoloxybutyloxycarbonyloxyphenyl) propionic acid (compound [H4]) in the form of colorless crystals.

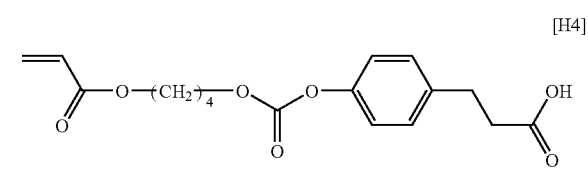

[H4]

The NMR analysis values of the compound [H4] are shown below.
$^1$H-NMR (in CDCl$_3$, δ ppm): 7.23 (m, 4H), 7.10 (m, 4H), 6.41 (dd, 1H), 6.13 (dd, 1H), 5.85 (dd, 1H), 4.29 (t, 2H), 4.22 (t, 2H), 2.95 (t, 2H), 2.68 (t, 2H), 1.81-1.87 (m, 4H)

(Second Step)

In a nitrogen atmosphere, a mixture of the compound [H4] (2.0 g), 2,7-dihydroxy-9,9-dimethylfluorene (0.66 g), DCC (1.29 g), DMAP (0.07 g) and dichloromethane (20 mL) was stirred at room temperature for 12 hours. Water was added to the reaction mixture, and an organic layer was separated. The resulting organic layer was rinsed sequentially with 1N hydrochloric acid, 2N sodium hydroxide aqueous solution and water, and dried over anhydrous magnesium sulfate. The solvent was distilled off to provide a residue, which was purified by column chromatography (silica gel, eluent: toluene-ethyl acetate mixed solvent (volume ratio: toluene/ethyl acetate=19/1)) and recrystallization (toluene/heptane) to provide a compound (1-35) (0.67 g) in the form of colorless crystals.

(1-35)

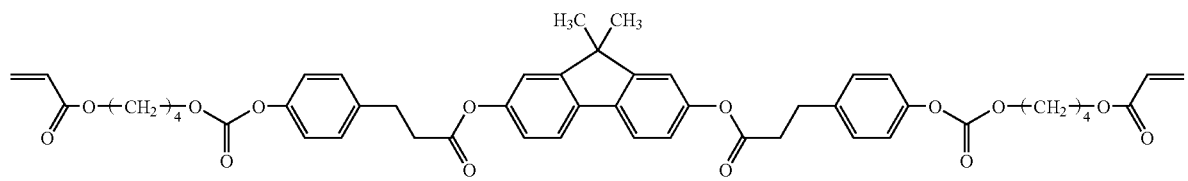

The phase transition temperatures and the NMR analysis values of the compound (1-35) are shown below.
C 81.1 N 250<I
$^1$H-NMR (in CDCl$_3$, δ ppm): 7.63 (d, 2H), 7.30 (m, 4H), 7.13 (m, 4H), 7.06 (d, 2H), 6.97 (dd, 2H), 6.43 (dd, 2H), 6.13 (dd, 2H), 5.84 (dd, 2H), 4.30 (t, 4H), 4.23 (t, 4H), 3.09 (t, 4H), 2.90 (t, 4H), 1.82-1.88 (m, 8H), 1.45 (s, 6H)

EXAMPLE 5

Production of 2,7-bis(4-(5-acryloyloxy-3-oxapentyloxy-carbonyloxy)benzoyloxy-9-methylfluorene, Compound (1-42)

(First Step)

In a nitrogen atmosphere, the compound [H1] (1.5 g) synthesized in Example 1 was dissolved in dichloromethane (15 mL), to which triethylamine (1.34 g) was added, and the mixture was cooled to −10° C. 5-Hydroxy-3-oxapenthylacrylate chloroformate (1.55 g) was added dropwise thereto, and the mixture was stirred over night. Water was added to the reaction mixture, and an organic layer was separated. The resulting organic layer was rinsed sequentially with 6N hydrochloric acid and water, and dried over anhydrous magnesium sulfate. The solvent was distilled off to provide a residue, which was purified by column chromatography (silica gel, eluent: toluene-ethyl acetate mixed solution (volume ratio: toluene/ethyl acetate=1/1)) and reprecipitation (toluene/methanol) to provide a compound (1-42) (1.74 g) in the form of colorless crystals.

(1-42)

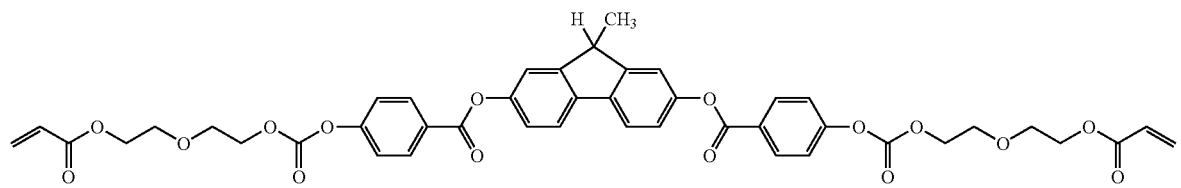

The phase transition temperatures and the NMR analysis values of the compound are shown below.

C 79.4 N 250<I $^1$H-NMR (in CDCl$_3$, δ ppm): 8.28 (m, 4H), 7.77 (d, 2H), 7.37 (m, 4H), 7.21 (d, 2H), 6.46 (dd, 2H), 6.18 (dd, 2H), 5.86 (dd, 2H), 4.45 (t, 4H), 4.37 (t, 4H), 4.01 (q, 1H), 3.83 (t, 4H), 3.81 (t, 4H), 1.55 (d, 3H)

The compound (1-42) was dissolved in PGMEA to prepare a 30% by weight PGMEA solution. The solution suffered no deposition of crystals even after allowing to stand at room temperature (20° C.) over night.

EXAMPLE 6

Production of 2,7-bis(4-(8-acryloyloxy-6-oxy-3-oxaactyloxycarbonyloxy)benzoyloxy)-9-methylfluorene, Compound (1-52)

(First Step)

In a nitrogen atmosphere, the compound [H1] (2.0 g) was dissolved in dichloromethane (15 mL), to which triethylamine (1.80 g) was added, and the mixture was cooled to −10° C. 8-Hydroxy-3-oxaoctylacrylate chloroformate (2.35 g) was added dropwise thereto, and the mixture was stirred over night. Water was added to the reaction mixture, and an organic layer was separated. The resulting organic layer was rinsed sequentially with 6N hydrochloric acid and water, and dried over anhydrous magnesium sulfate. The solvent was distilled off to provide a residue, which was purified by column chromatography (silica gel, eluent: toluene-ethyl acetate mixed solvent (volume ratio: toluene/ethyl acetate=7/3)) and recrystallization (ethanol/ethyl acetate) to provide a compound (1-52) (1.40 g) in the form of colorless crystals.

The phase transition temperatures and the NMR analysis values of the compound are shown below.

C 31.7 N 100.8 I $^1$H-NMR (in CDCl$_3$, δ ppm): 8.27 (m, 4H), 7.77 (d, 2H), 7.37 (m, 4H), 7.21 (d, 2H), 6.45 (dd, 2H), 6.17 (dd, 2H), 5.84 (dd, 2H), 4.45 (m, 4H), 4.34 (t, 4H), 4.01 (q, 1H), 3.83 (m, 4H), 3.77 (t, 4H), 3.72 (m, 8H), 1.55 (d, 3H)

The compound (1-52) was dissolved in PGMEA to prepare a 30% by weight PGMEA solution. The solution suffered no deposition of crystals even after allowing to stand at room temperature (20° C.) over night.

EXAMPLE 7

Synthesis of 2,7-bis(4-(4-acryloyloxybutyloxycarbonyl)-benzoyloxy)-9-methylfluorene, Compound (1-75)

(First Step)

Terephthalic acid chloride (19.1 g) was dissolved in toluene (150 mL). A solution of 2,7-dihydroxy-9-methylfluorene (10.0 g) and triethylamine (10.0 g) dissolved in tetrahydrofuran (50 mL) was added dropwise thereto, and the mixture was stirred at 40° C. for 3 hours. A salt thus deposited was removed by filtration under reduced pressure, and the solvent was distilled off to provide a residue, which was then dissolved in toluene and reprecipitated from heptane to provide a compound [H5] (21.3 g).

(1-52)

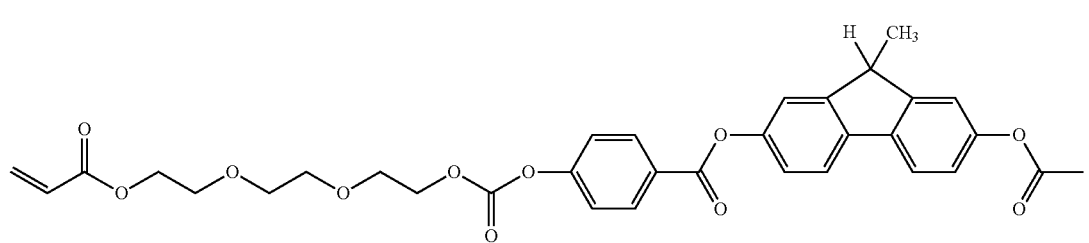

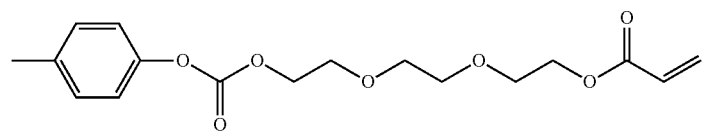

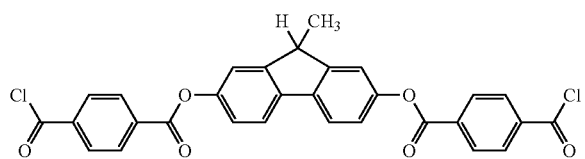

(Second Step)

The compound [H5] (20.0 g) was dissolved in toluene (150 mL). A mixed solution of 4-hydroxybutyl acrylate (13.7 g) and triethylamine (11.6 g) was added dropwise thereto, and the mixture was stirred for 3 hours. A salt thus deposited was removed by filtration under reduced pressure, and an organic layer was rinsed with hydrochloric acid. The solvent was distilled off to provide a residue, which was then dissolved in toluene and reprecipitated from heptane to provide the target compound (23.4 g) in the form of colorless crystals.

The phase transition temperatures and the NMR analysis values of the compound (1-77) are shown below.

C 60 N 150 I $^1$H-NMR (in CDCl$_3$, δ ppm): 8.30 (d, 4H), 8.18 (d, 4H), 7.79 (d, 2H), 7.39 (s, 2H), 7.24 (d, 2H), 6.43 (dd, 2H), 6.14 (dd, 2H), 5.85 (dd, 2H), 4.43 (t, 4H), 4.26 (t, 4H), 4.03 (q, 1H), 1.90 (m, 16H), 1.57 (d, 3H)

EXAMPLE 9

Synthesis of 2,7-bis(4-(4-acryloyloxybutyloxycarbonyl)-benzoyloxy)-9,9-dimethylfluorene, Compound (1-79)

(First Step)

Terephthalic acid chloride (17.9 g) was dissolved in toluene (150 mL). A solution of 2,7-dihydroxy-9,9-dimethylfluorene (10.0 g) and triethylamine (9.39 g) dissolved in tetrahydrofuran (50 mL) was added dropwise thereto, and the (1-75)

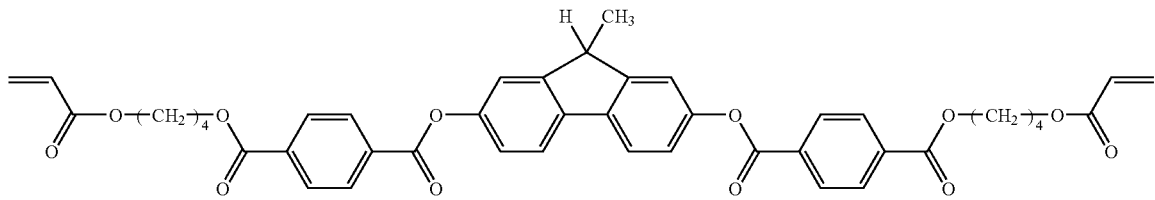

The phase transition temperatures and the NMR analysis values of the compound (1-75) are shown below.

C 100 N 143 I $^1$H-NMR (in CDCl$_3$, δ ppm): 8.30 (d, 4H), 8.18 (d, 4H), 7.79 (d, 2H), 7.39 (s, 2H), 7.24 (d, 2H), 6.43 (dd, 2H), 6.14 (dd, 2H), 5.85 (dd, 2H), 4.43 (t, 4H), 4.26 (t, 4H), 4.03 (q, 1H), 1.90 (m, 8H), 1.57 (d, 3H)

EXAMPLE 8

Synthesis of 2,7-bis(4-(6-acryloyloxyhexyloxy-carbonyl)benzoyloxy)-9-methylfluorene, Compound (1-77)

(First Step)

The compound [H5] (20.0 g) was dissolved in toluene (150 mL). A mixed solution of 6-hydroxyhexyl acrylate (16.4 g) and triethylamine (11.6 g) was added dropwise thereto, and the mixture was stirred for 3 hours. A salt thus deposited was removed by filtration under reduced pressure, and an organic layer was rinsed with hydrochloric acid. The solvent was distilled off to provide a residue, which was then dissolved in toluene and reprecipitated from heptane to provide the target compound (20.4 g) in the form of colorless crystals.

mixture was stirred at 40° C. for 3 hours. A salt thus deposited was removed by filtration under reduced pressure, and the solvent was distilled off to provide a residue, which was then dissolved in toluene and reprecipitated from heptane to provide a compound [H6] (21.5 g).

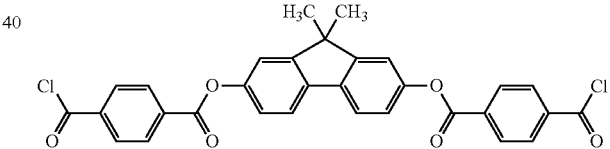

(Second Step)

The compound [H6] (20.0 g) was dissolved in toluene (150 mL). A mixed solution of 4-hydroxybutyl acrylate (13.4 g) and triethylamine (11.3 g) was added dropwise thereto, and the mixture was stirred for 3 hours. A salt thus deposited was removed by filtration under reduced pressure, and an organic layer was rinsed with hydrochloric acid. The solvent was distilled off to provide a residue, which was then dissolved in toluene and reprecipitated from heptane to provide the target compound (18.8 g) in the form of colorless crystals.

(1-77)

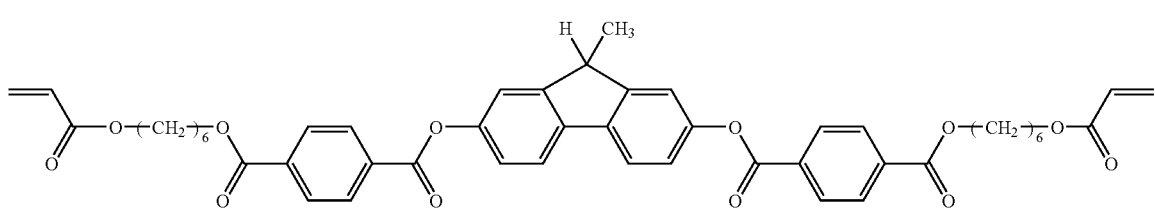

(1-79)

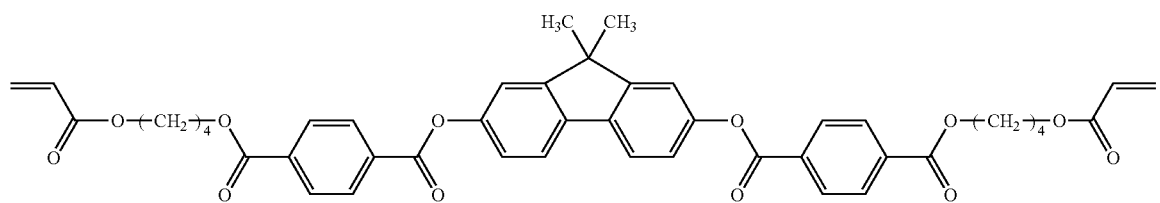

The compound (1-79) was in a liquid crystal state at room temperature and had an NI point of 150° C. The NMR analysis values thereof are shown below.

$^1$H-NMR (in CDCl$_3$, δ ppm): 8.30 (d, 4H), 8.18 (d, 4H), 7.79 (d, 2H), 7.39 (s, 2H), 7.24 (d, 2H), 6.43 (dd, 2H), 6.14 (dd, 2H), 5.85 (dd, 2H), 4.43 (t, 4H), 4.26 (t, 4H), 1.90 (m, 8H), 1.57 (d, 6H)

EXAMPLE 10

Synthesis of 2,7-bis(3-(4-acryloyloxybutyloxycarbonyl)-benzoyloxy)-9-methylfluorene, Compound (1-85)

(First Step)

Isophthalic acid chloride (19.1 g) was dissolved in toluene (150 mL). A solution of 2,7-dihydroxy-9-methylfluorene (10.0 g) and triethylamine (10.0 g) dissolved in tetrahydrofuran (50 mL) was added dropwise thereto, and the mixture was stirred at 40° C. for 3 hours. A salt thus deposited was removed by filtration under reduced pressure, and the solvent was distilled off to provide a residue, which was then dissolved in toluene and reprecipitated from heptane to provide a compound [H7] (22.6 g).

[H7]

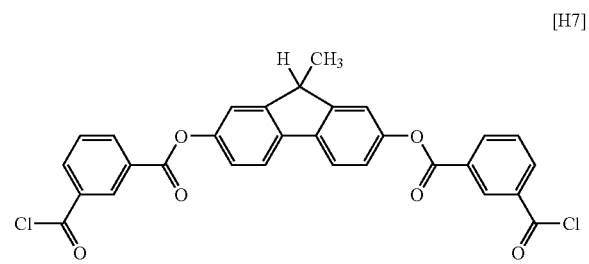

(Second Step)

The compound [H7] (20.0 g) was dissolved in toluene (150 mL). A mixed solution of 6-hydroxyhexyl acrylate (16.4 g) and triethylamine (11.6 g) was added dropwise thereto, and the mixture was stirred for 3 hours. A salt thus deposited was removed by filtration under reduced pressure, and an organic layer was rinsed with hydrochloric acid. The solvent was distilled off to provide a residue, which was then dissolved in toluene and reprecipitated from heptane to provide the target compound (15.9 g) in the form of colorless crystals.

The phase transition temperature and the NMR analysis values of the compound (0.1-85) are shown below.

The compound had no liquid crystal phase and had a melting point of 80° C.

$^1$H-NMR (in CDCl$_3$, δ ppm): 8.85 (s, 2H), 8.35 (d, 2H), 8.22 (d, 2H), 7.79 (d, 2H), 7.52 (t, 2H), 7.39 (s, 2H), 7.24 (s, 2H), 6.43 (dd, 2H), 6.14 (dd, 2H), 5.85 (dd, 2H), 4.43 (t, 4H), 4.26 (t, 4H), 4.03 (q, 1H), 1.90 (m, 8H), 1.57 (d, 3H)

COMPARATIVE EXAMPLE 1

The compound (M1-3) was dissolved in PGMEA to prepare a 10% by weight PGMEA solution. The solution suffered deposition of crystals even after allowing to stand at room temperature (20° C.) over night. It is understood from the comparison between the result and Example 1 that the compound of the invention having an oxycarbonyloxy bonding group instead of an ether bond is excellent in solubility in PGMEA. Furthermore, it is understood from the comparison between Example 5 and Example 6 that the solubility in PGMEA is further enhanced by introducing an ether structure (—O—) to the alkylene in the side chain.

(M1-3)

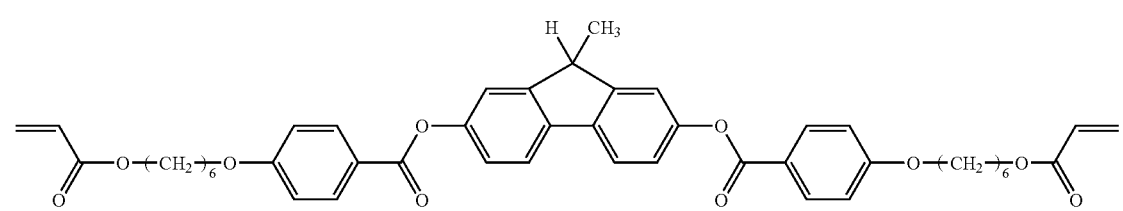

EXAMPLE 11

Preparation of Polymerizable Liquid Crystal Composition

The following composition (PLC-1) was prepared. The composition exhibited a liquid crystal phase at room temperature and had an NI point of 64° C.

(1-8)

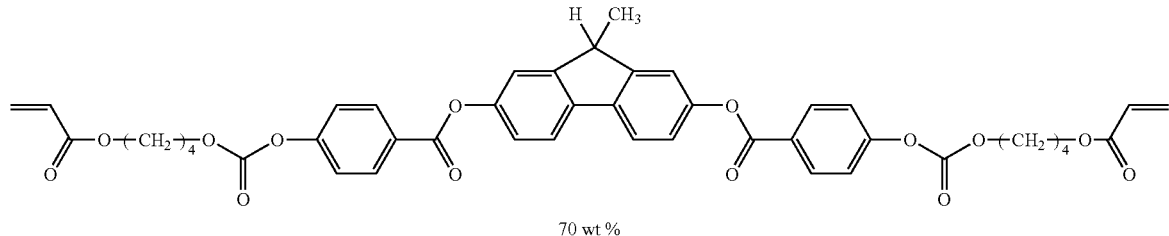

70 wt %

(M3-3)

30 wt %

EXAMPLE 12

Preparation of Polymerizable Liquid Crystal Composition

The following composition (PLC-2) was prepared. The composition (PLC-2) exhibited a liquid crystal phase at room temperature and had an NI point of from 187 to 189° C.

(1-8)

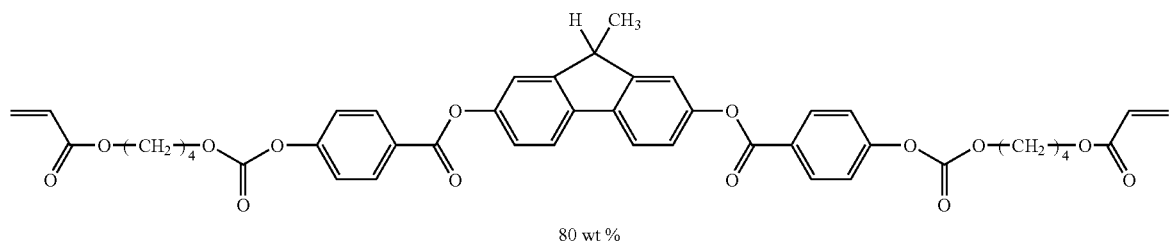

80 wt %

(M2-7)

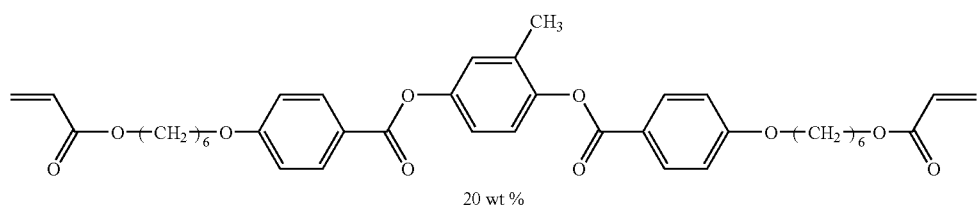

20 wt %

EXAMPLE 13

Preparation of Polymerizable Liquid Crystal Composition

The following composition (PLC-3) was prepared. The composition exhibited a liquid crystal phase at room temperature and had an NI point of 195° C.

(1-8)

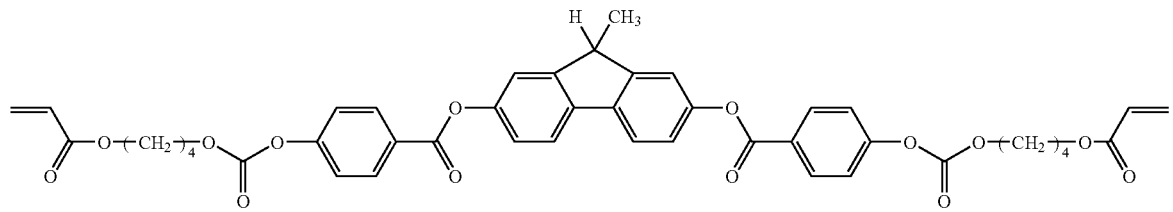

80 wt %

(M2-9)

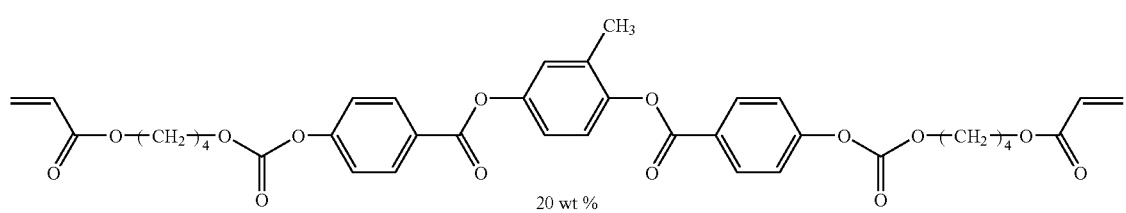

20 wt %

EXAMPLE 14

Preparation of Polymerizable Liquid Crystal Composition

The following composition (PLC-4) was prepared. The composition exhibited a liquid crystal phase at room temperature and had an NI point of 143° C.

(1-8)

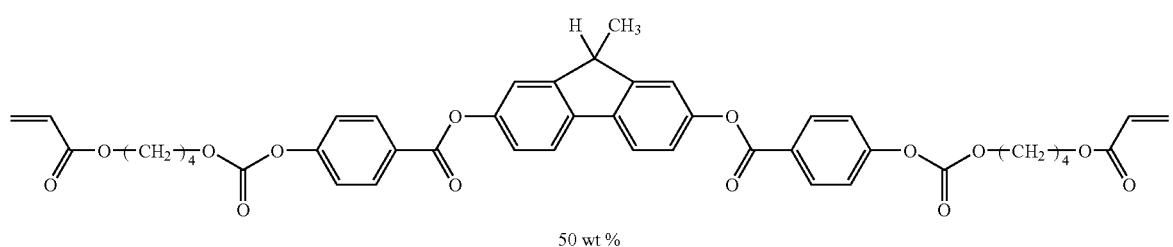

50 wt %

(M2-9)

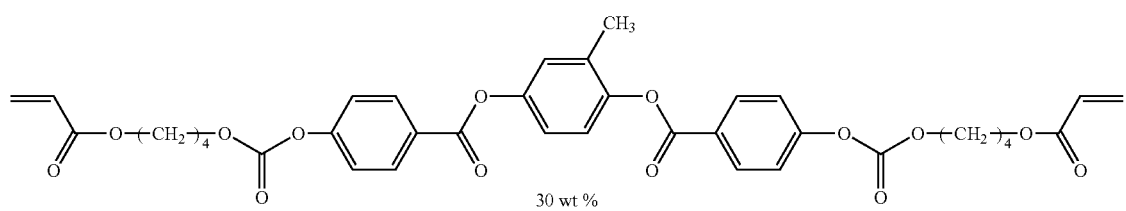

30 wt %

(M3-9)

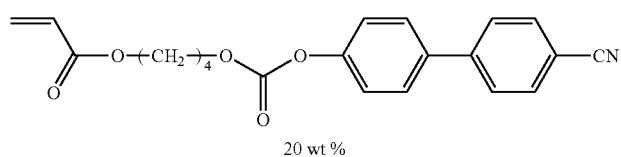

20 wt %

EXAMPLE 15

Preparation of Polymerizable Liquid Crystal Composition

The following composition (PLC-5) was prepared. The composition exhibited a liquid crystal phase at room temperature and had an NI point of 95° C.

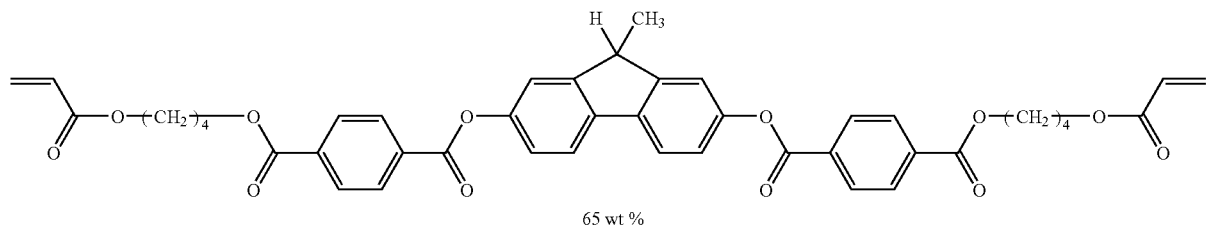
(1-75)

65 wt %

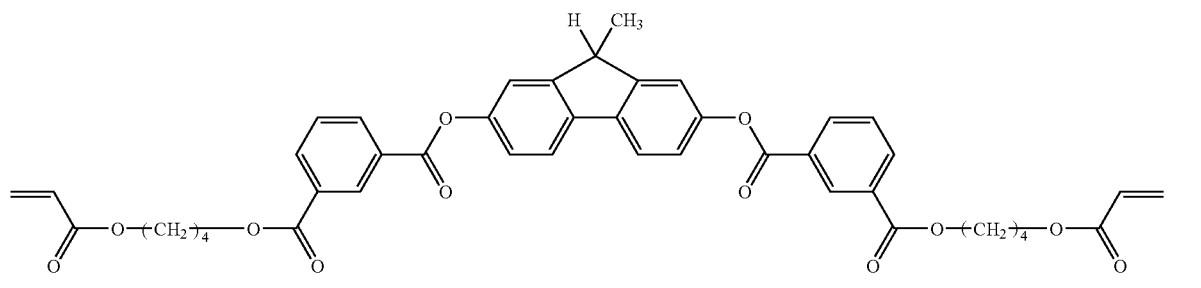
(1-85)

15 wt %

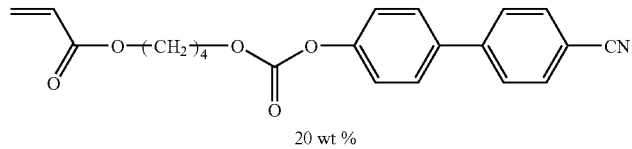
(M3-9)

20 wt %

EXAMPLE 16

A solution containing 40% by weight of the polymerizable liquid crystal composition (PLC-1), 3% by weight of Irgacure 907 and 57% by weight of propylene glycol monomethyl ether acetate was prepared, and the solution was coated on a glass substrate having a polyimide orientation film having been subjected to rubbing orientation treatment, with a bar coater capable of providing a wet thickness of approximately 12 μm. The substrate was placed on a hot plate heated to 70° C. for 120 seconds to perform drying of the solvent and orientation of liquid crystal. It was polymerized in a nitrogen atmosphere by radiating light having an intensity of 30 mW/cm² (center wavelength: 365 nm) at room temperature for 30 seconds with a 250 W/cm super-high pressure mercury lamp, thereby providing a thin film exhibiting optical anisotropy. Measurement results of retardation with a polarized light analyzer are shown in FIG. 1. It is understood from the results that the film exhibits A-plate optical characteristics.

EXAMPLE 17

A solution containing 30% by weight of the polymerizable liquid crystal composition (PLC-4), 10% by weight of SILA-ACE S-330, produced by Chisso Corporation, 3% by weight of Irgacure 907 and 57% by weight of toluene was prepared, and the solution was coated on a glass substrate having a polyimide orientation film having been subjected to rubbing orientation treatment, with a bar coater capable of providing a wet thickness of approximately 12 μm. The substrate was placed on a hot plate heated to 70° C. for 120 seconds to perform drying of the solvent and orientation of liquid crystal. It was polymerized in a nitrogen atmosphere by radiating light having an intensity of 30 mW/cm² (center wavelength: 365 nm) at room temperature for 30 seconds with a 250 W/cm super-high pressure mercury lamp, thereby providing a thin film exhibiting optical anisotropy. The thin film had homeotropic orientation fixed, and exhibited C-plate optical characteristics.

EXAMPLE 18

A solution containing 40% by weight of the polymerizable liquid crystal composition (PLC-5), 3% by weight of Irgacure 907 and 57% by weight of propylene glycol monomethyl ether acetate was prepared, and the solution was coated on a glass substrate having a polyimide orientation film having been subjected to rubbing orientation treatment, with a bar coater capable of providing a wet thickness of approximately 12 μm. The substrate was placed on a hot plate heated to 70° C. for 120 seconds to perform drying of the solvent and orientation of liquid crystal. It was polymerized in a nitrogen atmosphere by radiating light having an intensity of 30 mW/cm² (center wavelength: 365 nm) at room temperature for 30 seconds with a 250 W/cm super-high pressure mercury lamp, thereby providing a thin film exhibiting optical anisotropy. The thin film had homogeneous orientation fixed, and exhibited A-plate optical characteristics.

EXAMPLE 19

A solution containing 30% by weight of the polymerizable liquid crystal composition (PLC-5), 10% by weight of SILA-ACE S-330, produced by Chisso Corporation, 3% by weight of Irgacure 907 and 57% by weight of toluene was prepared, and the solution was coated on a glass substrate having a polyimide orientation film having been subjected to rubbing orientation treatment, with a bar coater capable of providing a wet thickness of approximately 12 μm. The substrate was placed on a hot plate heated to 70° C. for 120 seconds to perform drying of the solvent and orientation of liquid crystal. It was polymerized in a nitrogen atmosphere by radiating light having an intensity of 30 mW/cm² (center wavelength: 365 nm) at room temperature for 30 seconds with a 250 W/cm super-high pressure mercury lamp, thereby providing a thin film exhibiting optical anisotropy. The thin film had homeotropic orientation fixed, and exhibited C-plate optical characteristics.

EXAMPLE 20

A solution containing 30% by weight of the polymerizable liquid crystal composition (PLC-5), 5% by weight of a divalent acrylate (5-1), 3% by weight of Irgacure 907 and 62% by weight of cyclohexanone was prepared, and the solution was coated on a glass substrate having a polyimide orientation film having been subjected to rubbing orientation treatment, with a bar coater capable of providing a wet thickness of approximately 12 μm. The substrate was placed on a hot plate heated to 70° C. for 120 seconds to perform drying of the solvent and orientation of liquid crystal. It was polymerized in a nitrogen atmosphere by radiating light having an intensity of 30 mW/cm² (center wavelength: 365 nm) at room temperature for 30 seconds with a 250 W/cm super-high pressure mercury lamp, thereby providing a thin film exhibiting optical anisotropy. Measurement results of retardation with a polarized light analyzer are shown in FIG. 2. It is understood from the results that the film exhibits C-plate optical characteristics.

EXAMPLE 21

A solution containing 36% by weight of the polymerizable liquid crystal composition (PLC-5), 3% by weight of an optically active acrylate (K2), 3% by weight of Irgacure 907 and 57% by weight of propylene glycol monomethyl ether acetate was prepared, and the solution was coated on a glass substrate having a polyimide orientation film having been subjected to rubbing orientation treatment, with a bar coater capable of providing a wet thickness of approximately 12 μm. The substrate was placed on a hot plate heated to 70° C. for 120 seconds to perform drying of the solvent and orientation of liquid crystal. It was polymerized in a nitrogen atmosphere by radiating light having an intensity of 30 mW/cm² (center wavelength: 365 nm) at room temperature for 30 seconds with a 250 W/cm super-high pressure mercury lamp, thereby providing a thin film exhibiting optical anisotropy. Measurement results of retardation with a polarized light analyzer are shown in FIG. 3. It is understood from the results that the film exhibits negative C-plate optical characteristics.

INDUSTRIAL APPLICABILITY

The compound of the invention can be used as a polymerizable liquid crystal compound, and can be used as a constitutional component of a polymerizable liquid crystal composition. The polymer of the invention can be utilized, for example, as a phase retarder, a polarizing device, a selective reflection film, a brightness improving film, a viewing angle compensation film and the like, which are constitutional elements of a liquid crystal display device.

Figure 1:
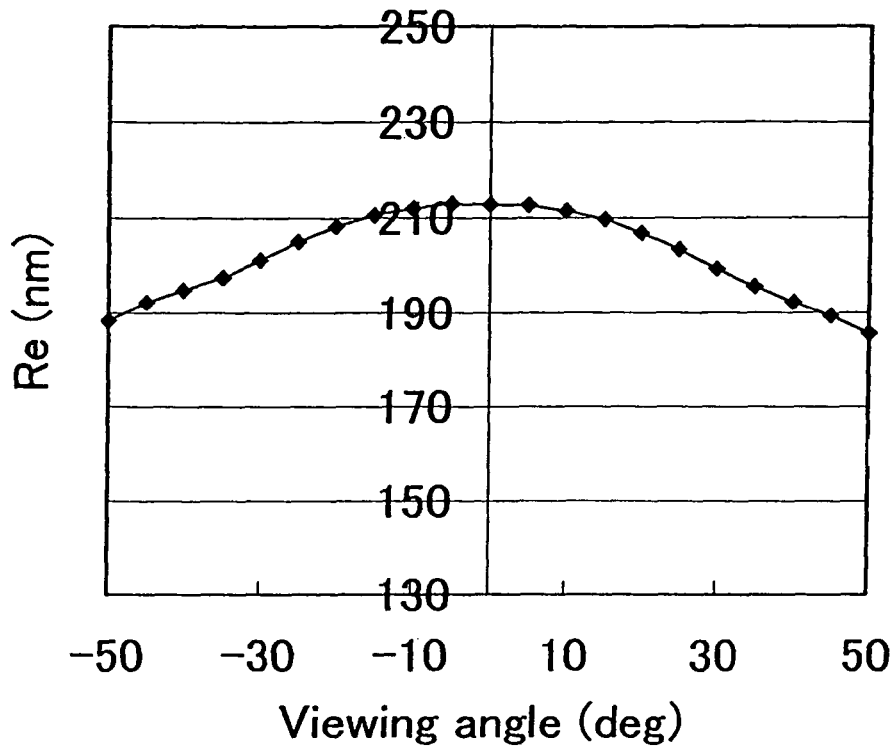
FIG. 1
Figure 2:
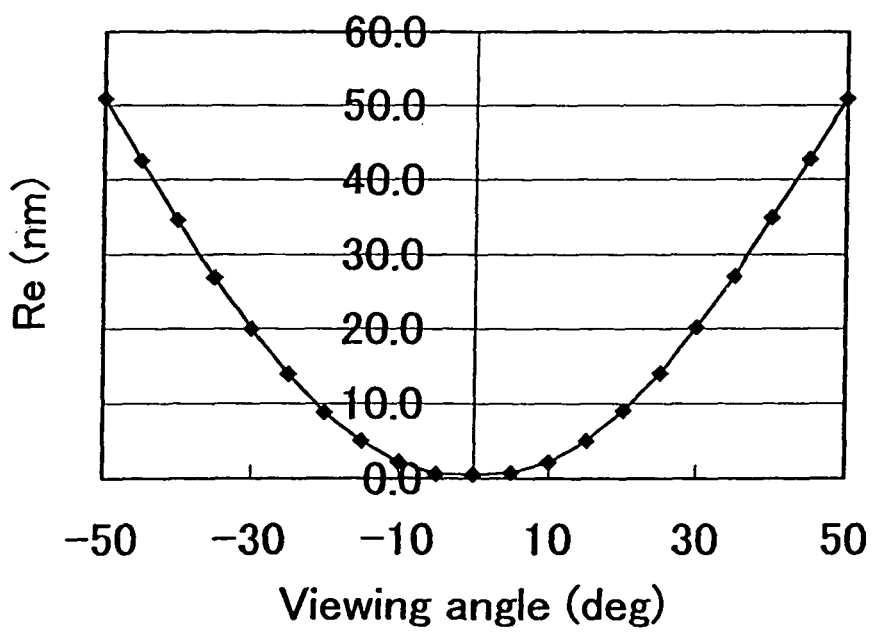
Figure 3:
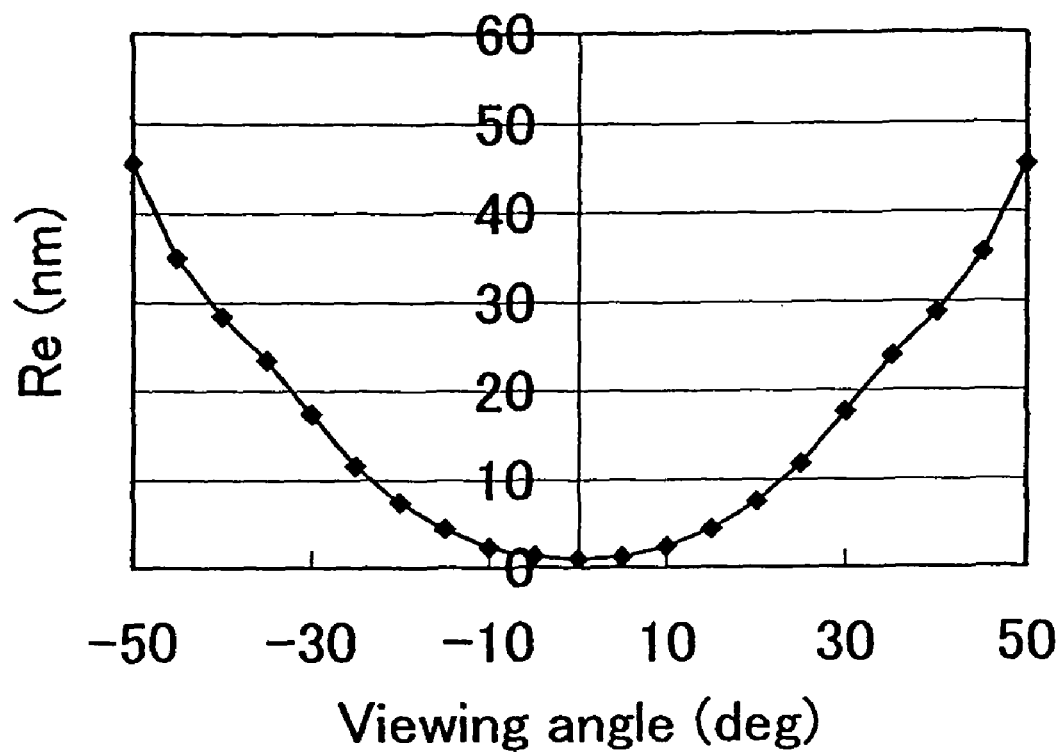

The figure shows the retardation measurement results of the optically anisotropic thin film obtained in Example 16 (exhibiting homogeneous orientation and A-plate optical characteristics).

FIG. 2

The figure shows the retardation measurement results of the optically anisotropic thin film obtained in Example 20 (exhibiting homeotropic orientation and C-plate optical characteristics).

FIG. 3

The figure shows the retardation measurement results of the optically anisotropic thin film obtained in Example 21 (exhibiting negative C-plate optical characteristics).

The invention claimed is:

1. A compound represented by the formula (1):

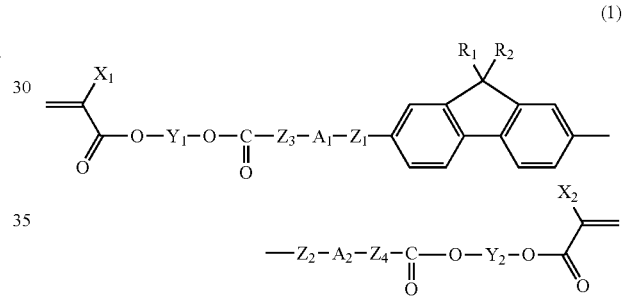

wherein $R^1$ and $R^2$ each independently represent hydrogen, fluorine, chlorine, methyl or ethyl; $X^1$ and $X^2$ each independently represent hydrogen, fluorine, methyl or trifluoromethyl; $Z^1$ represents a single bond, —COO—, —CH=CH—COO—, —CH$_2$CH$_2$—COO—, —CH$_2$O—, —CONH—, —(CH$_2$)$_4$—, —CH$_2$CH$_2$— or —C≡C—; $Z^2$ represents a single bond, —OCO—, —OCO—CH=CH—, —OCO—CH$_2$CH$_2$—, —OCH$_2$—, —NHCO—, —(CH$_2$)$_4$—, —CH$_2$CH$_2$— or —C≡C—; $Z^3$ and $Z^4$ each independently represent a single bond or —O—; $A^1$ and $A^2$ each independently represent 1,4-cyclohexylene, 1,4-phenylene, 1,3-phenylene, pyridin-2,5-diyl, pyrimidin-2,5-diyl, naphthalen-2,6-diyl or tetrahydronaphtlane-2,6-diyl, in which in the 1,3-phenylene and 1,4-phenylene, arbitrary hydrogen may be replaced by fluorine or chlorine, and one or two hydrogen may be replaced by cyano, methyl, ethyl, methoxy, hydroxyl, formyl, acetoxy, acetyl, trifluoroacetyl, difluoromethyl or trifluoromethyl; and $Y^1$ and $Y^2$ each independently represent alkylene having from 2 to 20 carbon atoms, in which in the alkylene, arbitrary hydrogen may be replaced by fluorine or chlorine, and arbitrary —CH$_2$— may be replaced by —O—, —COO—, —OCO—, —CH=CH— or —C≡C—.

2. The compound according to claim 1, wherein $R^1$ and $R^2$ each independently represent hydrogen or methyl; $X^1$ and $X^2$ each represent hydrogen or methyl; $Z^1$ represents —COO—, —CH=CH—COO— or —CH$_2$CH$_2$—COO—; $Z^2$ represents —OCO—, —OCO—CH=CH— or —OCO—CH$_2$CH$_2$—; $Z^3$ and $Z^4$ each represent a single bond or —O—;

$A^1$ and $A^2$ each represent 1,4-phenylene or 1,3-phenylene, in which in the rings, one or two hydrogen may be replaced by fluorine or chlorine; and $Y^1$ and $Y^2$ are the same groups and represent alkylene having from 2 to 14 carbon atoms, in which in the alkylene, arbitrary —$CH_2$— may be replaced by —O—.

3. The compound according to claim 1, wherein $R^1$ and $R^2$ each independently represent hydrogen or methyl; $X^1$ and $X^2$ each represent hydrogen; $Z^1$ represents —COO—; $Z^2$ represents —OCO—; $Z^3$ and $Z^4$ each represent —O—; $A^1$ and $A^2$ each represent 1,4-phenylene, 1,3-phenylene or 2-fluoro-1,4-phenylene; and $Y^1$ and $Y^2$ are the same groups and represent alkylene having from 2 to 14 carbon atoms, in which in the alkylene, arbitrary —$CH_2$— may be replaced by —O—.

4. The compound according to claim 1, wherein $R^1$ and $R^2$ each independently represent hydrogen or methyl; $X^1$ and $X^2$ each represent hydrogen; $Z^1$ represents —COO—; $Z^2$ represents —OCO—; $Z^3$ and $Z^4$ each represent a single bond; $A^1$ and $A^2$ each represent 1,4-phenylene, 1,3-phenylene or 2-fluoro-1,4-phenylene; and $Y^1$ and $Y^2$ are the same groups and represent alkylene having from 2 to 14 carbon atoms, in which in the alkylene, arbitrary —$CH_2$— may be replaced by —O—.

5. A polymerizable liquid crystal composition comprising at least one compound represented by the formula (1) and at least one compound selected from the group of compounds represented by the formulae (M1), (M2) and (M3):

wherein
in the formula (1), $R^1$ and $R^2$ each independently represent hydrogen, fluorine, chlorine, methyl or ethyl; $X^1$ and $X^2$ each independently represent hydrogen, fluorine, methyl or trifluoromethyl; $Z^1$ represents a single bond, —COO—, —CH=CH—COO—, —$CH_2CH_2$—COO—, —$CH_2O$—, —CONH—, —$(CH_2)_4$—, —$CH_2CH_2$— or —C≡C—; $Z^2$ represents a single bond, —OCO—, —OCO—CH=CH—, —OCO—$CH_2CH_2$—, —$OCH_2$—, —NHCO—, —$(CH_2)_4$—, —$CH_2CH_2$— or —C≡C—; $Z^3$ and $Z^4$ each independently represent a single bond or —O—; $A^1$ and $A^2$ each independently represent 1,4-cyclohexylene, 1,4-phenylene, 1,3-phenylene, pyridin-2,5-diyl, pyrimidin-2,5-diyl, naphthalen-2,6-diyl or tetrahydronaphtlane-2,6-diyl, in which in the 1,3-phenylene and 1,4-phenylene, arbitrary hydrogen may be replaced by fluorine or chlorine, and one or two hydrogen may be replaced by cyano, methyl, ethyl, methoxy, hydroxyl, formyl, acetoxy, acetyl, trifluoroacetyl, difluoromethyl or trifluoromethyl; and $Y^1$ and $Y^2$ each independently represent alkylene having from 2 to 20 carbon atoms, in which in the alkylene, arbitrary hydrogen may be replaced by fluorine or chlorine, and arbitrary —$CH_2$— may be replaced by —O—, —COO—, —OCO—, —CH=CH— or —C≡C—, in the formula (M1), $R^3$ and $R^4$ each independently represents hydrogen or methyl; $W^1$ each independently represent hydrogen or fluorine; m1 each independently represent an integer of from 0.2 to 10; and $X^3$ and $X^4$ each independently represent hydrogen, fluorine or methyl, in the formula (M2), $Z^3$ each independently represent —O— or a group represented by the formula (2); $Z^4$ each independently represent a single bond, —$CH_2CH_2$— or —CH=CH—; $W^2$ and $W^3$ each independently represent hydrogen, fluorine, methyl or trifluoromethyl; m2 each independently represent an integer of from 2 to 10; and $X^5$ and $X^6$ each independently represent hydrogen, fluorine or methyl, and

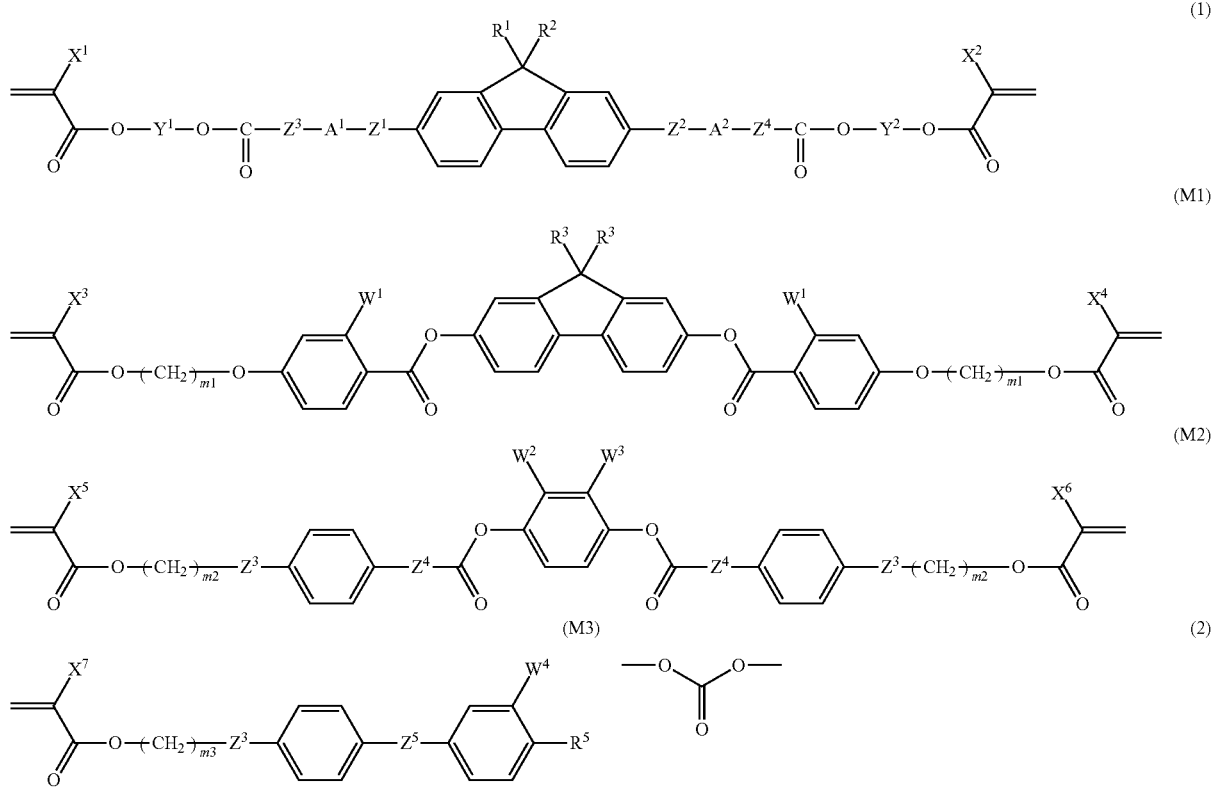

in the formula (M3), $R^5$ represents —CN, —OCF$_3$, alkyl having from 1 to 10 carbon atoms or alkoxy having from 1 to 10 carbon atoms; $W^4$ represents hydrogen or fluorine; $Z^3$ represents —O— or a group represented by the formula (2); $Z^5$ represents a single bond, —C≡C— or —COO—; m3 represents an integer of from 2 to 10; and $X^7$ represents hydrogen, fluorine or methyl.

6. The polymerizable liquid crystal composition according to claim 5, wherein
in the formula (1), $R^1$ and $R^2$ each independently represent hydrogen or methyl; $X^1$ and $X^2$ each represent hydrogen or methyl; $Z^1$ represents —COO—, —CH=CH—COO— or —CH$_2$CH$_2$—COO—; $Z^2$ represents —OCO—, —OCO—CH=C— or —OCO—CH$_2$CH$_2$—; $Z^3$ and $Z^4$ each represent —O—; $A^1$ and $A^2$ each represent 1,4-phenylene or 1,3-phenylene, in which in the rings, one or two hydrogen may be replaced by fluorine or chlorine; and $Y^1$ and $Y^2$ are the same groups and represent alkylene having from 2 to 14 carbon atoms, in which in the alkylene, arbitrary —CH$_2$— may be replaced by —O—,
in the formula (M1), $R^3$ and $R^4$ each independently represents hydrogen or methyl; $W^1$ represents hydrogen or fluorine; m1 represents an integer of from 2 to 10; and $X^3$ and $X^4$ represent hydrogen,
in the formula (M2), $Z^3$ represents —O— or a group represented by the formula (2); $Z^4$ represents a single bond or —CH$_2$CH$_2$—; $W^2$ and $W^3$ each independently represent hydrogen, methyl or trifluoromethyl; m2 represents an integer of from 2 to 10; and $X^5$ and $X^6$ each represent hydrogen,
in the formula (M3), $R^5$ represents —CN, —OCF$_3$, alkyl having from 1 to 10 carbon atoms or alkoxy having from 1 to 10 carbon atoms; $W^4$ represents hydrogen; $Z^3$ represents —O— or a group represented by the formula (2); $Z^5$ represents a single bond or —COO—; m3 represents an integer of from 2 to 10; and $X^7$ represents hydrogen, and
a ratio of the compound represented by the formula (1) is from 40 to 95% by weight, and a ratio of the compound selected from the group of compounds represented by the formulae (M1), (M2) and (M3) is from 5 to 60% by weight, based on a total amount of the compound represented by the formula (1) and the compound selected from the group of compounds represented by the formulae (M1), (M2) and (M3).

7. The polymerizable liquid crystal composition according to claim 5, wherein
in the formula (1), $R^1$ and $R^2$ each independently represent hydrogen or methyl; $X^1$ and $X^2$ each represent hydrogen; $Z^1$ represents —COO—; $Z^2$ represents —OCO—; $Z^3$ and $Z^4$ each represent —O—; $A^1$ and $A^2$ each represent 1,4-phenylene, 1,3-phenylene or 2-fluoro-1,4-phenylene; and $Y^1$ and $Y^2$ are the same groups and represent alkylene having from 2 to 14 carbon atoms, in which in the alkylene, arbitrary —CH$_2$— may be replaced by —O—,
in the formula (M1), $R^3$ and $R^4$ each independently represents hydrogen or methyl; $W^1$ represents hydrogen or fluorine; m1 represents an integer of from 2 to 10; and $X^3$ and $X^4$ represent hydrogen,
in the formula (M2), $Z^3$ represents —O— or a group represented by the formula (2); $Z^4$ represents a single bond or —CH$_2$CH$_2$—; $W^2$ and $W^3$ each independently represent hydrogen, methyl or trifluoromethyl; m2 represents an integer of from 2 to 10; and $X^5$ and $X^6$ each represent hydrogen,
in the formula (M3), $R^5$ represents —CN, —OCF$_3$, alkyl having from 1 to 10 carbon atoms or alkoxy having from 1 to 10 carbon atoms; $W^4$ represents hydrogen; $Z^3$ represents —O— or a group represented by the formula (2); $Z^5$ represents a single bond or —COO—; m3 represents an integer of from 2 to 10; and $X^7$ represents hydrogen, and
a ratio of the compound represented by the formula (1) is from 50 to 90% by weight, and a ratio of the compound selected from the group of compounds represented by the formulae (M1), (M2) and (M3) is from 10 to 50% by weight, based on a total amount of the compound represented by the formula (1) and the compound selected from the group of compounds represented by the formulae (M1), (M2) and (M3).

8. The polymerizable liquid crystal composition according to claim 5, wherein
in the formula (1), $R^1$ and $R^2$ each independently represent hydrogen or methyl; $X^1$ and $X^2$ each represent hydrogen or methyl; $Z^1$ represents —COO—, —CH=CH—COO—, —CH$_2$CH$_2$—COO— or —C≡C—; $Z^2$ represents —OCO—, —OCO—CH=CH—, —OCO—CH$_2$CH$_2$— or —C≡C—; $Z^3$ and $Z^4$ each represent a single bond; $A^1$ and $A^2$ each represent 1,3-phenylene, 1,4-phenylene or 2-fluoro-1,4-phenylene; and, $Y^1$ and $Y^2$ are the same groups and represent alkylene having from 2 to 14 carbon atoms, in which in the alkylene, arbitrary —CH$_2$— may be replaced by —O—,
in the formula (M1), $R^3$ and $R^4$ each independently represents hydrogen or methyl; $W^1$ represents hydrogen or fluorine; m1 represents an integer of from 2 to 10; and $X^3$ and $X^4$ represent hydrogen,
in the formula (M2), $Z^3$ represents —O— or a group represented by the formula (2); $Z^4$ represents a single bond or —CH$_2$CH$_2$—; $W^2$ and $W^3$ each independently represent hydrogen, methyl or trifluoromethyl; m2 represents an integer of from 2 to 10; and $X^5$ and $X^6$ each represent hydrogen,
in the formula (M3), $R^5$ represents —CN, —OCF$_3$, alkyl having from 1 to 10 carbon atoms or alkoxy having from 1 to 10 carbon atoms; $W^4$ represents hydrogen; $Z^3$ represents —O— or a group represented by the formula (2); $Z^5$ represents a single bond or —COO—; m3 represents an integer of from 2 to 10; and $X^7$ represents hydrogen, and
a ratio of the compound represented by the formula (1) is from 50 to 90% by weight, and a ratio of the compound selected from the group of compounds represented by the formulae (M1), (M2) and (M3) is from 10 to 50% by weight, based on a total amount of the compound represented by the formula (1) and the compound selected from the group of compounds represented by the formulae (M1), (M2) and (M3).

9. The polymerizable liquid crystal composition according to claim 5, wherein
in the formula (1), $R^1$ and $R^2$ each independently represent hydrogen or methyl; $X^1$ and $X^2$ each represent hydrogen; $Z^1$ represents —COO—; $Z^2$ represents —OCO—; $Z^3$ and $Z^4$ each represent a single bond; $A^1$ and $A^2$ each represent 1,3-phenylene, 1,4-phenylene or 2-fluoro-1,4-phenylene; and $Y^1$ and $Y^2$ are the same groups and represent alkylene having from 2 to 14 carbon atoms, in which in the alkylene, arbitrary —CH$_2$— may be replaced by —O—, in the formula (M1), $R^3$ and $R^4$ each independently represents hydrogen or methyl; $W^1$ represents hydrogen or fluorine; m1 represents an integer of from 2 to 10; and $X^3$ and $X^4$ represent hydrogen, in the formula (M2), $Z^3$ represents —O— or a group represented by the formula (2); $Z^4$ represents a single bond or —CH$_2$CH$_2$—; $W^2$ and $W^3$ each independently represent hydrogen, methyl or trifluoromethyl; m2 represents an integer of from 2 to 10; and $X^5$ and $X^6$ each represent hydrogen, in the formula (M3), $R^5$ represents —CN, —OCF$_3$, alkyl having from 1 to 10 carbon atoms or alkoxy having from 1 to 10 carbon atoms; $W^4$ represents hydrogen; $Z^3$ represents —O— or a group represented by the formula (2); $Z^5$ represents a single bond or —COO—; m3 represents an integer of from 2 to 10; and $X^7$ represents hydrogen, and a ratio of the compound represented by the formula (1) is from 50 to 90% by weight, and a ratio of the compound selected from the group of compounds represented by the formulae (M1), (M2) and (M3) is from 10 to 50% by weight, based on a total amount of the compound represented by the formula (1) and the compound selected from the group of compounds represented by the formulae (M1), (M2) and (M3).

10. A film having optical anisotropy obtained by polymerizing the compound according to claim 1.

11. A film having optical anisotropy obtained by polymerizing the polymerizable liquid crystal composition according to claim 5.

12. The film having optical anisotropy according to claim 10, which has A-plate optical characteristics.

13. The film having optical anisotropy according to claim 11, which has A-plate optical characteristics.

14. The film having optical anisotropy according to claim 10, which has C-plate optical characteristics.

15. The film having optical anisotropy according to claim 11, which has C-plate optical characteristics.

16. The film having optical anisotropy according to claim 10, which has negative C-plate optical characteristics.

17. The film having optical anisotropy according to claim 11, which has negative C-plate optical characteristics.

18. A liquid crystal display device comprising the film having optical anisotropy according to one of claims 10 to 17.

* * * * *